US007191143B2

(12) United States Patent
Keli et al.

(10) Patent No.: US 7,191,143 B2
(45) Date of Patent: Mar. 13, 2007

(54) PREFERENCE INFORMATION-BASED METRICS

(76) Inventors: Sev K. H. Keli, 71 Broadway, Suite 15A, New York, NY (US) 10006; Dick R. Wittink, 25 Old Orchard Rd., North Haven, CT (US) 06473-3023; Hiek Roelof van der Scheer, 82 W. 12th St., Apt. 6C, New York, NY (US) 10011; Andrew P. Golden, 2471 Elm Pl., Apt. 3, Bronx, NY (US) 10458

( * ) Notice: Subject to any disclaimer, the term of this patent is extended or adjusted under 35 U.S.C. 154(b) by 1111 days.

(21) Appl. No.: 10/008,995

(22) Filed: Nov. 5, 2001

(65) Prior Publication Data
US 2003/0088457 A1  May 8, 2003

(51) Int. Cl.
*G06F 17/30* (2006.01)
(52) U.S. Cl. ........................................................ 705/10
(58) Field of Classification Search .................. 705/10
See application file for complete search history.

(56) References Cited

U.S. PATENT DOCUMENTS

| 5,041,972 A |   | 8/1991  | Frost            |         |
|-------------|---|---------|------------------|---------|
| 5,124,911 A |   | 6/1992  | Sack             |         |
| 5,583,763 A |   | 12/1996 | Atcheson et al.  |         |
| 5,974,396 A |   | 10/1999 | Anderson et al.  |         |
| 6,009,407 A | * | 12/1999 | Garg ............ | 705/10  |
| 6,012,051 A |   | 1/2000  | Sammon, Jr. et al.|        |
| 6,029,195 A |   | 2/2000  | Herz             |         |
| 6,134,532 A |   | 10/2000 | Lazarus et al.   |         |
| 6,208,989 B1|   | 3/2001  | Dockter et al.   |         |
| 6,236,975 B1|   | 5/2001  | Boe et al.       |         |
| 6,236,978 B1|   | 5/2001  | Tuzhilin         |         |
| 6,298,348 B1|   | 10/2001 | Eldering         |         |
| 6,321,221 B1|   | 11/2001 | Bieganski        |         |
| 7,062,510 B1| * | 6/2006  | Eldering ........ | 707/104.1|

FOREIGN PATENT DOCUMENTS

WO     WO 9726612 A1 *  7/1997

OTHER PUBLICATIONS

Chang et al ""Goodies" in exchange for consumer information on the Internet: the economics and issues", Dec. 1998, IEEE, pp. 533-542.*
"The ACA/HB Module for Hierarchical Bayes Estimation", Sawtooth Software, Inc. ( Aug. 1999).

(Continued)

*Primary Examiner*—Romain Jeanty
(74) *Attorney, Agent, or Firm*—JLB Consulting, Inc.; Jeffrey L. Brandt

(57) ABSTRACT

A system to determine metrics based on preference information. The metrics may be presented to a client in several forms and may include at least one of: impact of change in attribute on change in share; impact of change in attribute on share; impact of change in attribute on change in normalized utility; willingness to pay; relation of price and share, given a change in an attribute; gap analysis; gap with competition; unacceptable attribute levels; vulnerability; clout; brand favorability; brand vulnerability; and change in margin due to acceptable change in comparison product.

15 Claims, 41 Drawing Sheets

OTHER PUBLICATIONS

Magidson, Jay, and Vermunt, Jeroen K., "Latent Class Models".

"The CBC Latent Class Technical Paper", *Copyright 2000, Sawtooth Software, Inc.*

Acatech, "Adaptive Conjoint Analysis" (Version 4), *Copyright Sawtooth Software, Inc.* (Apr. 1993).

McCullough, Dick, "Trade-off Analysis": *A Survey of Commercially Available Techniques.*

Srinivasan, V. and Su Park, Chan "Surprising Robustness of the Self-Explicated Approach to Customer Preference Structure Measurement," *Journal of Marketing Research*, vol. XXXIV (May 1997), 286-291.

Wittink, Dick R. and Keil, Sev K. "Continuous Conjoint Analysis".

Huber, Joel, "What We Have Learned from 20 Years of Conjoint Research": *When to use Self-Explicated, Graded Pairs, Full Profiles or Choice Experiments.*

2001 Conference Presentations Set (Spring 2001), *Sawtooth Solutions.*

Orme, Bryan "Helping Managers Understand the Value of Conjoint", *Copyright, Sawtooth Software, 1996.*

Pinnell, Jon and Olsen, Pam "Using Choice-Based Conjoint To Assess Brand Strength and Price Sensitivity", *Copyright 1996, Sawtooth Software.*

Pinnell, Jon (1994) "Multistage Conjoint Methods to Measure Price Sensitivity".

Dawson, Neal V. (91-94) "A Model of Patients' Preferences in Serious Illness", http://www.ahcpr.gov/clinic/medteprp/lis8.htm, (Download date Mar. 30, 2001).

Marketswitch: "Our Industry", http://www.marketswitch.com/products/industry.html, (Download date Mar. 26, 2001).

Kanninen, Barbara, K. (Jan. 1, 2000—Jun. 30, 2002) "Optimal Experimental Design for Nonmarket Choice Experiments", http://www.es.epa.gov/ncerga_abstracts/grants/99/deci/kanninen.html, (Download dated Apr. 11, 2001).

Rollins, Kimberly and Beckett, Alexandra, "Using a Random Utility Model to Measure Willingness to Pay for Public Attributes of Green Goods: Implications for Market Provision of Evironmental Quality", *International Institute of Fisheries Economics and Trade, Microbehavior and Macroresults IIFET 2000*, http://www.orst.edu/Dept/IIFET/2000/abstracts/rollins.html (Download date Apr. 11, 2001).

Ardila, Sergio, Quiroga, Ricardo and Vaughan, William J. (Dec. 1998, ENV-126, E) Publications "A Review of the Use of Contingent Valuation Methods in Project Analysis at the Inter-American Development Bank", http://www.iadb.org/sds/publication/publication_178_e.htm (Download date Apr. 11, 2001).

Understanding Market Segmentation, *Technical Paper From DDS Research*, http://www.dssearch.com/marketsegment/Library/Segment/understanding.asp.

Tyner, Mary Jane and Weiner, Jonathan—MACRO—"Optimal Pricing Strategies Through Conjoint Analysis", http://www.macroinc.com/html/art/s_opt.html (Download date Apr. 10, 2001).

"Customer Targeting Models", *Opti-Market Consulting*, http://www.opti-market.com/targeting.htm (Download date Apr. 10, 2001).

Johnson, Chad, Methodologies and Capabilities: "Market simulation software becomes smarter all the time", *Answers Research, Inc.* http://www.answersresearch.com/methodologies/article5.html (Download date Apr. 10, 2001).

Market Research Application Example, "Conjoint Analysis: *The Pressure*", Statistics & Operations Research, http://www.sas.com/rnd/app/da/market/mraexsim.html (Download date Apr. 10, 2001).

"Research Triangle Institute: Conjoint Analysis Software Tools", http://www.rti.org/difference/conjoint_tools.cfm (Download date Apr. 10, 2001).

Decision Support Inc., A Full Service Market Research & Consulting Firm, "Services Offered" http://www.decisionsupportinc.com/services.html (Download date Apr. 10, 2001).

Landsend.com, "My Personal Shopper: Like having a personal wardrobe" http://www.landsend.com/vpsEntry.cgi?mode=GRAPHIC&refer=c . . . /&sid=098702323344 (Download date Apr. 11, 2001).

Direct1.com "About Direct1" http://www.direct1.com/company/whatdowedo.html (Download date Apr. 3, 2001).

Discretechoice.com "White Papers: Sample Discrete Choice Analysis", http://www.discretechoice.com/analysis.html (Download date Jan. 2, 2001).

Minetheme Knowledge Bank "Information: that Inspires", http://www.mindtheme.com/knowledge/trst.asp (Download date Apr. 10, 2001).

Dominator 2000™ Market Simulation Model From DSS Research, Dominator 2000™ http://www.dssresearch.com/library/Dominator/dominator.asp (Download date Apr. 10, 2001).

Conjoint Analysis Tools, http://www.whitehorse.com.au/~prosoft/statist.htm (Download date Feb. 14, 2001).

Johnson, Richard. M., Sawtooth Technologies: "Trade-Off Analysis of Consumer Values" reprinted from *Journal of Marketing Research*, published by the American Marketing Association, vol. 11 (May 1974), pp. 121-127, http://www.sawtooth.com/news/library/articles/johnson.htm (Download date Feb. 14, 2001).

McCullough, Dick "The Cake Method: A Proprietary Hybrid Conjoint Approach", Macro Consulting, Inc., http://www.macroinc.com.html/art/s_cak.html (Download date Dec. 6, 2000).

ACA, "Adaptive Conjoint Analysis", http://www.sawtoothsoftware.com/aca.shtml (Download date Feb. 14, 2001).

"Analysis: Conjoint Case Example From DSS Research—Marketing Research For . . . ", http://www.dssresearch.com/conjoint/CaseExample/Analysis.asp (Download date Apr. 2, 2001).

A Review of Conjoint Analysis, Technical Paper from DSS Research: "Understanding Conjoint Analysis", http://www.dssresearch.com/conjoint/Library/Conjoint/conjoint.asp (Download date Apr. 2, 2001).

Novak, Tom "Online Exercises: Design Your Own Movie Theater Using Conjoint Analysis", Interactive Exercises, http://www2000.ogsm.vanderbilt.edu/novak/conjoint-Movies/ (Download date Apr. 11, 2001).

Mangen Research Associates, Inc., (1999) "Introduction to Conjoint Analysis", http://www.mrainc.com/conj_intro.html (Download date Feb. 14, 2001).

Mangen Research Associates, Inc. (1999) "Correlation of Estimates—Conjoint Analysis", http://www.mrainc.com/estimate_conj.html (Download date Jan. 2, 2001).

Online Insight—Thanks for your time, file://D:\StartHere.html (Download date Dec. 18, 2000).

eBranding Study: Oneline Insight & jAccenture—"What is Conjoint?", http://www.onlineinsight.com/ebranding/conjoint.html (Download date Apr. 27, 2001).

Paul, Lauren, "1 to 1 Marketer", publish Mar. 1, 2001, http://www.1to1.com/Building/CustomerRelationships/entry.jsp?REQUESTED_URL (Download date May 31, 2001).

"Active Buyers Guide", *Active Decisions, Inc.*, (2002).

"Active Sales Assistant", *Active Decisions, Inc.*, (2001).

Bajaj, Akilesh , "A Study of Senior Information Systems Managers' Decision Models in Adopting New Computing Architectures", *Journal of the Association for Information Systems*, (Jun. 2000).

Bajaj, Akilesh , "Factors Relevant to Senior Information Systems Managers' Decision to Adopt New Computing Paradigms: An Exploratory Study", [http://lost-contact.mit.edu/afs/net/project/afs32/andrew.cmu.edu/supa/wpapers/1998], (1998).

Kislinger, Gunter , "Die Anwendung des Teilnutzenwertmodells in der Martsegmentierung", *Karl-Franzens-Universitaet Graz(Austria)*, (1990).

Lau, Kin-Nam , "Evaluating Consumer Preferences for Existing Multiattribute Products: A Non-Metric Approach", *College of Business Administration, North Dakota State University*, (1993).

\* cited by examiner

RESPONDENT: JOHN Q. PUBLIC; PRODUCT: LUXURY SPORTS CAR  290

| ATTRIBUTE 512 | ATTRIBUTE LEVEL/ASSOCIATED UTILITY 514 |
|---|---|
| HORSEPOWER | 200/0; 250/17; 300/25; 350/29 |
| MILES PER GALLON | 20/X; 25/0; 30/11; 35/28; 40/29 |
| COLOR | BLUE/7; RED/0; BLACK/12 |
| PRICE | $45,000/40; $55,000/0; $65,000/X |
| BRAND | PORSCHE/22; BMW/0; MERCEDES/17 |

FIG. 5

PRODUCT: LUXURY SPORTS CAR — 394

| PRODUCT 620 | HORSE POWER 630 | M.P.G. 640 | COLOR 650 | BRAND 660 | PRICE 670 | CLIENT PRODUCT? 680 | EXISTING PRODUCT? 690 | 610 |
|---|---|---|---|---|---|---|---|---|
| 328I | 200 | 25 | BLUE | BMW | $45000 | Y | N | |
| 330I | 300 | 20 | RED | BMW | $65000 | Y | Y | |
| C230 | 400 | 30 | BLACK | MERCEDES | $45000 | N | Y | |

FIG. 6

PREFERENCE INFORMATION-BASED METRICS

CROSS-REFERENCE TO RELATED APPLICATIONS

This application is related to the following co-pending and commonly assigned U.S. patent applications (the content of each of which is hereby incorporated by reference herein for all purposes):

U.S. patent application Ser. No. 09/754,612, now pending, filed Jan. 4, 2001, for "SYSTEM TO QUANTIFY CONSUMER PREFERENCES";

U.S. patent application Ser. No. 09/845,051, now pending, filed Apr. 27, 2001, for "SYSTEM TO PROVIDE CONSUMER PREFERENCE INFORMATION"; and U.S. patent application Ser. No. 10/635,387, now pending, filed Aug. 6, 2003, for "SYSTEM TO QUANTIFY CONSUMER PREFERENCES".

BACKGROUND OF THE INVENTION

1. Field of the Invention

The present invention relates to metrics determined based on preference information. More specifically, the invention relates to a variety of metrics that are determined based on preference information associated with respondents and are usable at least to evaluate products and/or markets.

2. Description of the Related Art

During the design of a product, a manufacturer must choose from among several available product features, or attributes, to include in the product. For each included attribute, a manufacturer must also choose an attribute level to associate with the attribute. Attribute levels that may be associated with the attribute "color" include "black", "white", "blue", etc.

Trade-off analysis techniques determine preference information associated with respondent consumers in an attempt to identify product configurations or combinations of attribute levels that promote a particular objective, such as value creation, value capturing, maximizing sales, maximizing profit, minimizing competitors' sales, etc. A respondent, in this regard, may be any entity having particular preferences for particular product attributes and attribute levels. Such respondents include individuals, businesses, and purchasing managers. Many techniques exist for determining preference information associated with respondents, including those discussed in above-mentioned U.S. patent application Ser. Nos. 09/754,612 and 09/845,051.

Some conventional systems gather preference information by asking a respondent several questions regarding her product needs or her preferences for particular product features. The preference information is then used to identify a product that is arguably suited to the respondent. Other systems use gathered preference information to compare the relative attractiveness of products. For example, these systems allow comparison between the attractiveness of a Sony television priced at $599 and the attractiveness of a Magnavox television priced at $399. Such a comparison is possible because the preference information includes numerical values associated with respondent's preferences for each attribute and attribute level on which different products can be described and on which the products may vary among one another. Accordingly, the relative attractiveness of differences or changes in an attribute with respect to differences or changes in any other attribute can be determined simply by comparing appropriate associated numerical values. For example, the attractiveness of a price change from $599 to $399 may be compared with the attractiveness of a brand change from Magnavox to Sony.

Such usages of preference information are not particularly useful for making business decisions and for evaluating a product market, either because of inaccuracies or because they cannot provide answers to useful questions about a product market. Many potential users of current systems for processing preference information, including manufacturers, wholesalers, retailers, and market analysts, therefore do not believe that benefits provided by the current systems outweigh their costs. Consequently, what is needed is a system to process preference information that produces data that is more useful than that produced by current systems. Such a system may allow a manufacturer to choose product configurations, as well as production amounts and prices for each product configuration, which increase customer satisfaction, customer loyalty and overall profit.

SUMMARY OF THE INVENTION

In order to address the foregoing, the present invention provides, in one aspect, a method, an apparatus, a system, a medium, and means to process preference information in which one or more acceptable changes are determined corresponding to one or more attribute levels of a comparison product, and a change in share of the comparison product is determined in a case that the comparison product is changed according to one or more of the one or more acceptable changes, wherein the determination of the change in share of the comparison product is based at least on the one or more acceptable changes and on preference information associated with a plurality of respondents.

In another aspect, one or more acceptable changes are determined corresponding to one or more attribute levels of a comparison product, and a share of the comparison product is determined in a case that the comparison product is changed according to one or more of the one or more acceptable changes, wherein the determination of the share is based at least on the one or more of the one or more acceptable changes and on preference information associated with a plurality of respondents.

In yet another aspect, one or more acceptable changes are determined corresponding to one or more attribute levels of a comparison product, and, based at least on preference information associated with a respondent, a change in a normalized utility associated with a change in an attribute of the comparison product is determined, wherein the change comprises one or more of the one or more acceptable changes.

According to one aspect, one or more acceptable changes corresponding to one or more attributes of a comparison product are determined, and an amount willing to be paid for one or more of the one or more acceptable changes is determined based on preference information associated with a respondent.

In still another aspect, one or more acceptable changes corresponding to one or more attribute levels of a comparison product are determined, and, for each of a plurality of changes in price of the comparison product, a change in share in a case that the comparison product is changed according to the one or more acceptable changes is determined based on preference information associated with a respondent.

In another aspect, preference information associated with a respondent is determined, attribute levels for one or more comparison products are determined, and a value relating a theoretical optimal product associated with the respondent and one of the one or more comparison products that is most preferred by the respondent is determined based on the preference information and on the attribute levels.

An aspect of the invention provides determination of preference information associated with a respondent, determination of attribute levels of each of one or more client's products and of each of one or more competitor's products, and determination, based on the preference information and on the attribute levels, of a value relating the respondent's preference for the attribute levels of a most-preferred one of the one or more client's products and the respondent's preference for the attribute levels of a most-preferred one of the one or more competitor's products.

In one aspect, preference information associated with a plurality of respondents is determined, attribute levels that are unacceptable are determined for each of the plurality of respondents based on the preference information, and, for an attribute level, a percentage and/or an indication of a number of respondents for whom the attribute level is unacceptable is presented.

In yet another aspect, attribute levels of each of one or more client's products and of each of one or more competitor's products are determined, preference information associated with a respondent for whom at least one of the client's products is preferred over each of the one or more competitor's products is determined, and a value relating the respondent's preference for the at least one of the client's products and the respondent's preference for a most-preferred one of the one or more competitor's products is determined. According to this aspect, the competitor's products may be products of one or more competitors.

According to other aspects, attribute levels of each of one or more client's products and of each of one or more competitor's products are determined, preference information associated with a respondent for whom at least one of the competitor's products is preferred over each of the one or more client's products is determined, and a value relating the respondent's preference for the at least one of the competitor's products and the respondent's preference for a most-preferred one of the one or more client's products is determined.

In other aspects, preference information associated with a plurality of respondents is determined, the preference information including preference information for a plurality of brands, one or more of the plurality of respondents for whom a first brand is a most-preferred brand is determined based on the preference information, and a value relating preferences of the one or more respondents for a second brand and preferences of the one or more respondents for the plurality of brands is determined.

In still another aspect, preference information associated with a plurality of respondents is determined, the preference information including preference information for a plurality of brands, and values are determined, for each of the plurality of brands, relating preferences of one or more of the plurality of respondents for whom a brand is most-preferred to preferences of the one or more respondents for each of the remaining brands.

According to an aspect, the invention provides the determination of one or more attribute levels of a comparison product, the determination of one or more acceptable changes corresponding to one or more of the determined one or more attribute levels, determination of a cost of the one or more acceptable changes, determination of a willingness to pay for the one or more acceptable changes based on preference information associated with a respondent, and determination of a value representing a change in margin in a case that the comparison product is changed according to the one or more acceptable changes, based at least in part on the cost and the willingness to pay.

Embodiments of each of the above aspects of the invention and benefits thereof will be described in detail below. Moreover, features additional to each aspect will be described below which are themselves believed to be unique and advantageous. A more complete understanding of the nature of the invention can therefore be obtained by referring to the following detailed description and to the drawings appended hereto.

BRIEF DESCRIPTION OF THE DRAWINGS

FIG. 5 is a representative view of a tabular portion of a preference information database according to embodiments of the present invention.

FIG. 6 is a representative view of a tabular portion of a product database according to embodiments of the present invention.

DETAILED DESCRIPTION

Figure 1:
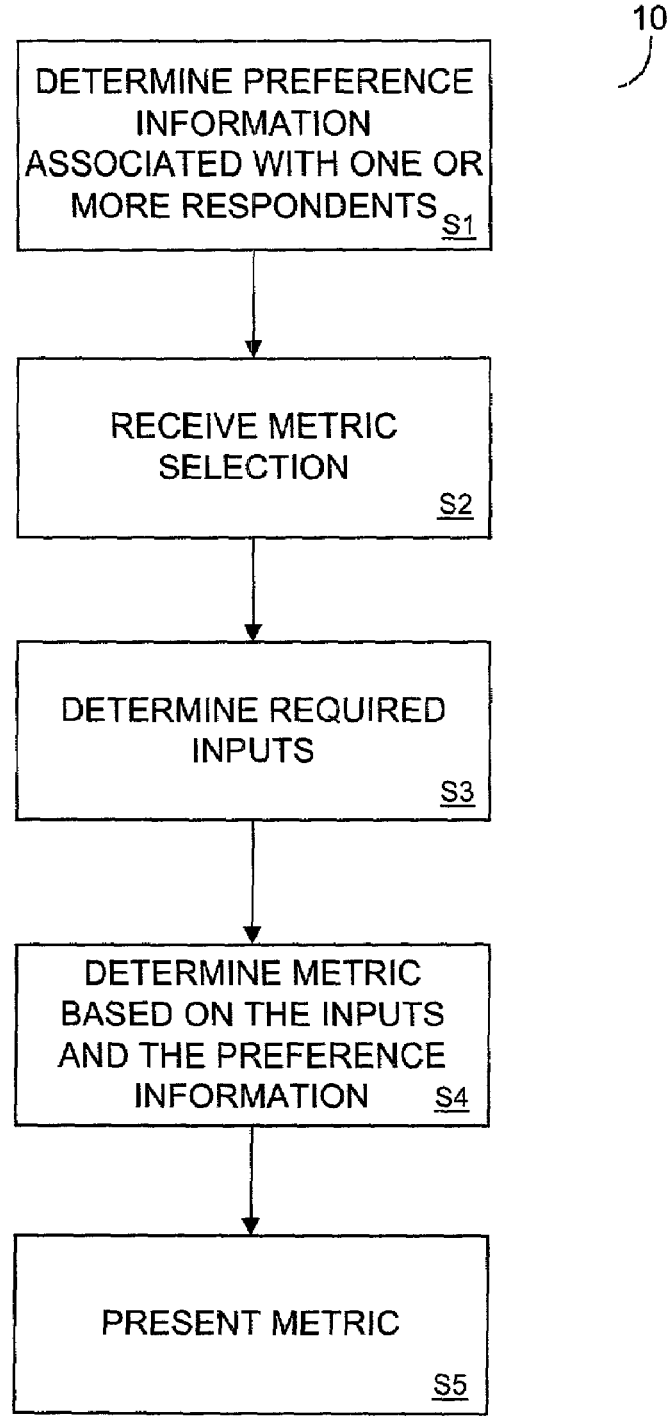
FIG. 1 is a flow diagram of process steps to process preference information according to embodiments of the present invention.

FIG. 1 is a flow diagram of process steps 10 according to embodiments of the invention. Process steps 10 will be described briefly below in the interest of providing an immediate introduction to features of the present invention. Accordingly, process steps 10 will be described later with respect to more specific examples and specific hardware and software embodiments, along with details of alternative embodiments.

Process steps 10 begin at step S1, in which preference information associated with one or more respondents is determined. The preference information may be determined by retrieving locally- or remotely-stored preference information, by receiving preference information from an external entity or by using a system such as those described in aforementioned U.S. patent application Ser. No. 09/754,612 to generate preference information. In this regard, the generated preference information may be pre-processed according to a system described in U.S. patent application Ser. No. 09/845,051. Of course, other systems to determine preference information may be used in step S1 in accordance with embodiments of the invention, with varying degrees of metric quality resulting therefrom.

After the preference information is determined in step S1, a client maybe presented with a choice of metrics. The client may be any entity desiring preference information-based metrics, including manufacturers, wholesalers, retailers, and market analysts. Moreover, the presented metrics may include one or more of: impact of change in attribute on change in share; impact of change in attribute on share; impact of change in attribute on change in normalized utility; willingness to pay; relation of price and share, given a change in an attribute; gap analysis; gap with competition; unacceptable attribute levels; vulnerability; clout; brand favorability; brand vulnerability; and change in margin due to acceptable change in comparison product. Descriptions of each of these metrics are set forth below. An employee or representative of the client selects a metric and the selection is received in step S2.

Next, in step S3, inputs that are required for determination of the selected metric are determined. It should be noted that the required inputs may vary from metric to metric. Accordingly, the determination of step S3 comprises both identifying the types of inputs that are required for determination of the metric and also generating the actual inputs. The types of inputs may include information specifying respondents who the metric should reflect, attributes and attribute levels of the client's products and/or the client's competitors' products, acceptable changes to the client's products and/or to the competitors' products, as well as other information described below. Accordingly, the actual inputs may be generated by receiving all or a portion of the inputs from the client, from one or more competitors of the client, from a data repository, from local storage, from a respondent, or from another entity, and/or by calculating the inputs from received information.

In step S4, the selected metric is determined based on the inputs and on the determined preference information. Detailed steps for determining each of the above-listed metrics are described below and illustrated in the appended flow diagrams. It will be noted that the metrics described herein may be determined in more than one manner. Additionally, several of the metrics may be determined with respect to one or more respondents, one or more attributes, and/or one or more attribute levels.

The determined metric is presented to the client in step S5. The determined metric may be presented in any manner, including by transmitting a graph, chart or other indication of the metric to a client device in electronic format, by displaying such a graph, chart or indication on a device, or by sending a hardcopy of the graph, chart or indication to the client. Of course, the metric may be presented in step S5 to an entity other than the entity from whom the selection was received in step S2. Also, an entity performing steps 10 may both input the selection and be presented with the metric.

Presentation of the metric may occur in many forms, many of which are illustrated by the attached figures. As a general example, a metric that was determined with respect to each of a plurality of respondents may be presented so as to indicate the mean or a distribution of the metric across the plurality of respondents. Also, a metric may be determined with respect to each of a plurality of attributes or attribute levels, with the presentation in step S5 including presentation of the mean or distribution of each determined metric. Of course, various combinations of these presentation systems may also be employed.

It should be noted that process steps 10 need not be performed in the order illustrated. For example, step S1 may be executed after the required inputs are determined in step S3. Advantageously, such an arrangement could avoid the determination of non-required preference information, if any. In some embodiments, some or all required inputs are determined between steps S4 and S5, rather than in step S3. Also, in some embodiments, individual metrics are determined for a respondent as soon as preference information for the respondent is received. These metrics are stored and retrieved to determine requested aggregate metrics.

Network Architecture

Figure 2:
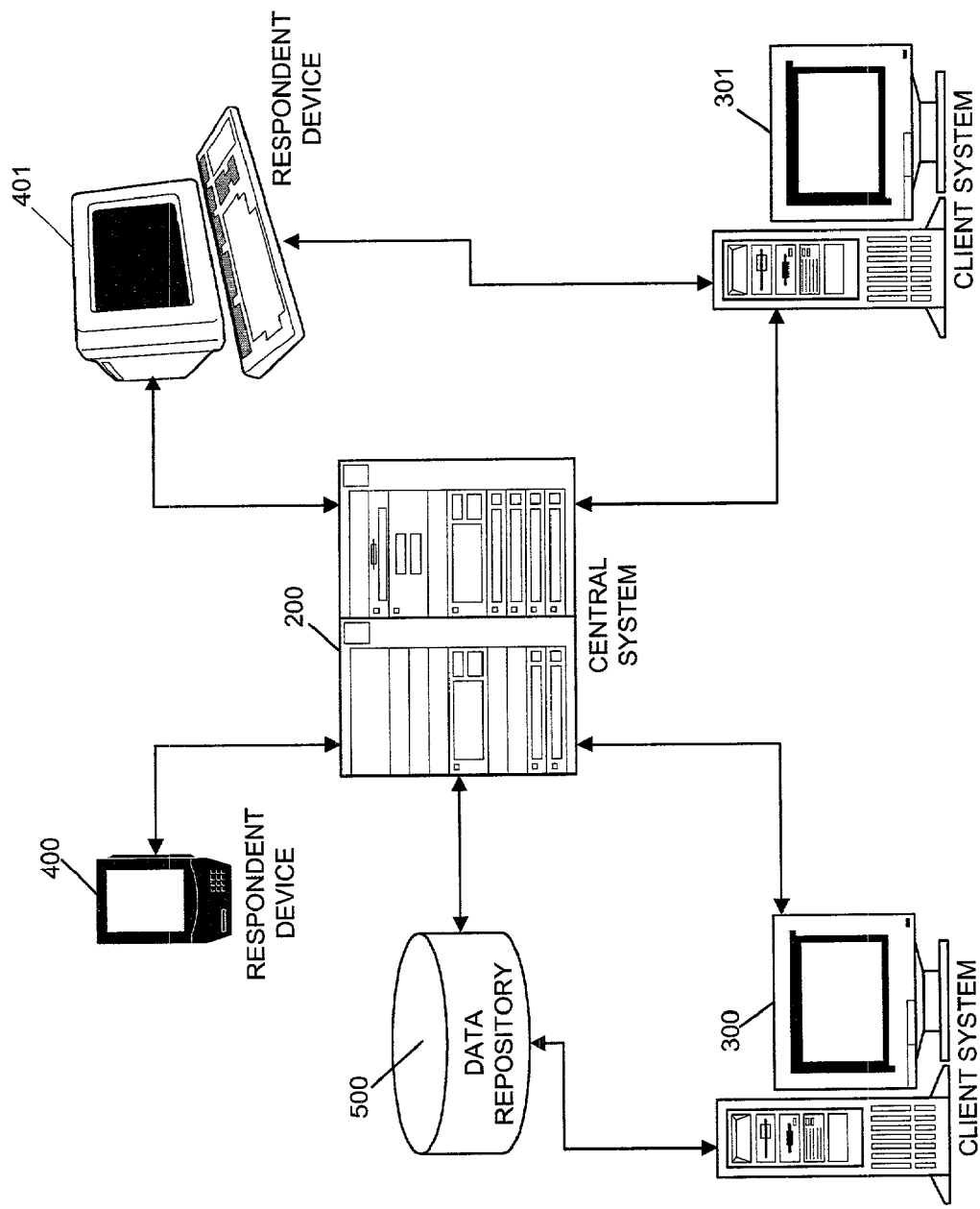
FIG. 2 is a topographic view of a network architecture according to embodiments of the present invention.

FIG. 2 is a topographic view of a network architecture according to embodiments of the present invention. Of course, many other architectures may be used to implement the invention. Shown in FIG. 2 is central system 200, depicted as a mainframe computer. Central system 200 may be used to perform, for example, process steps 10 in order to process preference information according to embodiments described herein. Central system 200 may be operated by a company, such as assignee Blue Flame Data, Inc., providing valuable market data to manufacturers and/or other types of clients. It should be noted that many other types of computing hardware may be used to perform the functions of central system 200 described herein, including, but not limited to, a server, a workstation, a network, or any combination of one or more of the foregoing. Further details of central system 200 are set forth below with respect to FIG. 3.

In communication with central system 200 are client systems 300 and 301. Client systems 300 and 301 may be used to perform any functions required by a client, including scheduling, inventory tracking, billing, accounting, etc. Client systems 300 and 301 may also operate to transmit attributes and attribute levels for given products, preference information, and requests for metrics to central system 200. Of course, central system 200 may receive these transmissions from other sources as well. Metrics are presented to client systems 300 and 301 by central system 200 over a communication link (e.g., the Internet), and the metrics may in turn be presented to a client. Any suitable device may be used as client systems 300 and 301, including but not limited to a workstation, a mainframe computer, and a computer terminal.

Data used to determine preference information may be transmitted to and/or received from respondents through respondent devices 400 and 401. In one example, central system 200 embodies a system such as that disclosed in U.S. patent application Ser. No. 09/754,612 to produce preference information by transmitting questions to and receiving responses from respondents. However, such data may be transmitted to and received from a respondent device by a client system, such as client system 301. In some embodiments, metrics may be requested by and presented to a respondent through respondent devices 400 and 401 by central system 200 or by a client system.

As shown, respondent devices 400 and 401 respectively comprise a personal digital assistant and a workstation. However, respondent devices 400 and 401 may include any device capable of presenting information, visually and/or aurally, and of transmitting information to an external device. Of course, respondent devices 400 and 401 should be able to communicate with the device or devices with which they are in communication over whatever types of network media exist between the devices.

Data repository 500 stores information usable by central system 200 in accordance with the processes described herein. The information may include preference information, product information including product attributes and attribute levels, respondent demographic information, and process steps executable to determine and/or present a metric. The information may be received by data repository 500 from other sources or may be generated, in whole or in part, by data repository 500.

Although the connections illustrated between the components of FIG. 2 appear dedicated, it should be noted that each of the connections may be shared by other components. Moreover, the connections may comprise one or more of a local area network, a wide area network, a virtual private network, a telephone network, a cellular network, a fiber-optic network, a satellite network, an infra-red network, a radio frequency network, or any other type of network which may be used to transmit information between devices. The information may be transmitted using any current or future protocol for transmitting information over the appropriate network. Additionally, the devices shown as in communication with other devices need not be constantly exchanging data, rather, the communication may be established when necessary and severed at other times or always available but rarely used to transmit data.

Central System

Figure 3:
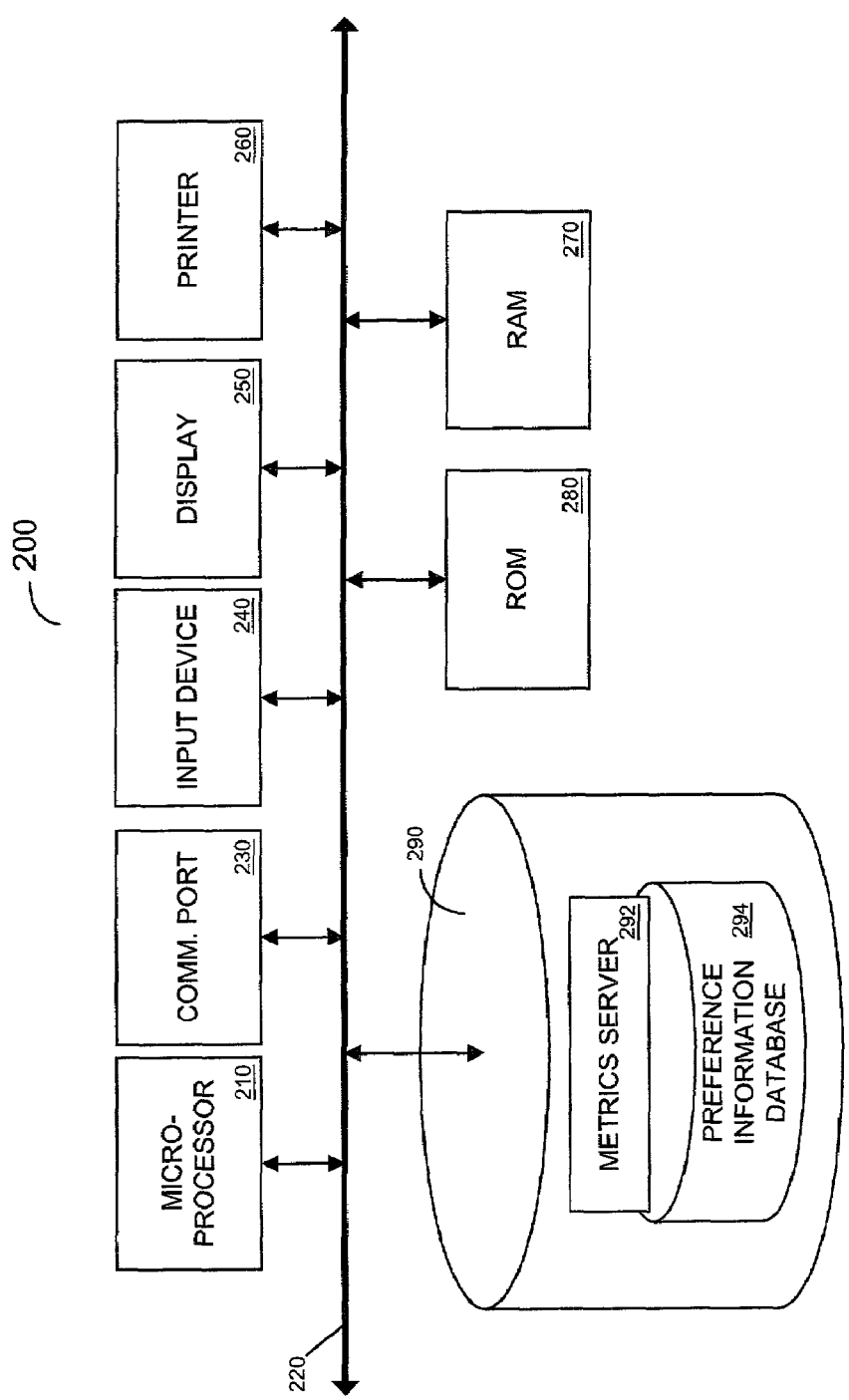
FIG. 3 is a block diagram of an internal architecture of a central system according to embodiments of the present invention.

FIG. 3 is a block diagram of the internal architecture of central system 200 according to embodiments of the invention. As illustrated, central system 200 includes microprocessor 210 in communication with communication bus 220. Microprocessor 210 may be a Pentium™, RISC™-based, or other type of processor and is used to execute processor-executable process steps so as to control the components of central system 200 to provide desired functionality.

Also in communication with communication bus 220 is communication port 230. Communication port 230 is used to transmit data to and to receive data from external devices. Communication port 230 is therefore preferably configured with hardware suitable to physically interface with desired external devices and/or network connections. In one embodiment, requests for metrics are received from and metrics are presented over communication port 230.

Input device 240, display 250 and printer 260 are also in communication with communication bus 220. Any known input device may be used as input device 240, including a keyboard, mouse, touch pad, voice-recognition system, or any combination of these devices. Input device 240 may be used by an operator to input product-related information such as attributes and attribute levels, preference information, billing and transaction information, and commands to central system 200. In this regard, a command may be input to central system 200 to present a chart to a client.

Such a report may be output to display 250, which may be an integral or separate CRT display, flat-panel display or the like. Display 250 is used to output graphics and text to an operator in response to commands issued by microprocessor 210. Printer 260 is also an output device, but produces a hardcopy of data using ink-jet, thermal, dot-matrix, laser, or other printing technologies.

RAM 270 is connected to communication bus 220 to provide microprocessor 210 with fast data storage and retrieval. In this regard, processor-executable process steps being executed by microprocessor 210 are typically stored temporarily in RAM 270 and executed therefrom by microprocessor 210. ROM 280, in contrast, provides storage from which data can be retrieved but to which data cannot be stored. Accordingly, ROM 280 is used to store invariant process steps and other data, such as basic input/output instructions and data used during system boot-up or to control communication port 230.

Data storage device 290 stores, among other data, processor-executable process steps of metrics server 292. According to some embodiments, the process steps of metrics server 292 may be read from a computer-readable medium, such as a floppy disk, a CD-ROM, a DVD-ROM, a Zip disk, a magnetic tape, or a signal encoding the process steps, and then stored in data storage device 290. Microprocessor 210 executes instructions of server 292 to cause central system 200 to operate in accordance with the process steps described in detail herein. Of course, metrics server 292 need not include process steps to determine each metric described below.

Also included in metrics server 292 may be processor-executable process steps to provide a World Wide Web server. Such a Web server would allow central server 200 to communicate with devices executing a Web client (e.g., client devices 300 and 301 and respondent devices 400 and 401) over the World Wide Web.

Metrics server 292 may be stored in data storage device 290 in a compressed, uncompiled and/or encrypted format. In alternative embodiments, hard-wired circuitry may be used in place of, or in combination with, processor-executable process steps for implementation of the processes of the present invention. Thus, embodiments of the present invention are not limited to any specific combination of hardware and software.

Also stored in data storage device 290 is preference information database 294. Preference information database 294 includes preference information associated with a plurality of respondents. As described above, the stored preference information associated with one or more respondents may be used to determine metrics. Usage of preference information database 294 is described in detail below.

Data storage device 290 also includes elements that may be necessary for operation of central system 200, such as other applications, data files, an operating system, a database management system and "device drivers" for allowing microprocessor 210 to interface with devices in communication with communication port 230. These program elements are known to those skilled in the art, and are therefore not described in detail herein.

Client Device

Figure 4:
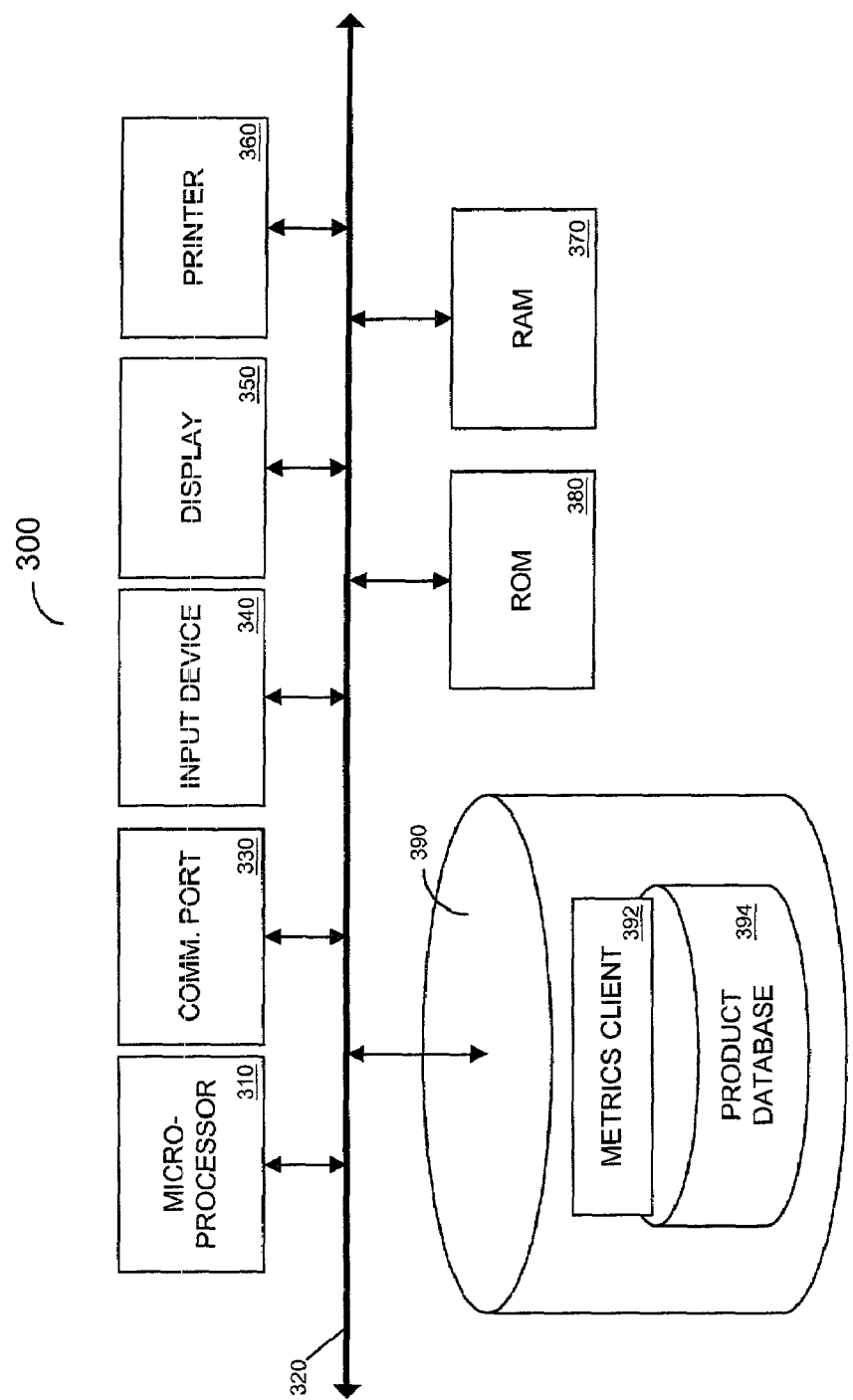
FIG. 4 is a block diagram of an internal architecture of a client system according to embodiments of the present invention.

FIG. 4 illustrates several components of client system 300 according to some embodiments. The components may comprise any of the specific examples set forth above with respect to identically-named components of central system 200. Of course, specific functions performed by the components may differ from the functions performed by the identically-named components.

In this regard, communication port 330 may be used to transmit requests for metrics to central system 200 and to receive presented metrics therefrom. Input device 340 may be used to input product information, to establish communication with central system 200, and to transmit a request for metrics to central system 200. Received data presenting a metric may be output by display 350 or by printer 360. Input device 340, display 350 and printer 360 may also be used in conjunction with functionality provided by client system 300 that is unrelated to the present disclosure.

Data storage device 390 stores process steps of metrics client 392, which is executed by microprocessor 310 to perform the steps attributed to client system 300 herein. Metrics client 392 may also include process steps of a Web client such as a Web browser that may be used to transmit and receive data over the Web. The latter feature is useful in a case that the invention is embodied in a Web-based system.

Also stored in data storage device 390 is product database 394. Product database 394 includes information relating to products of interest to the entity operating client system 300. For example, the products may be made or sold by the entity or by one or more competitors. The information includes attributes and attribute levels of the products, and may be obtained via input device 340 or from another device, such as data repository 500.

Data storage device 390 may also store application files, data files and system files other than those shown in FIG. 4. These files may be used by client system 300 to provide various functionalities to a client in addition to those described herein.

Preference Information Database

A tabular representation of a portion of preference information database 294 is shown in FIG. 5. The information stored in preference information database 294 may be entered by an operator of central system 200 through input device 240, may be generated by central system 200 using trade-off analysis techniques, and may be received from another device in communication with central system 200. The information specifies, for individual respondents, utilities associated with product attribute levels. As is known in the field of trade-off analysis, a utility associated with a product attribute level represents a respondent's preference for the attribute level.

Identification field 510 of the illustrated tabular representation indicates a respondent and a product associated with the records of the tabular representation. Each record includes two fields, attribute field 512 and attribute level/associated utility field 514. Attribute field 512 specifies an attribute of the product specified in identification field 510, and attribute level/associated utility field 514 specifies attribute levels corresponding to an associated attribute as well as a utility associated with each specified attribute level. The illustrated utilities comprise stabilized and normalized preference information as described in U.S. patent application Ser. No. 09/845,051, but may also comprise unstabilized and normalized preference information, raw preference information or preference information according to any known format. For example, the associated utilities may be currency-normalized and, more specifically, dollar-normalized as described in application Ser. No. 09/845,051.

Some utilities associated with attribute levels in preference information database 294 comprise the symbol "X". This symbol indicates that the associated attribute level is unacceptable to the associated respondent. Stated differently, any product including the associated attribute level would be unacceptable to the respondent. In the present example, the associated respondent would be unwilling to purchase any $65,000 car and any car providing 20 M.P.G.

It should be noted that the information stored in preference information database 294 for a particular product may reflect fewer or more attributes and/or attribute levels than shown in FIG. 5. Furthermore, it is contemplated that preference information database 294 may store information corresponding to a plurality of respondents and to a plurality of products for each respondent. Preference information database 294 may include preference information as shown in FIG. 5 that is associated with a plurality of respondents. This aggregate preference information may be determined by computing an arithmetic mean of preference information associated with each of the plurality of respondents or in another manner. In such a case, identification field 510 also indicates the plurality of respondents.

Product Database

FIG. 6 illustrates a tabular representation of a portion of product database 394. As described above, the information stored in product database 394 specifies attributes and attribute levels of particular products. It should be noted that an attribute level may comprise any value that may be associated with a particular attribute. The information may be entered by an operator of client system 300 through input device 340 or may be received from another device. The particular products may include existing or hypothetical products made or sold by the entity operating client system 300, made or sold by one or more competitors, or otherwise of interest to the entity.

Specifically, product database 394 includes several records and associated fields. The fields include product category field 610, product field 620, horsepower field 630, miles per gallon (M.P.G). field 640, color field 650, brand field 660, price field 670, client product flag field 680 and existing product flag field 690. Product category field 610 specifies the type of products represented in the portion of database 394, and product field 620 of a record specifies an identifier of a product associated with the record. The remaining fields of the particular record specify attribute levels of the product, whether the product is a product of the client (otherwise the product may be considered a product of a competitor) and whether the product is an existing product (otherwise the product may be considered a future and/or hypothetical product).

As will be understood by those skilled in the art, the tabular representations and accompanying descriptions of the databases merely represent relationships between stored information. A number of other arrangements may be employed besides those shown. Similarly, the entries of the tabular representations represent sample information only; those skilled in the art will understand that a number and content of the entries may differ.

Determination of Metrics

The determination of each metric is described below with respect to a corresponding flow diagram.

Impact of Change in Attribute on Change in Share

Figure 7:
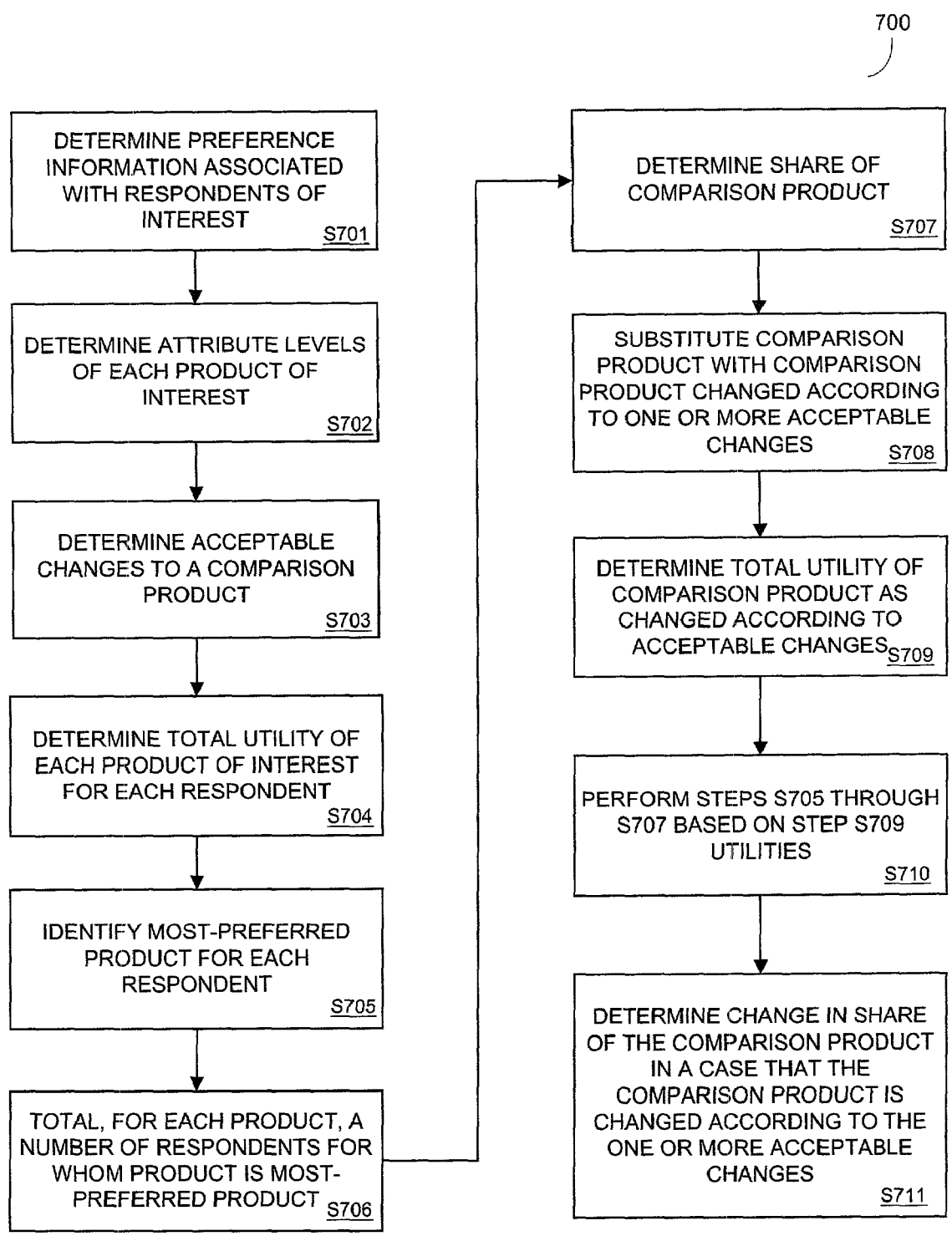
FIG. 7 is a flow diagram of process steps to process preference information according to embodiments of the present invention.

FIG. 7 is a flow diagram of process steps 700 according to one embodiment for determining the metric "impact of change in attribute on change in share". Although process steps 10, process steps 700 and the other process steps described herein are described as being performed by central system 200 through execution of processor-executable process steps of metrics server 292 by microprocessor 210, the process steps may also be performed, in whole or in part, by one or more of central system 200, client devices 300 and 301, respondent devices 400 and 401, other devices, and manual means.

This particular metric is intended to reflect the sensitivity of a share with respect to a change to one or more attributes of the product. Typically, a client is interested in modifying a particular proposed product or existing product (referred to herein as the comparison product) in order to increase a market share and/or sales of the product. Such modifications may also attempt to anticipate effects of possible changes to competing products of a competitor. Accordingly, this metric is determined based on attribute levels of products defining the market, the contemplated modifications (referred to as acceptable changes) to the comparison product, and preference information associated with respondents of interest. This metric may also be used to indicate the relative importance of some or all of a product's attributes. Moreover, the metric may be calculated so as to indicate a change in share of more than one comparison product due to changes to the more than one comparison product.

Prior to process steps 700, a request for the present metric is received from client system 300. In response, preference information associated with respondents of interest is determined in step S701. As mentioned above with respect to step S1 of process steps 10, preference information may be determined in step S701 using the techniques described in U.S. patent application Ser. No. 09/754,612 or using conventional techniques for determining preference information associated with respondents. The preference information may also be determined simply by receiving the preference information from any source, such as data repository 500, or by retrieving stored preference information from preference information database 294.

The respondents of interest may comprise all respondents for whom preference information is available, or may be a set of respondents defined according to any criteria, such as demographics, purchasing history, time period/order in which preference information was obtained, or the like. In some embodiments, respondents of interest are those associated with preference information indicating one or more traits, such as preference for a particular attribute level or product. In these embodiments, preference information is analyzed in step S701 to determine if the associated respondent is of interest. Criteria for determining the respondents of interest may be received from client system 300 along with the request for the present metric prior to process steps 700.

Next, in step S702, attribute levels of each product of interest are determined. The attribute levels are determined by initially identifying the products of interest. As mentioned above, the products may include those products comprising a relevant market or part of a relevant market to be analyzed. These products may include one or more of the client's products and competitors' products. Once the products are identified, attribute levels of the products are determined by retrieving the attribute levels from sources such as data storage device 290, by requesting and receiving the attribute levels from other sources such as data repository 500 and product database 394, and/or by generating the attribute levels from other available product information, such as information received from an operator of client device 300. The determination of step S702 also includes determination of a comparison product, which may also be specified by client system 300 along with the request for the metric.

Acceptable changes to the comparison product are determined in step S703. The acceptable changes may also be received from client system 300 along with the request for the metric. According to some embodiments, an acceptable change is a change in an attribute of the comparison product. Advantageously, an acceptable change need not be a change from a most-preferred attribute level to a least-preferred attribute level or vice-versa, but may comprise a change from one attribute level to any other attribute level, with resulting metrics sometimes differing depending on the original and changed attribute levels. For a continuous attribute, such as M.P.G., an acceptable change may be a relative increase or decrease in an attribute level of the attribute, such as +5 M.P.G. For discontinuous attributes, such as color, an acceptable change may be a change to a particular attribute level. Although each metric described herein may be determined with respect to one or more acceptable changes, the flow diagrams used herein to describe the determination of metrics concern one acceptable change.

In step S704, a total utility for each product of interest is determined for each respondent. Specifically, for each respondent, utilities associated with each attribute level of a product of interest may be summed to determine, for each respondent, a total utility associated with the product. This process is repeated for each product of interest, including the comparison product. For some continuous attributes, an attribute level of a comparison product as changed according to an acceptable change might not reflect an attribute level for which a corresponding utility is known. In this case interpolation may be used to determine a utility for the reflected attribute level.

Next, a most-preferred product is identified for each respondent in step S705 by identifying, for each respondent, a product that the respondent associates with a highest total utility. In step S706, a total is generated for each product of interest reflecting a number of respondents for whom the product was identified in step S706 as most-preferred. These totals are then used in step S707 to determine a share of the comparison product. As a simple illustration, it is assumed that products A, B, C and D are of interest, with product A being the comparison product. Corresponding totals determined in step S706 are as follows: A=100; B=25; C=75; D=200. Therefore, the share of the comparison product determined in step S707 is 100/(100+25+75+200)=25%. As can be seen from this example, the share of each product of interest is determined in step S707 according to some embodiments.

The comparison product is substituted with the comparison product as changed according to one or more of the acceptable changes in step S708. That is, the attribute levels of the comparison product are changed according to one or more of the acceptable changes. Next, in steps S709 and S710, the processes of steps S704 through S707 are repeated for the new set of products of interest, which are identical to the original products of interest except for the changed comparison product. Accordingly, after step S710, a share of the changed comparison product has been determined.

A change in share of the comparison product in a case that the comparison product is changed according to the one or more acceptable changes is determined in step S711. The change in share may be determined by subtracting the share determined in step S707 from the share determined in step S710. In a case that a share of each product of interest was determined in step S707, a change in share of each of these products may also be determined in step S711.

Of course, the present metric may be determined differently than described above. For example, steps S701 to S703 may be performed in a different order, and the specific manner in which each step is performed may differ across embodiments. In some embodiments, determination of a most-preferred product of a respondent in step S705 includes an analysis of whether a product includes an attribute level that is unacceptable to the respondent. If so, the product cannot be considered a most-preferred product of the respondent, regardless of a total utility to the respondent of the product's acceptable attribute levels. This feature provides, in some instances, a more accurate metric than would otherwise be obtained.

Figure 8A:
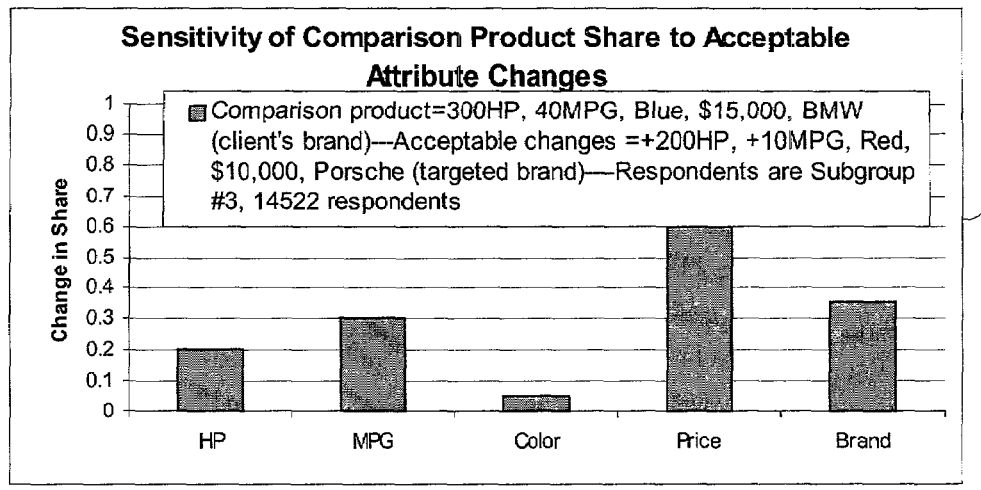
FIGS. 8a through 8g comprise representative views of graphics presenting a metric according to embodiments of the present invention.

FIG. 8a is a view of presentation 810 illustrating an embodiment of the metric determined according to process steps 700. Presentation 810 illustrates only a change in share of a comparison product, and not changes in share of each product of interest. Presentation 810, as well as the other presentations described herein, may be transmitted to client system 300 by central system 200 after process steps 700. The presentations may be generated by central system 200 or by another device that receives metrics from central system 200. Once received, the presentations may be displayed by display 350 and output in hardcopy form by printer 360.

Presentation 810 illustrates, for each of several attributes, a change in share of a comparison product in a case that the comparison product is changed according to an acceptable change in the attribute. Accordingly, each change in share shown in presentation 810 was determined for one acceptable change to the illustrated comparison product. It should be noted that, for each presentation described herein except those associated with the "relation of price and share, given a change in attribute" metric, the displayed metrics reflect only one acceptable change to an attribute of a comparison product. Each metric may, however, be determined with respect to more than one acceptable change to a comparison product. Moreover, each presentation reflects only one comparison product.

Specifically, presentation 810 indicates how a change in an attribute of a comparison product can affect sales of various products in a market of interest. As shown in FIG. 8a, it is predicted that the specified change in price will have a greater impact on sales of the comparison product than any of the other specified changes to the other attributes.

Figure 8B:
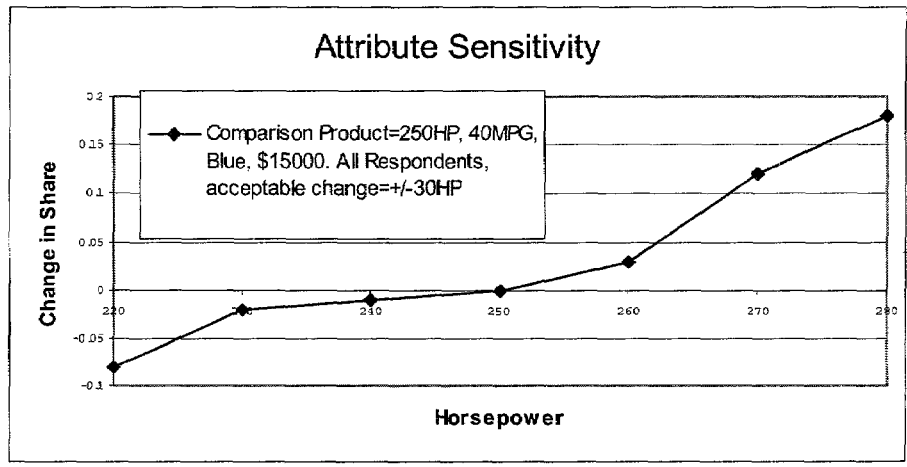

Presentation 820 of FIG. 8b shows changes in share of the comparison product in a case that the comparison product is changed according to each of several incremental changes in an attribute within the range of+/−30 horsepower. Presentation 820 indicates that it may be worthwhile to increase horsepower over 260 HP, but if that is not feasible, improving the comparison product's horsepower will not have much of an impact on the share of the comparison product.

Figure 8C:
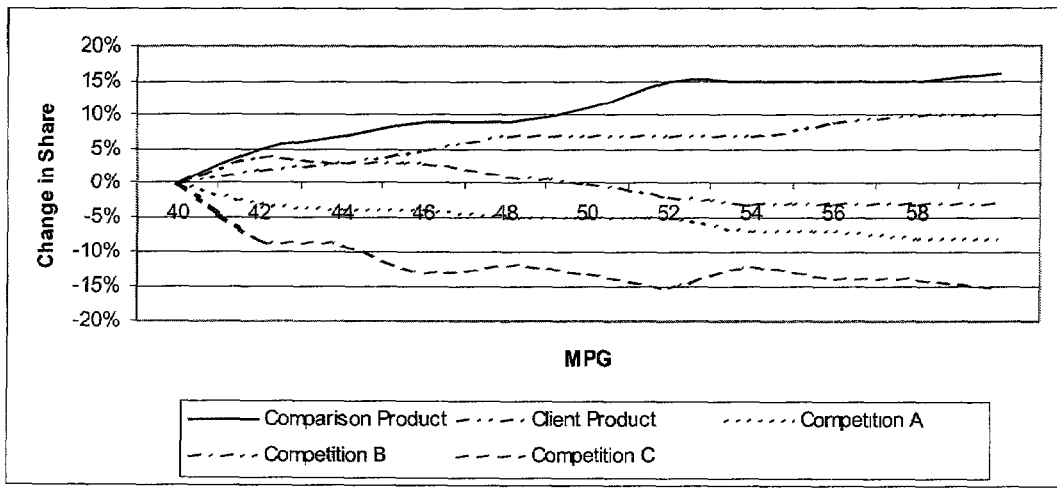

FIG. 8c includes presentation 830, illustrating a change in share of current products over a range of M.P.G. attribute levels. Presentation 830 indicates, among other things, that the change in share of the Competition B product begins to increase and then decreases as the M.P.G. attribute level of the comparison product increases.

Figure 8D:
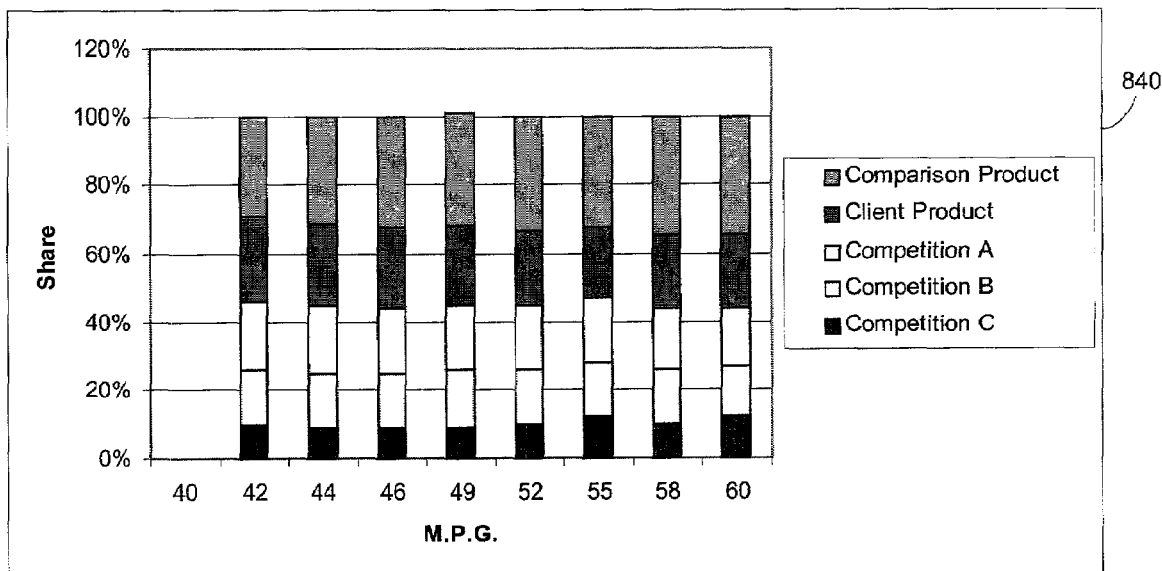
Figure 8E:
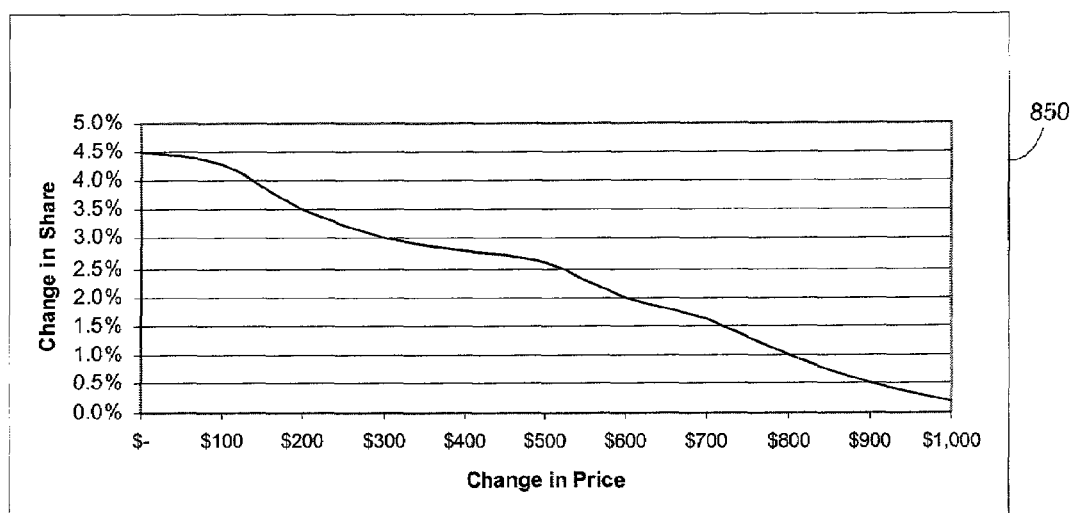

Presentation 840 of FIG. 8d indicates the distribution of shares across all products in a market of interest, for a variety of values of the M.P.G. attribute of the comparison product. FIG. 8e shows presentation 850, which shows a share percentage corresponding to each of several changes to the price attribute of a comparison product. Such a presentation is particularly useful to a client since price is an attribute that can be changed easily and even after a product is manufactured. Presentation 850 of FIG. 8e indicates that a change in price of the comparison product will result in an approximately linear decrease in share of the comparison product.

Figure 8F:
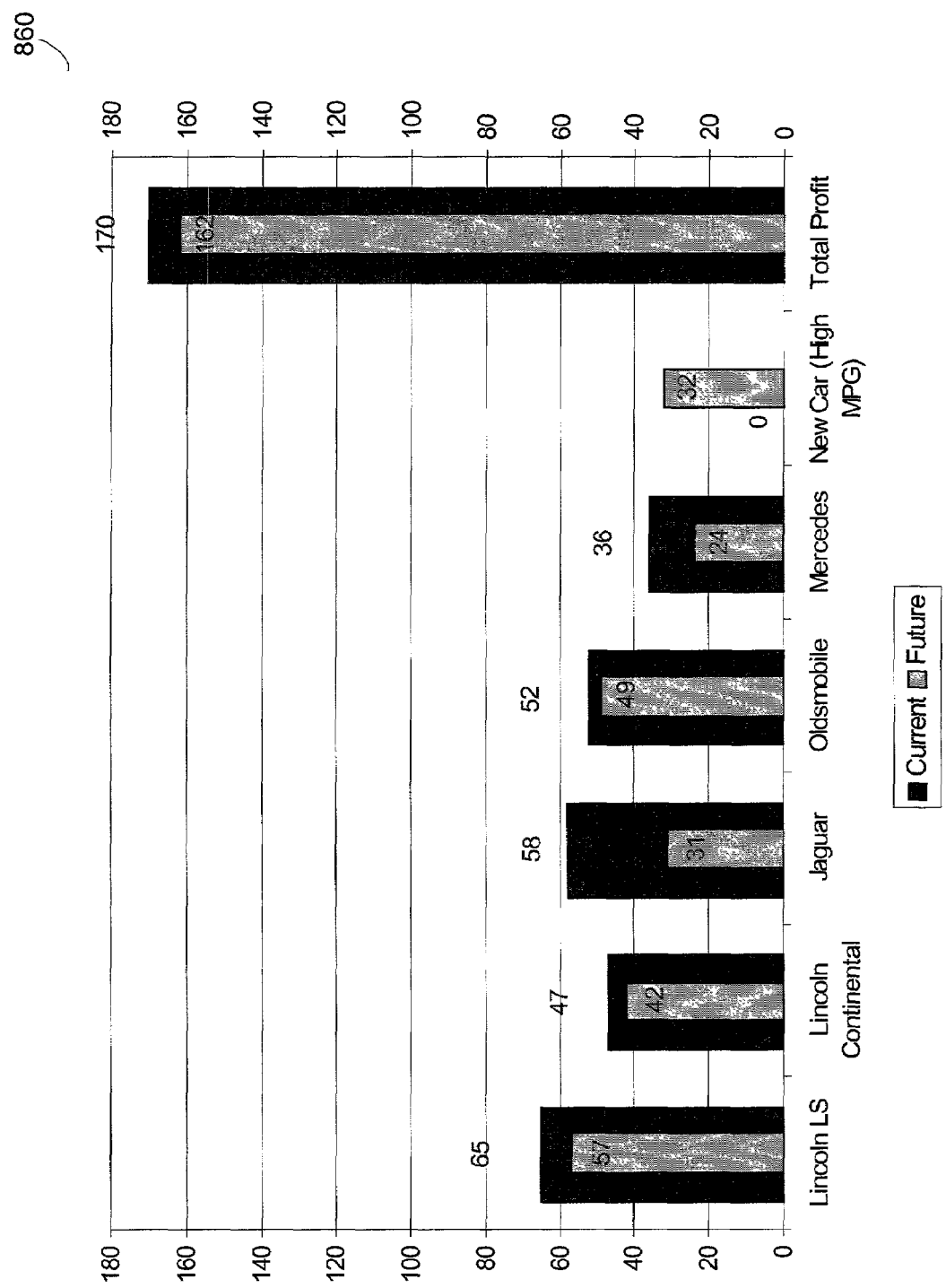

Presentation 860 of FIG. 8f shows a change in profit based on an addition of a new product to a set of products. Specifically, a client considering to offer a new car uses presentation 860 to determine a net effect of the new car on its profitability. Presentation 860 shows that offering the new car would erode profit in the client's other product lines and cause a net decrease in profit to the client. To calculate the profits, a profit margin per sale of each product is determined based on information received from the client or from another source, or by subtracting a cost for a product from a market price of the product. The profit margin of each product is multiplied by the share of the product calculated in steps S707 and S711 (the share before the acceptable change and the share after the acceptable change) and this product is multiplied by the number of respondents used to determine the shares. In some embodiments, respondents for whom all products include an unacceptable attribute level are not included in the determination of share and are therefore not included in the aforementioned number.

Figure 8G:
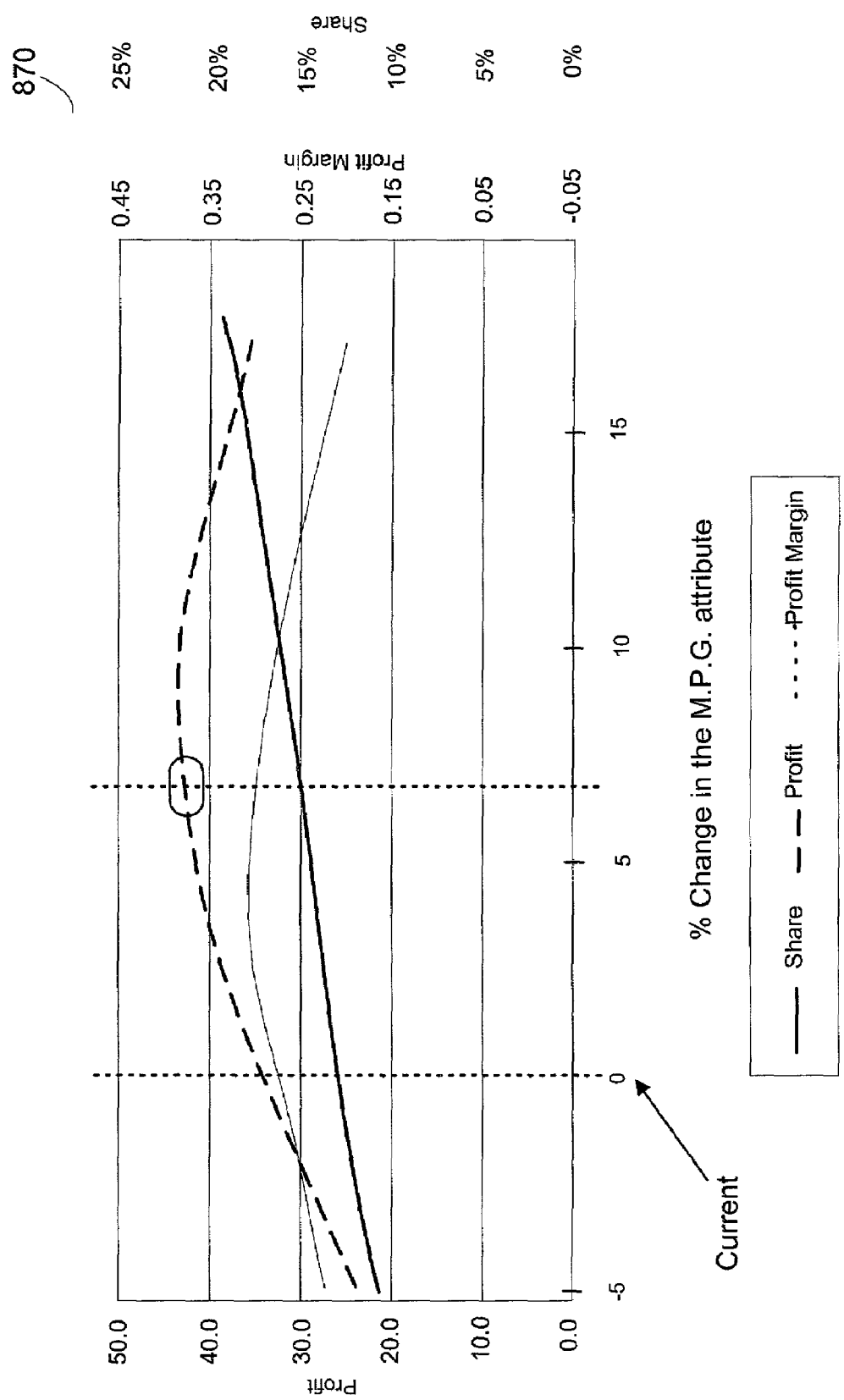
Figure 9:
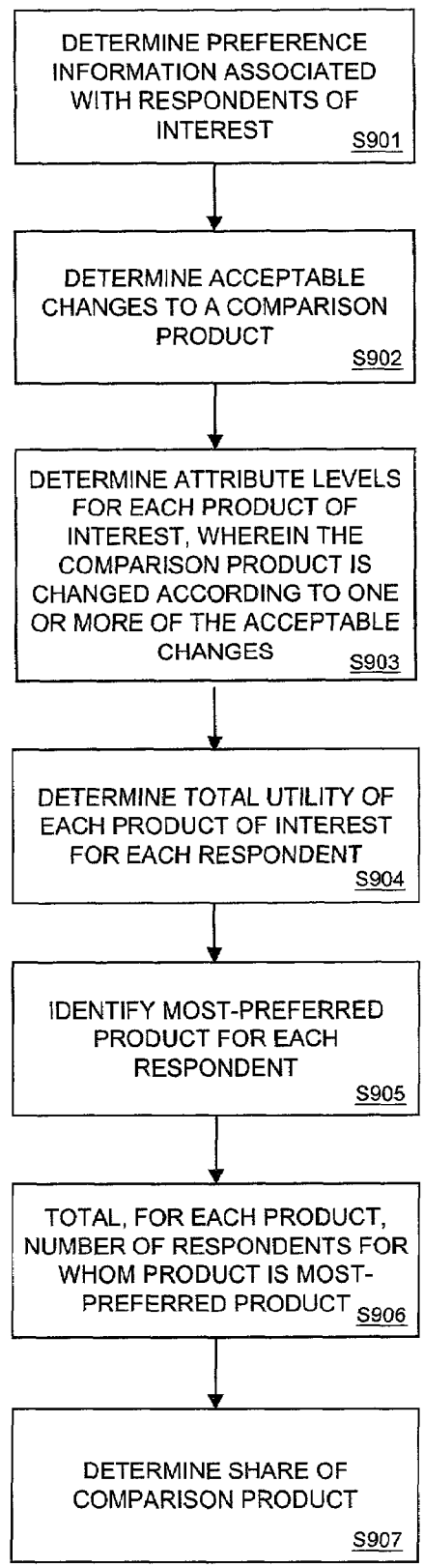
FIG. 9 is a flow diagram of process steps to process preference information according to embodiments of the present invention.

FIG. 8g shows presentation 870. Presentation 870 illustrates a relationship between a share, a total profit and a profit margin per product. Each of these variables may be determined as described above. Presentation 870 is particularly useful to identify an optimal percentage change in a given attribute, with respect to profit. In the illustrated example, the optimal percentage change in M.P.G. is 6.5%.

Although not shown in FIG. 8a through FIG. 8g, each of the presentations may include flags providing information in addition to that shown in the FIGS. For example, an attribute may be flagged if a statistical measurement such as a standard deviation of respondents' utilities associated with the attribute falls outside a specified threshold. The statistical measurement may be presented upon client selection of the flag. Additionally, a flag may be presented if a certain number or percentage of respondents find a particular attribute level unacceptable. Such a flag may be presented adjacent to products including the particular attribute level, and may be selectable by a client to provide the number or percentage to the client.

Impact of Change in Attribute on Share

Process steps 900 provide one embodiment of a determination of the metric "impact of change in attribute on share". This metric is intended to illustrate a percentage of respondents that would select a particular product from a given set of products. Advantageously, the previously-described metric indicates how shares might change based on a change to a product, and the present metric enables a client to learn where a change in share comes from/goes to. Questions that may be answered by this metric include "Does or would the comparison product actually draw customers from the competitors' products?", "To what extent does the comparison product cannibalize sales of the client's other products?", "Which of the competitors' products gain/lose share?", and "How much share do the products gain/lose?".

Prior to process steps 900, as well as prior to any other of the process steps described below, a request for a metric may be received. The request may specify a desired metric and may also include information specifying respondents of interest, preference information, and other required inputs such as one or more comparison products, one or more acceptable changes to the one or more comparison products, and attribute levels of products of interest. Of course, such information may be determined in any other manner, including any of those mentioned herein. According to process steps 900, only one comparison product is specified.

Preference information associated with respondents of interest is determined in step S901, and one or more acceptable changes to a comparison product are determined in step S902. These steps may proceed as described with respect to steps S701 and S703, respectively. Next, in step S903, attribute levels are determined for each product of interest, with the attribute levels of the comparison product being changed according to one or more of the one or more acceptable changes. More particularly, attribute levels are determined for each product of a market of interest, including a comparison product as changed according to one or more of the acceptable changes. As mentioned in relation to step S702, the attribute levels may be determined from sources such as data storage device 290, data repository 500, and product database 394, and/or by generating the attribute levels from other available product information.

A total utility of each product of interest is determined for each respondent in step S904 based on the determined preference information. Next, a most-preferred product is identified for each respondent in step S905 and, for each product, a number of respondents for whom the product is most-preferred is totaled in step S906. Specific details of one embodiment of steps S904 through S906 are set forth with respect to steps S704 through S706 of process steps 700.

A share of the changed comparison product is determined in step S907 by dividing a total number of respondents for whom the changed product is most-preferred by the total number of respondents. Of course, the share may be determined for any one of the products of interest in step S907 by dividing a total number of respondents for whom the one product is most-preferred by the total number of respondents.

As described with respect to steps S706 and S710, determination of a most-preferred product of a respondent in step S905 may include an analysis of whether a product includes an attribute level that is unacceptable to the respondent. If so, the product cannot be considered a most-preferred product of the respondent, regardless of a total utility of the product's acceptable attribute levels to the respondent. Again, this feature may provide a more accurate metric than would otherwise be obtained.

Figure 10A:
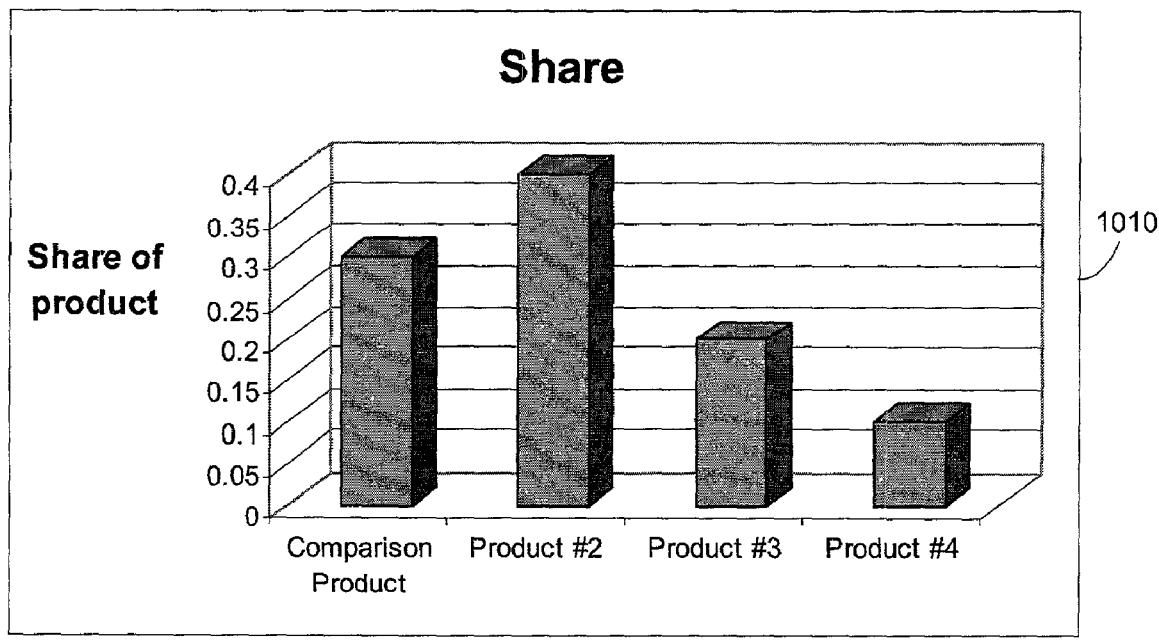
FIGS. 10a through 10d comprise representative views of graphics presenting a metric according to embodiments of the present invention.
Figure 10B:
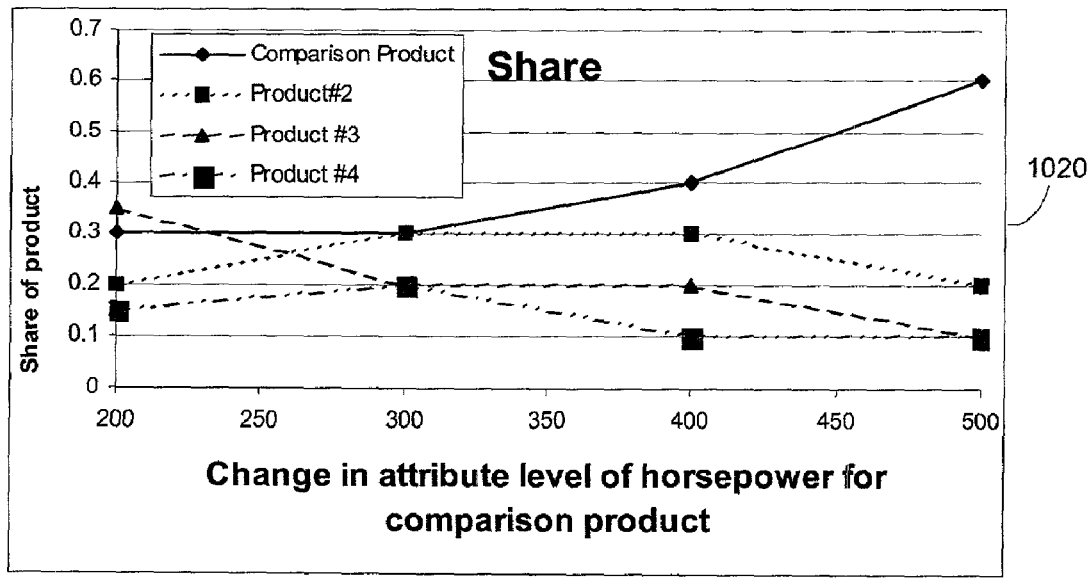

FIG. 10a shows presentation 1010, which illustrates a share of each of a plurality of products, including a comparison product. Presentation 1010 indicates that product #2 would be the most popular product in the market of interest if the comparison product were changed according to a particular set of acceptable changes. Presentation 1020 of FIG. 10b illustrates shares of the plurality of products for each of several incremental acceptable changes to an attribute of the comparison product. FIG. 10b shows that the comparison product becomes the most popular product if its horsepower is raised above 300 HP. To determine the data for creating presentation 1020, process steps S903 through S907 may be repeated for each of the several changes.

Figure 10C:
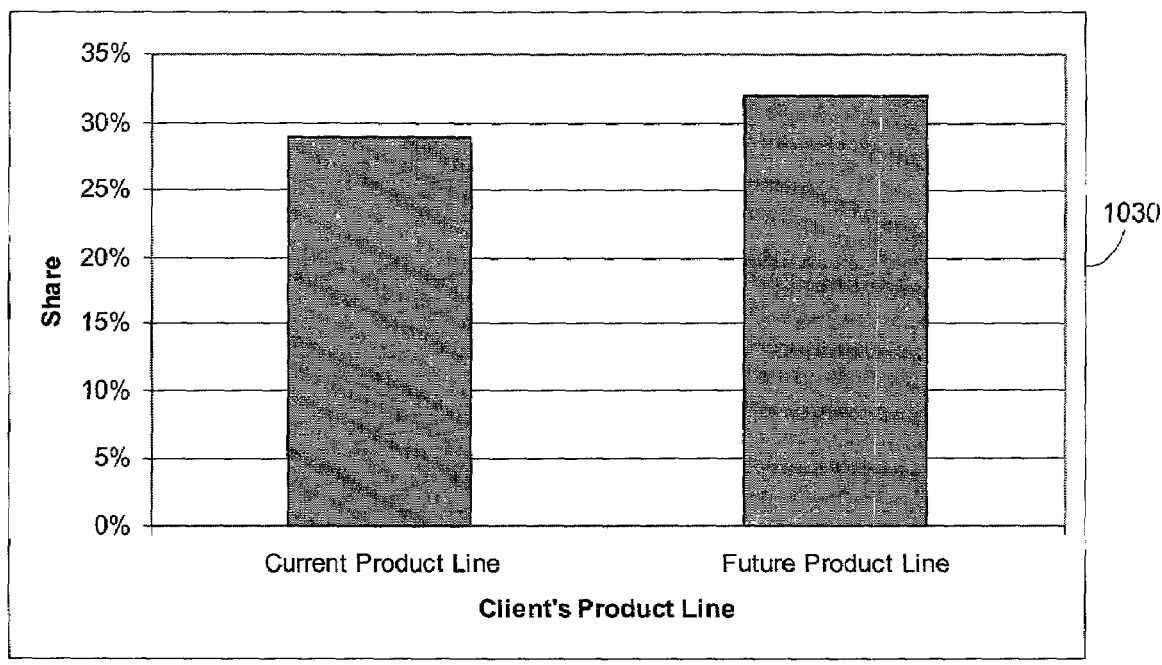

Presentation 1230 of FIG. 10c illustrates share of a client's current product line as compared to share of a client's proposed future product line. Specifically, FIG. 10c indicates that the client's share would increase if the future line replaced the current line. In some cases, modifying a client's product will increase share of the product but decrease share of another of the client's products. Presentation 1230 may be especially useful in these cases because it indicates how a modification will affect a client's total share.

Figure 10D:
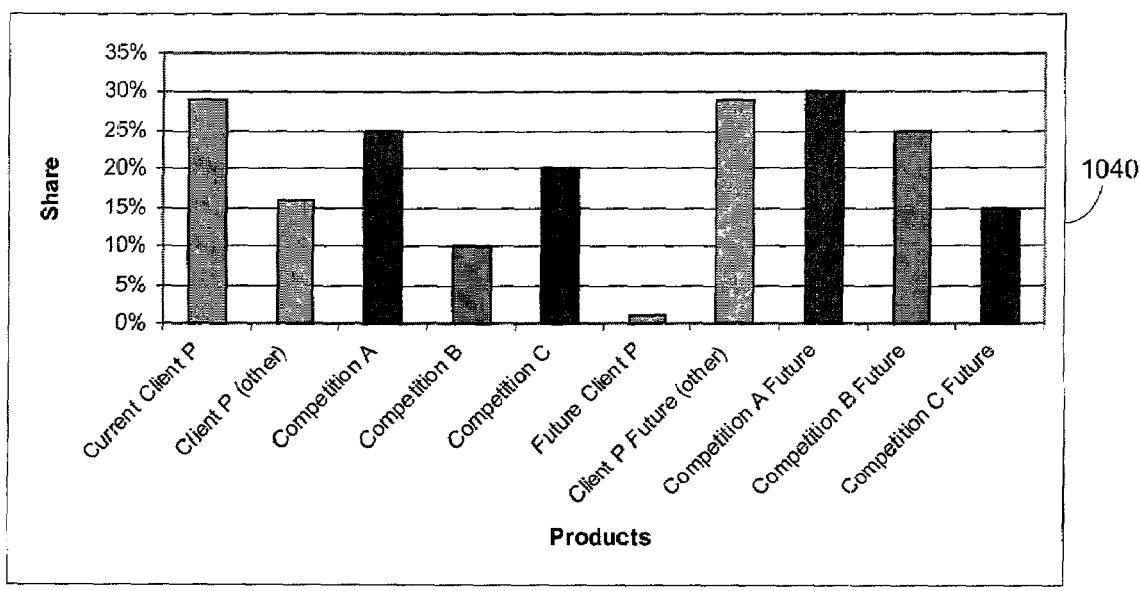

FIG. 10d shows presentation 1040, which indicates shares of all products in a market before and after one or more acceptable changes to one or more of the products. Presentation 1040 shows that current client P holds the current greatest share, but that Competition A. Future would have the highest share if proposed future client and competitor product lines replace the current client and competitor product lines.

The principals of process steps 900 may be used to determine the metrics shown in FIGS. 10c and 10d. Generally, total share of an entity may be determined by summing the shares of all the entity's products, and total future share of the entity may be determined by summing the shares of all the entity's future products. In addition, the flags described with respect to presentations 810 through 830 may be used in any of presentations 1010 through 1040.

Impact of Change in Attribute on Change in Normalized Utility

Figure 11:
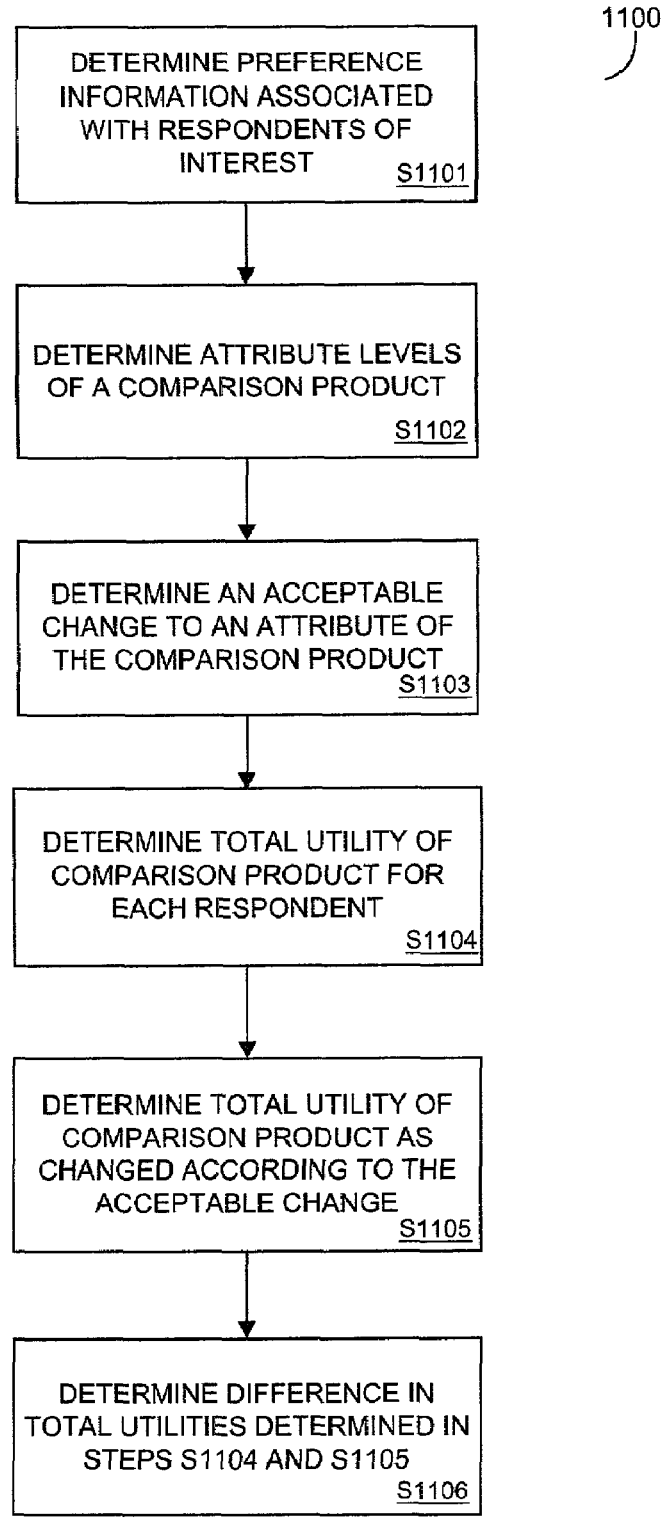
FIG. 11 is a flow diagram of process steps to process preference information according to embodiments of the present invention.

The present metric shows a change in individual or aggregate utility that results from an acceptable change in one or more attributes of one or more comparison products. Process steps 1100 of FIG. 11 set forth one embodiment for determining the metric.

Flow begins at step S1101, in which preference information is determined for respondents of interest. Attribute levels of a comparison product are determined in step S1102, and an acceptable change to an attribute of the comparison product is determined in step S1103. In some embodiments, the respondents of interest must be respondents for whom all attribute levels of the comparison product and of the comparison product as changed according to the acceptable change are acceptable attribute levels. For each respondent of interest, a total utility of the comparison product is determined in step S1104. Next, in step S1105, a total utility of the comparison product as changed according to the acceptable change is determined for each respondent. A difference between the utility determined in step S1104 and the utility determined in step S1105 is determined for each respondent in step S1106, and a mean and/or distribution measure of the determined differences is calculated.

It should be noted that process steps 1100 may be performed with respect to acceptable changes to more than one attribute level. In such a case, the total utility determined in step S1105 is a total utility of the comparison product as changed according to the acceptable changes.

Figure 12A:
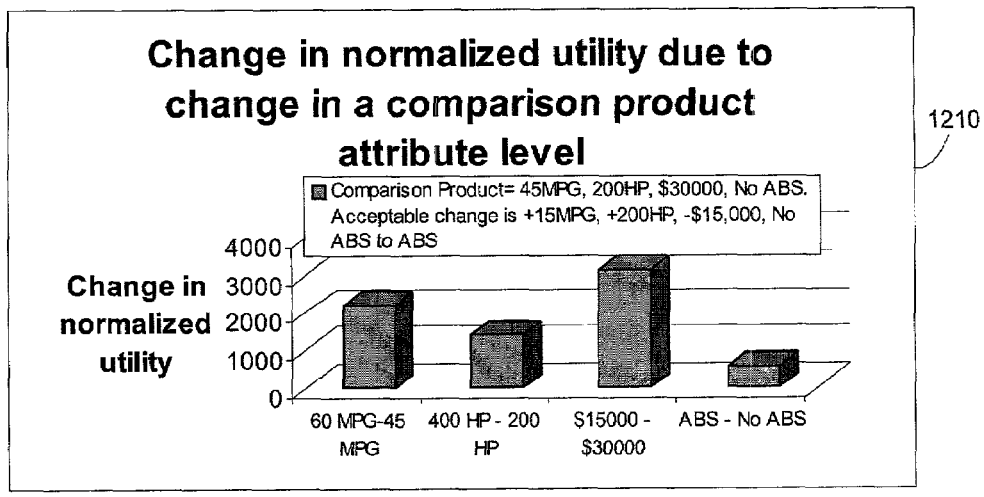
FIGS. 12a through 12f comprise representative views of graphics presenting a metric according to embodiments of the present invention.

FIG. 12a shows presentation 1210, which illustrates a change in utility for each of several changes to a comparison product. Presentation 1210 indicates that the one or more respondents value the specified improvement in price more than the specified changes to the other attributes. It should be noted that each bar in presentation 1210 is associated with a change in utility resulting from a change in a single attribute of a comparison product. Accordingly, to produce presentation 1210, four iterations of process steps 1100 would be performed, with each iteration involving a single change to a different attribute of the comparison product. It should also be noted that presentation 1210 may reflect a single respondent of interest or aggregate utilities of a plurality of respondents. In the case of a plurality of respondents, a product may be flagged if the utilities associated with the product deviate by more than a specified range, if the product includes an attribute level that is unacceptable to a threshold number of respondents, or if some other threshold of interest is exceeded.

Figure 12B:
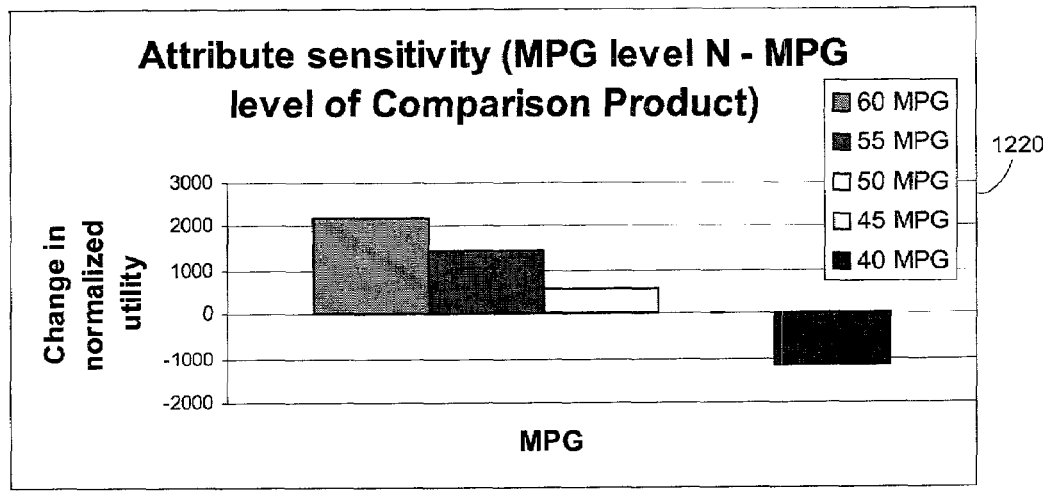

FIG. 12b shows presentation 1220, illustrating a change in utility with respect to a plurality of changes in a single attribute. Presentation 1220 illustrates that improving the M.P.G. attribute level from 45 causes an approximately linear increase in value of the comparison product, and that decreasing the level to 40 results in a sharper decrease in value of the product. To produce presentation 1220, four iterations of process steps 1100 would be performed, with each iteration involving a single change to the single attribute of the comparison product. Again, presentation 1220 may reflect a single respondent of interest or aggregate utilities of a plurality of respondents. The illustrated change in normalized utility corresponding to 45 M.P.G. equals zero because the comparison product includes the attribute level 45 M.P.G.

Figure 12C:
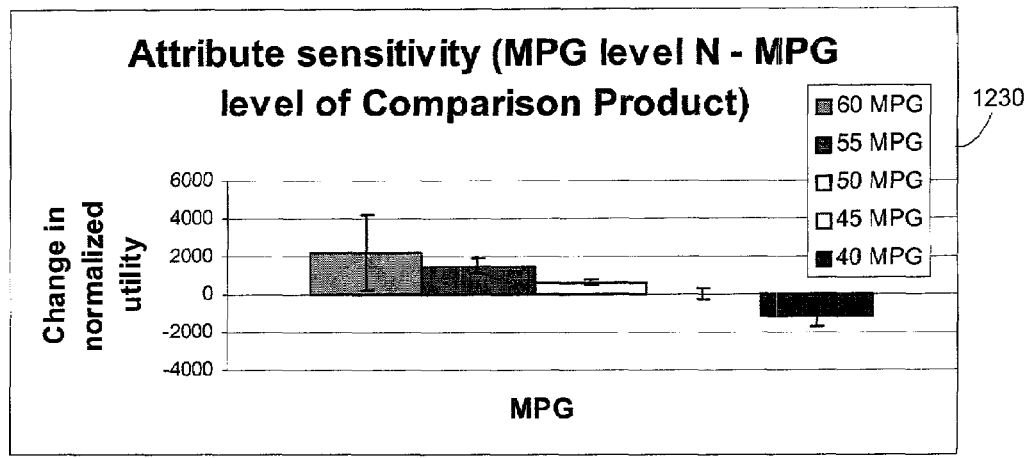

Presentation 1230 of FIG. 12c is similar to presentation 1220, as presentation 1230 indicates a change in utility with respect to a plurality of changes in a single attribute. However, presentation 1230 also indicates, for each change in the attribute, a distribution of the metric over all respondents of interest. Therefore, while a wide bar illustrates an aggregate utility value, superimposed thin bars show a range (e.g., one standard deviation) of respondents' utility values that were used to determine the aggregate value. Presentation 1230 indicates, among other things, that respondents are in relative agreement regarding the value of M.P.G. in the comparison product for values other than 60 M.P.G.

Figure 12D:
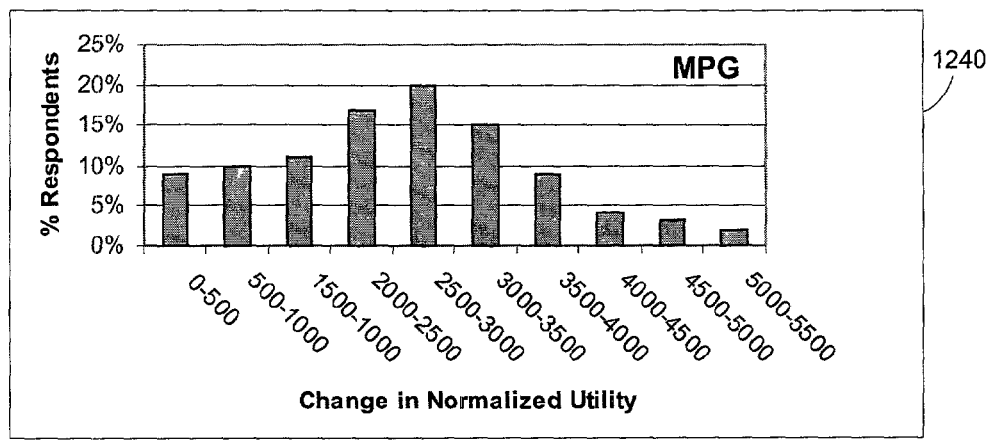

Presentation 1240 of FIG. 12d indicates a percentage of respondents associated with each of a plurality of changes in normalized utility as a result of a particular change to an attribute. Presentation 1240 may be generated using differences, determined in step S1106, in individual respondents' normalized utilities resulting from the particular change. Of course, the particular change may include changes to more than one attribute. In this example, there is a wide, asymmetric distribution of the change in normalized utility indicating that customer reaction would not be uniform if the M.P.G. attribute level of the comparison product were changed as reflected in presentation 1240.

Figure 12E:
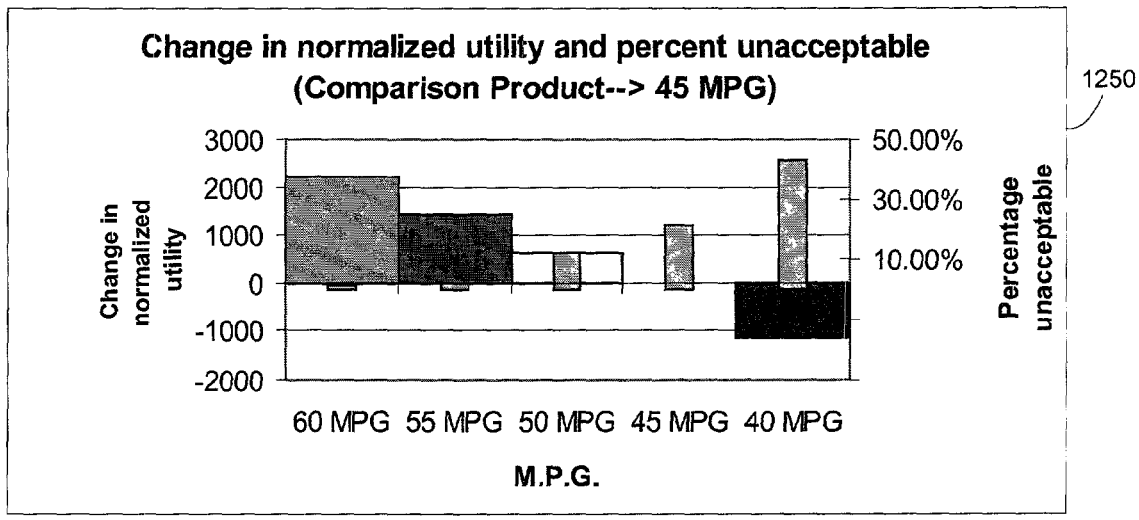

Unacceptable attribute levels are reflected in presentation 1250 of FIG. 12e. Presentation 1250 is similar to presentation 1220, but superimposed at each attribute level is an indication of a percentage of the respondents of interest for whom the attribute level is unacceptable. In this example, over 40% of respondents will not accept a product having an attribute level of 40 M.P.G. Such an indication may, for example, play a role in determining whether to change a level of the M.P.G. attribute in next year's model.

Figure 12F:
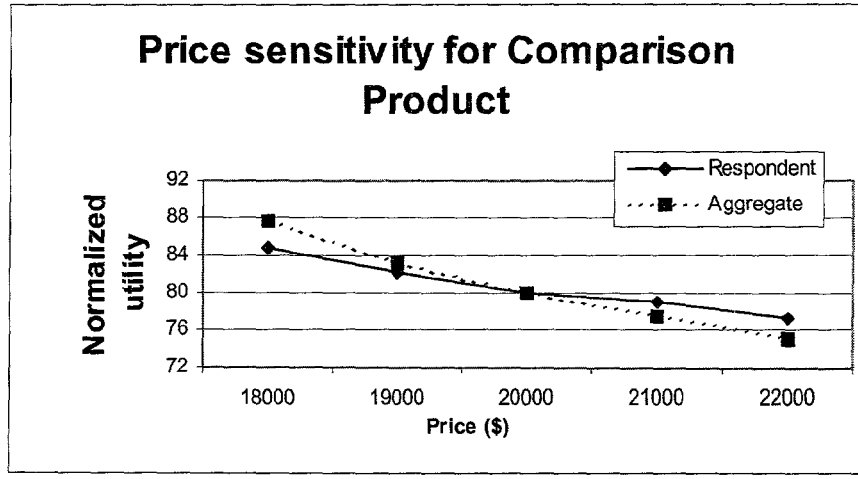

Finally, presentation 1260 of FIG. 12f shows price sensitivity for the comparison product and the utility of the most-preferred product assuming that the comparison product is not changed. In this regard, the greater the difference in total utility between two products, the higher the likelihood that the product with the higher total utility will be purchased. Presentation 1260 also shows the price sensitivity of a particular respondent in relation to the price sensitivity of an average respondent. In this example, the particular respondent is less price-sensitive than the average respondent.

Willingness to Pay

The "willingness to pay" metric indicates an amount of money a respondent is willing to pay for a change in a comparison product. This metric is closely related to the "impact of change in attribute on change in utility" metric in a case that the utility is a currency-normalized utility. However, the determination of the present metric is believed to more accurately reflect a "willingness to pay" because the metric is based on the whole utility curve of the price attribute rather than a specific part of it.

Figure 13:
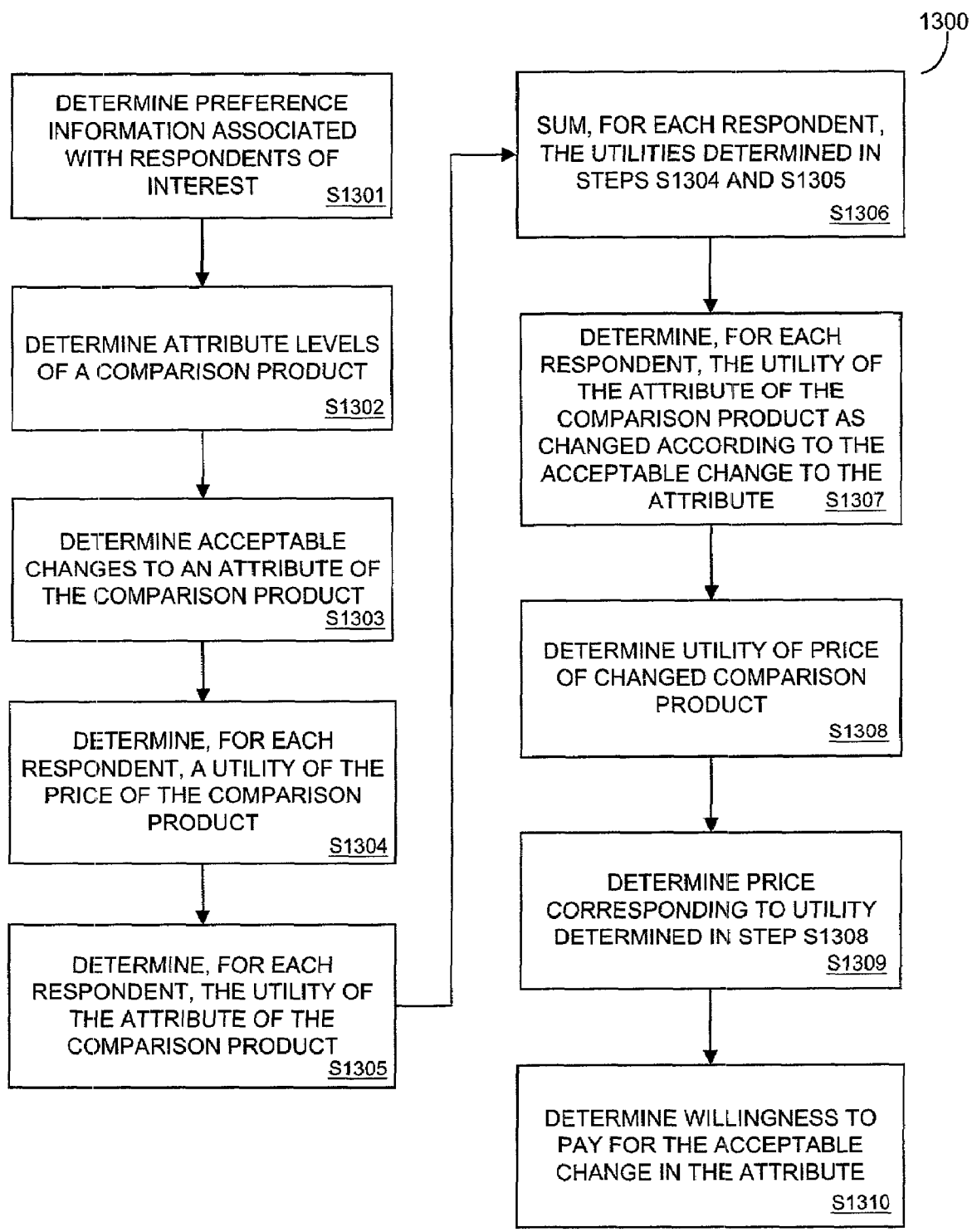
FIG. 13 is a flow diagram of process steps to process preference information according to embodiments of the present invention.

FIG. 13 includes process steps 1300 to determine the present metric. Steps S1301 through S1303 proceed similarly to steps S1101 through S1103 of process steps 1100. More specifically, preference information associated with respondents of interest is determined, attribute levels of a comparison product are determined, and an acceptable change to an attribute of the comparison product is determined. In some embodiments of step S1303, more than one acceptable change is determined; one change is considered in the present example for simplicity of explanation.

In step S1304, a utility of the price of the comparison product is determined for each respondent, and, in step S1305, a utility of the attribute of the comparison product is determined for each respondent. These two utilities are summed in step S1306 to determine a summed utility for the attribute of the comparison product. Next, and also for each respondent, it is assumed that the attribute of the comparison product is changed according to the acceptable change and the utility of the changed attribute is determined in step S1307 for each respondent.

In step S1308, a utility associated with the price of the changed comparison product is determined for each respondent. This utility is determined by subtracting the determined utility of the changed attribute from the summed utility of the comparison product. For example, attribute levels "$30,000" and "25 M.P.G." of a comparison product may correspond to utilities "500" and "50". Also, an assumed acceptable change to the attribute "M.P.G." results in the attribute level "35 M.P.G.", which corresponds to a utility of "200". Therefore, the utility determined in step S1308 for this respondent and this acceptable change is (500+50)−200=350.

In step S1309, a price is determined corresponding to each utility determined in step S1308. The prices may be determined by any appropriate reverse interpolation process. Next, in step S1310 a willingness to pay is determined for each respondent and for each acceptable change by subtracting the price of the comparison product from each price determined in step S1309.

According to the foregoing process, the price of the changed product is calculated so that the total utility of the changed product is at least equal to the total utility of the comparison product. Such a requirement is intended to ensure that the changed product is at least as attractive to a respondent as the comparison product. Therefore, the foregoing process may be most accurate in determining a willingness to pay if the comparison product, for each respondent, is a product that the respondent is willing to buy.

Figure 14A:
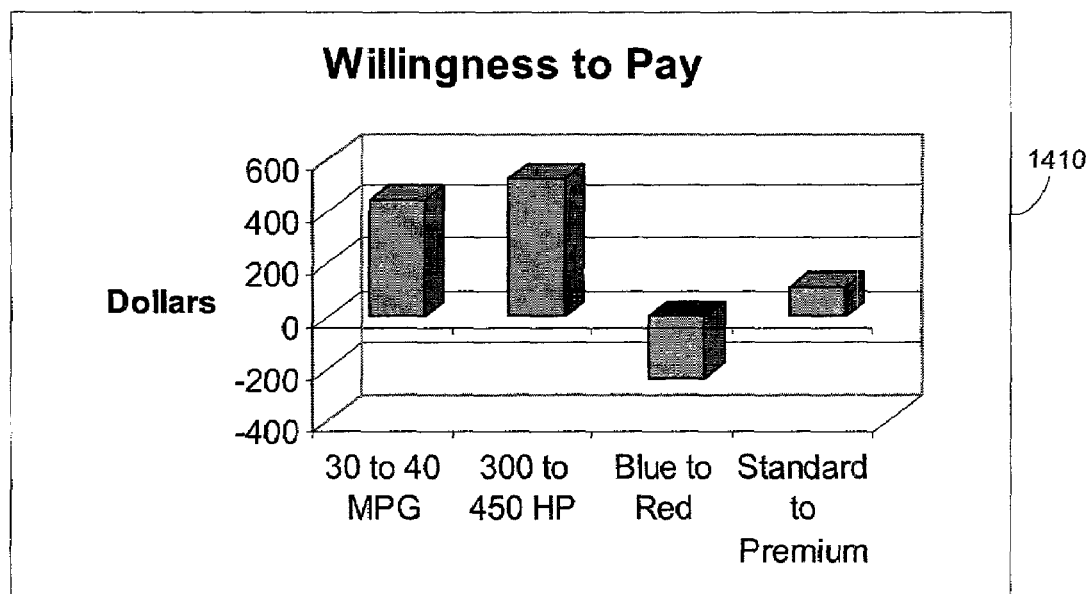
FIGS. 14a through 14d comprise representative views of graphics presenting a metric according to embodiments of the present invention.

Presentation 1410 of FIG. 14a illustrates a willingness to pay for an acceptable change to each of several attributes. The information presented by presentation 1410 may be determined by performing process steps 1300 once for each attribute change. Presentation 1410 may reflect a willingness to pay of a single respondent or of a plurality of respondents. It should be noted that an increase in horsepower from 300 to 400 elicits a greater willingness to pay than each of the other three illustrated acceptable changes, and a change from Blue to Red makes the comparison product less valuable to a respondent.

Figure 14B:
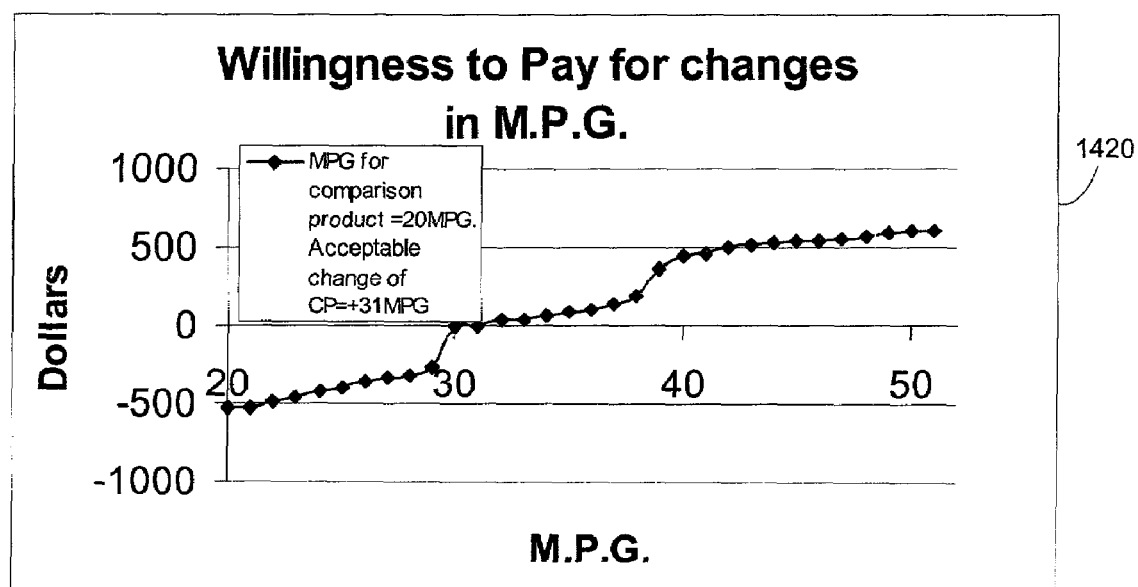

FIG. 14b illustrates presentation 1420, which shows a willingness to pay for several incremental changes to a single attribute. To determine the data shown in presentation 1420, one iteration of process steps 1300 would be performed for each change to the single attribute (e.g., M.P.G.) of the comparison product. Again, the data may reflect a single respondent or a plurality of respondents. In FIG. 14b, a rate of increase of M.P.G. is relatively non-linear around 30 M.P.G. and 40 M.P.G.

Figure 14C:
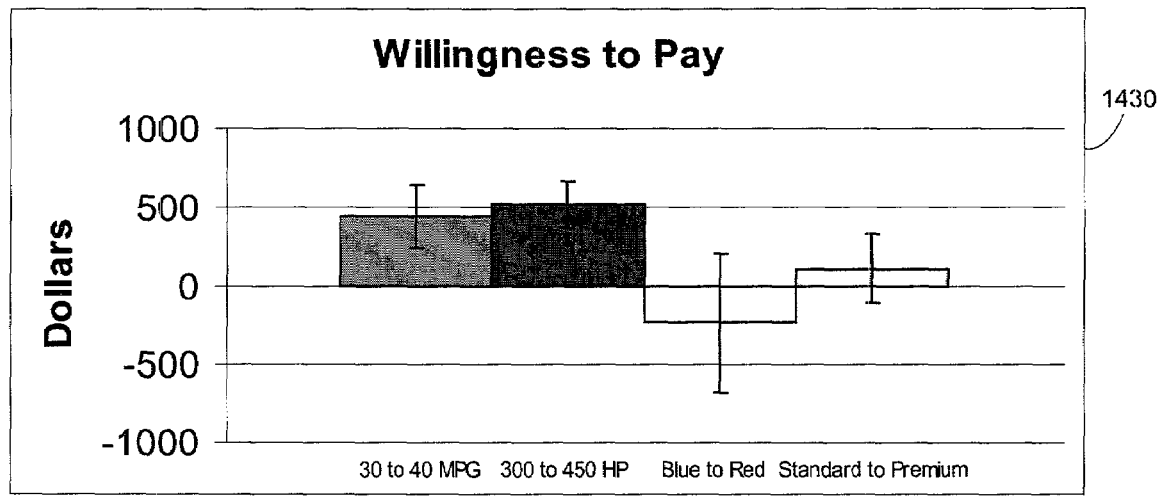

FIG. 14c shows presentation 1430, which illustrates the data shown in presentation 1410 in addition to a distribution of the metric over all respondents of interest for each change in an attribute. More specifically, each wide bar illustrates an aggregate willingness to pay, and each superimposed thin bar show a range (e.g., one standard deviation) of respondents' willingnesses to pay that were used to determine the aggregate value.

Figure 14D:
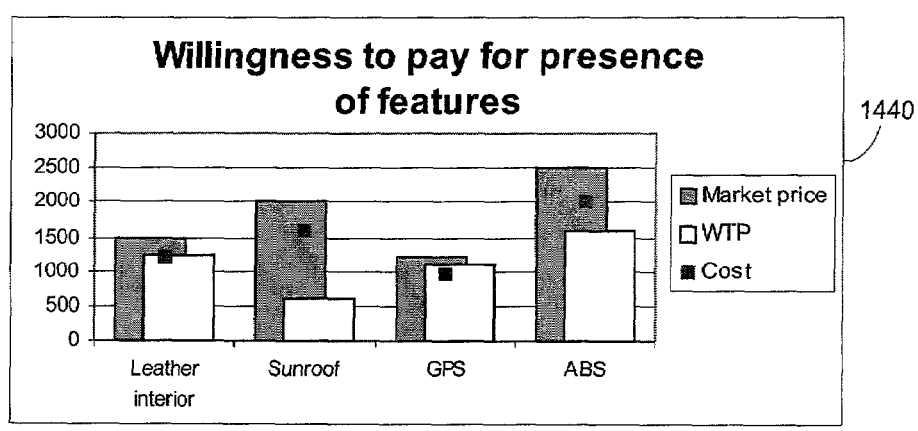

Presentation 1440 of FIG. 14d shows a respondent's willingness to pay for various features, as well as a market price and a cost to the client of the feature. Presentation 1440 can therefore be used to determine potential additional features for the comparison product. Accordingly, presentation 1440 is particularly useful for a salesman selling the comparison product to a particular customer. For example, the market price for a sunroof is $2000, the cost is $1600, and an estimated willingness to pay for the sunroof is $600. Accordingly, there is little reason to bother offering a sunroof to the respondent because the respondent would only accept the sunroof for a price well below it's cost. However, the market price for GPS is $1200, the cost is $960, and an estimated willingness to pay is $1100. Therefore, the respondent could be offered GPS for a discount price less than or equal to $1100 and more than or equal to $960.

If the cost to the client for changing an attribute is known, a price gap between the market price and the respondent's willingness to pay for the change can be shown using presentation 1440. The present metric thereby shows the client how much of a discount must be given in order for the respondent to agree to buy the changed product. Even if the market price is unknown, the metric can still be used to help the client judge whether to offer the respondent the original product or the changed product.

Relation of Price and Share, Given a Change in an Attribute

The present metric is intended to assist in illustrating a relationship between changes in price and changes in share. The metric may therefore be used to determine whether a certain enhancement to a product should be made, given that the market price of that product must be increased in view of the enhancement. For example, a client may use the metric "impact of change in attributes on change in shares" to judge the importance of certain changes in attributes. However, a change that improves an attribute often implies a price increase and a corresponding decrease in utility that may or may not offset an increase in utility of the changed attribute. Similarly, a change that diminishes an attribute decreases a utility corresponding to the attribute but often implies a price decrease and a corresponding increase in utility of the price attribute. Therefore, it is useful to also consider a change in share due to a change in price.

Figure 15:
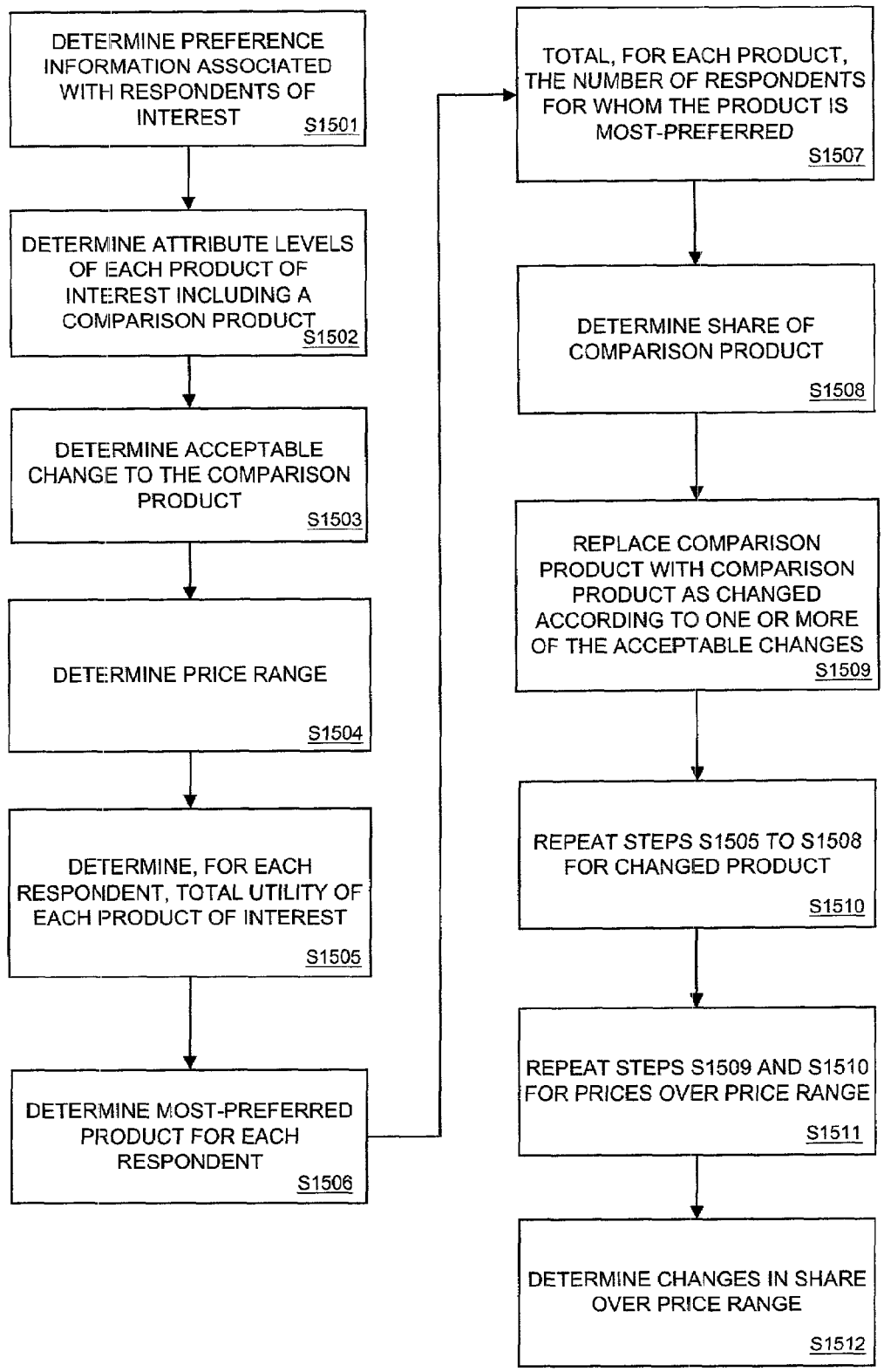
FIG. 15 is a flow diagram of process steps to process preference information according to embodiments of the present invention.

Process steps 1500 of FIG. 15 set forth one process for determining the present metric. Flow begins at step S1501, in which preference information is determined for respondents of interest. Attribute levels of each product of interest, including a comparison product, are determined in step S1502. Next, a change to the comparison product and a price range are determined in steps S1503 and S1504, respectively.

Of course, steps S1501 through S1504 may be performed in any order, and the determinations therein may proceed according to any method described herein. In one example, a client requests the present metric from central system 200 and specifies information including a comparison product, a change to the comparison product, a price range, a relevant market, and a description of respondents of interest. Attribute levels for products comprising the market and preference information of the respondents are then retrieved by central system 200 in response to the request and information.

Steps S1505 through S1508 proceed similarly to steps S704 through S707 of process steps 700. Accordingly, after step S1508, a share of the comparison product is known. The comparison product is replaced in step S1509 by a product identical to the comparison product except for the change determined in step S1503. Then, in step S1510, steps S1505 through S1508 are repeated to determine a share of the changed comparison product.

Steps S1509 and S1510 are repeated for the changed comparison product, which is associated with a different price within the price range. For example, the determined price range may be $0 to $500 greater than the comparison product. Accordingly, when steps S1509 and S1510 are originally repeated, the changed comparison product is associated with a price $50 greater than the price of the comparison product. In subsequent iterations of steps S1509 and S1510, only the price of the changed comparison product is increased. As a result, after step S1511, a share of the changed comparison product is determined for each of several prices over the price range.

Figure 16:
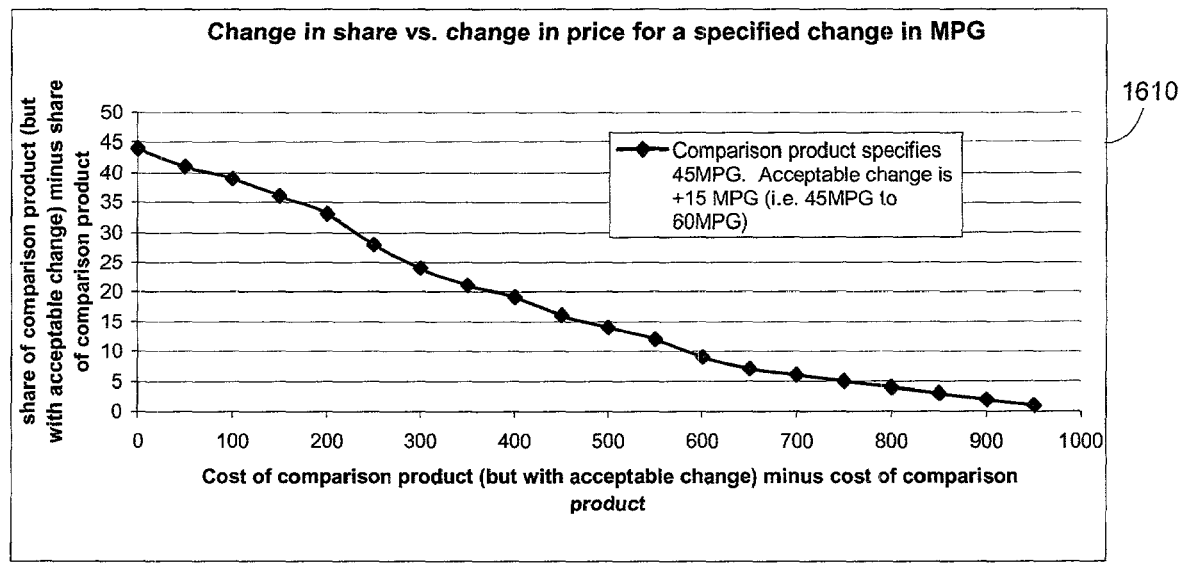
FIG. 16 comprises a representative view of graphics presenting a metric according to embodiments of the present invention.

Changes in share over the price range are determined in step S1512. The change in share is determined by subtracting, for each of the several prices over the price range, a share of the comparison product determined in step S1508 from a share of the changed product at the price. The changes may be presented in presentation 1610 of FIG. 16. Presentation 1610 illustrates a projected change in share of the comparison product for each of several changes in price of the comparison product in cases where the attribute "M.P.G." of the comparison product is increased by 15 M.P.G. As shown, the change in share is approximately linear with respect to changes in price.

In some embodiments, process steps 1500 are performed for several changes to an attribute. More particularly, process steps 1500 may be performed for more than one change to an attribute at each price of the price range.

Gap Analysis

Figure 17:
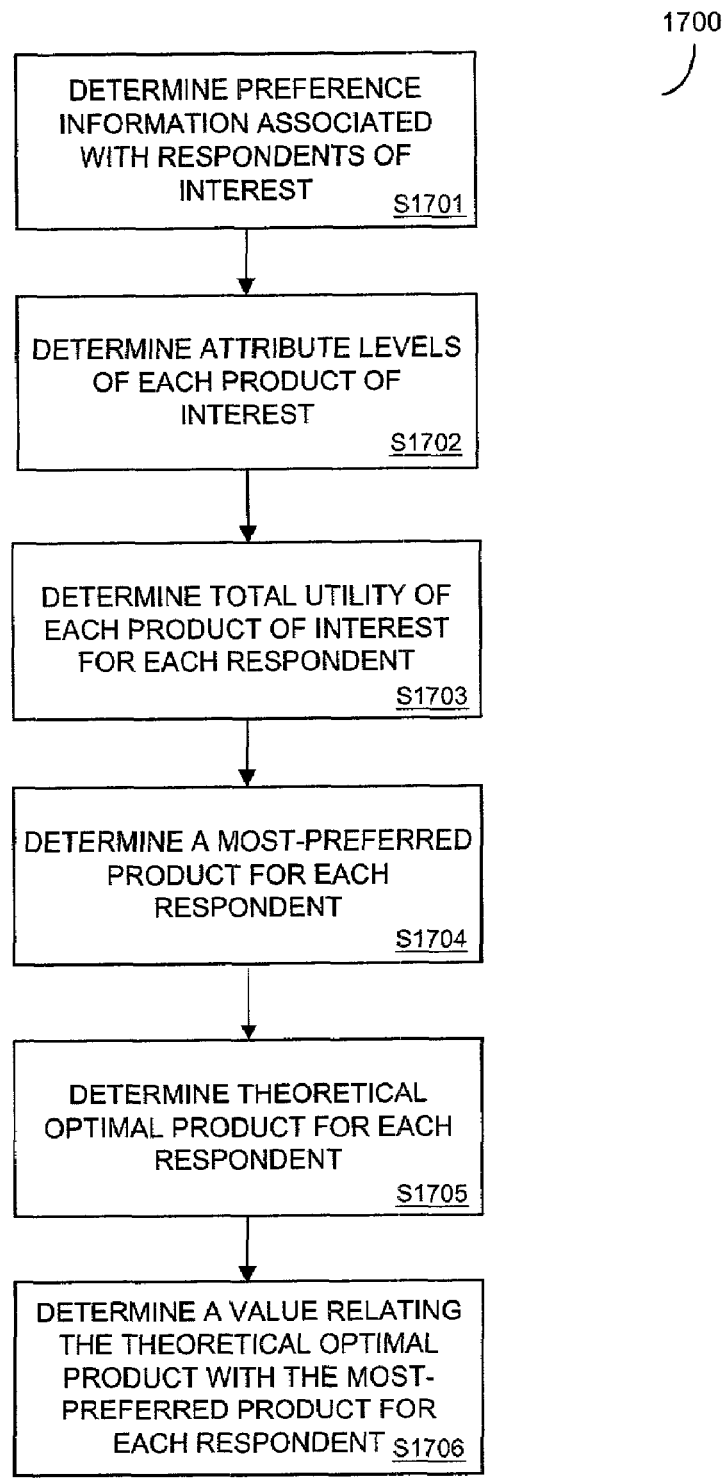
FIG. 17 is a flow diagram of process steps to process preference information according to embodiments of the present invention.

The metric "gap analysis" allows a client to evaluate a fit between the client's current product line and a theoretical optimal product of one or more respondents. If the fit is poor, the client may decide to revise its product line to better meet its customers' preferences. Process steps 1700 of FIG. 17 provide one system for determining this metric.

Specifically, in step S1701, preference information is determined for respondents of interest. In some embodiments, the respondents of interest are the client's existing customers. In some embodiments, the respondents of interest are respondents for whom one of the client's products is more preferred than all other products in the relevant market, regardless of whether or not the respondents are customers of the client. Attribute levels of each product of interest are determined in step S1702. As described above, the products of interest may comprise the client's product line, but may also comprise a competitor's product line, a set of competitors' products, or another group of products.

A total utility of each product of interest is determined for each respondent in step S1703, and a most-preferred product of the products of interest is determined for each respondent in step S1704. Next, in step S1705, a theoretical optimal product is determined for each respondent. The theoretical optimal product of a respondent is a theoretical product that possesses, for each attribute, the attribute levels that the respondent associates with the highest utility. Of course, for some respondents the theoretical optimal product may correspond to an actual product. A theoretical optimal product for a respondent may also be specified by a client.

In step S1706, a value is determined for each respondent relating the respondent's theoretical optimal product with the respondent's most-preferred product. In some embodiments, the value is calculated by subtracting the respondent's total utility for the respondent's most-preferred product from the respondent's total utility for the respondent's theoretical optimal product, and by dividing the difference by the respondent's total utility for the respondent's theoretical optimal product. In other embodiments, the value is calculated simply by subtracting the respondent's total utility for the respondent's most-preferred product from the respondent's total utility for the respondent's theoretical optimal product. An aggregate value may be determined by computing the mean of the values determined for each respondent.

Figure 18A:
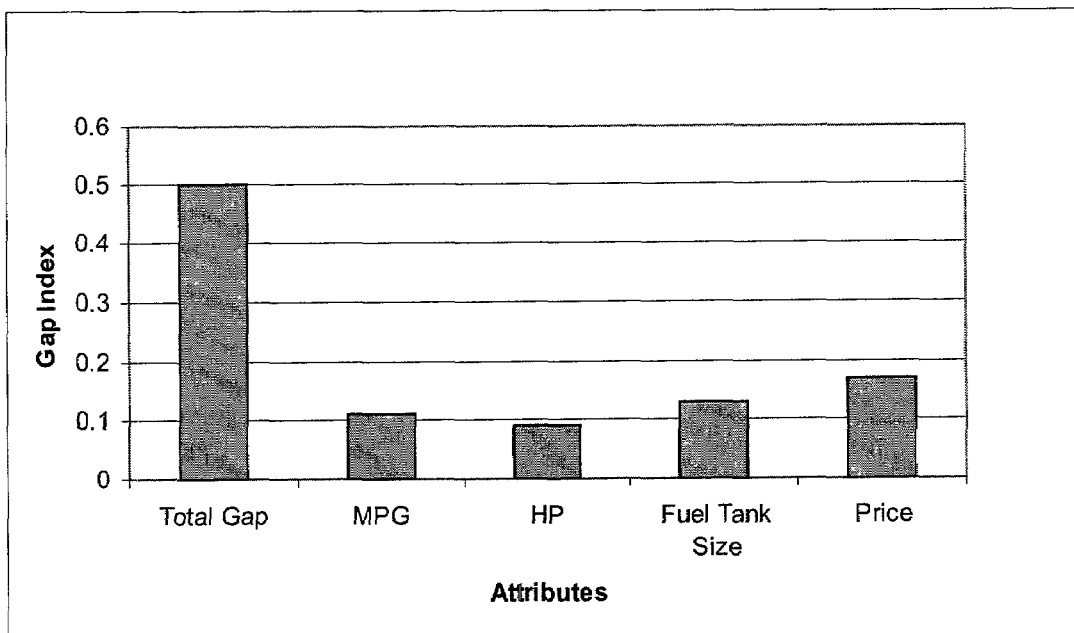
FIGS. 18a and 18b comprise representative views of graphics presenting a metric according to embodiments of the present invention.

Presentation 1810 of FIG. 18a shows the value described above as well as attribute-specific values of the present metric. As shown, each illustrated attribute contributes approximately a same amount to discrepancies between the theoretical optimal product and the base product. These attribute-specific values are determined in some embodiments by identifying, for each respondent, a most-preferred product of the products of interest and by determining values as in step S1706 relating each utility of the attributes of the most-preferred product with utilities of respective attributes of the theoretical optimal product. It should be noted that presentation 1810 may reflect values associated with a single respondent or a plurality of respondents. Also, presentation 1810 may include an indication of a number or a percentage of respondents for whom each of the products of interest include an unacceptable attribute level.

Figure 18B:
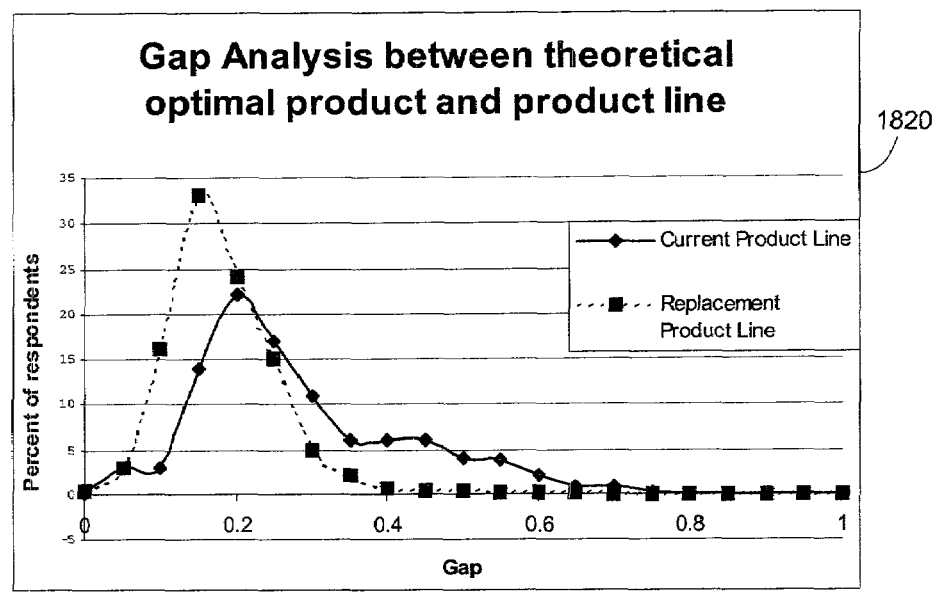

Presentation 1820 of FIG. 18b illustrates, for two different sets of products of interest, a percentage of respondents for whom a particular value was determined in step S1706. As shown, one set of products is a client's current product line, while the second set of products is a proposed replacement product line. Accordingly, presentation 1820 may be used to determine whether or not to make changes to an existing product line. As shown, it may be beneficial to replace the current product line because the determined gap for the replacement line is smaller for more respondents than the determined gap for the current product line.

Gap with Competition

Figure 19:
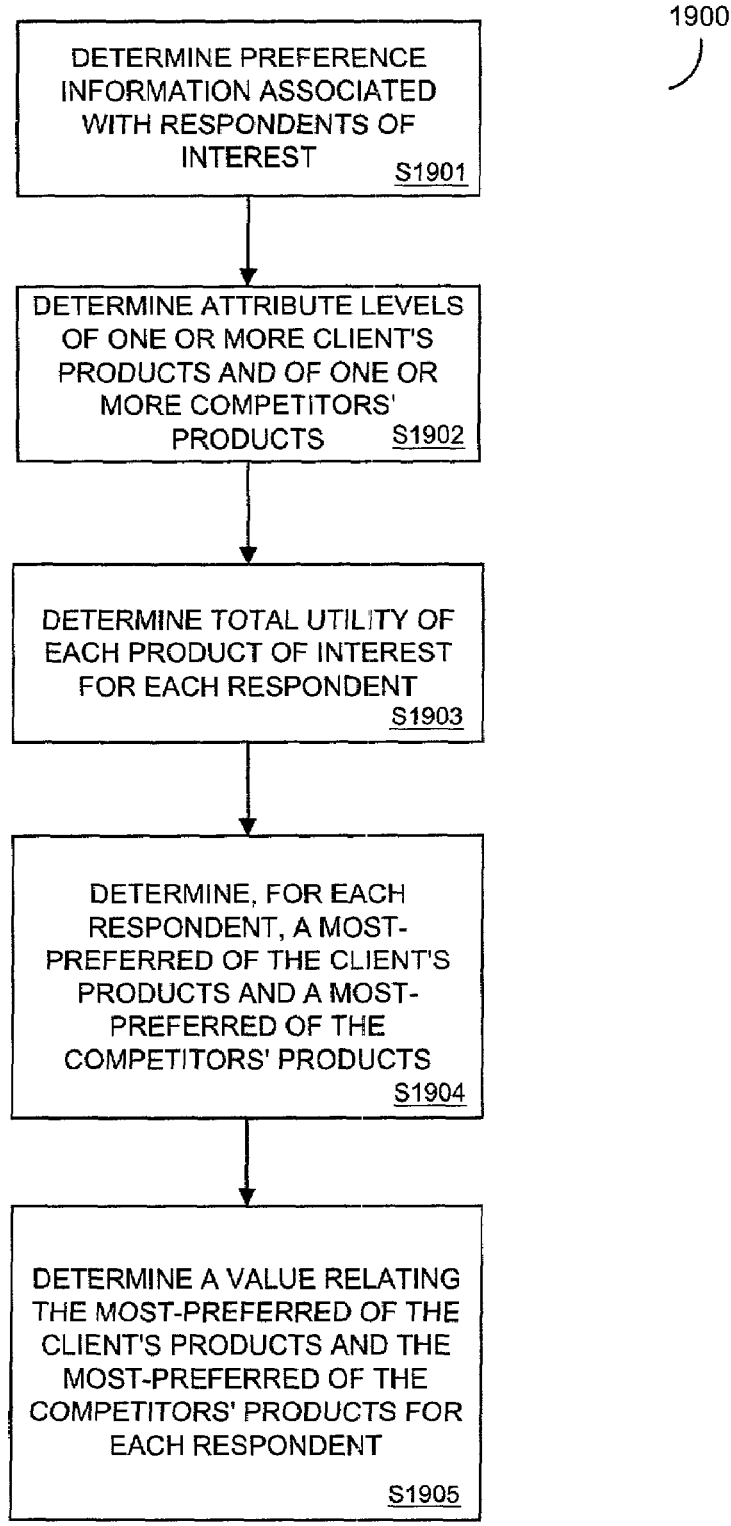
FIG. 19 is a flow diagram of process steps to process preference information according to embodiments of the present invention.

The "gap with competition" metric may relate a difference between a client's most-preferred product with a most-preferred product of one or more competitors. According to process steps 1900 of FIG. 19, determination of the metric begins with a determination of preference information of a respondent of interest. Next, in step S1902, attribute levels are determined for one or more client's products and one or more competitors' products. For each respondent, a total utility of each of the one or more client's products and of the one or more competitors' products (i.e., the "products of interest") is determined in step S1903.

In step S1904, a most-preferred of the client's products and a most-preferred of the competitors' products is determined for each respondent. Such a determination may be performed by analyzing the total utilities determined in step S1903. Next, in step S1905, a value relating the most-preferred of the client's products and the most-preferred of the competitors' products is determined for each respondent. In some embodiments, the value is determined by subtracting a respondent's total utility for the respondent's most-preferred competitors' product from the respondent's total utility for the respondent's most-preferred client's product, and by dividing the difference by the respondent's total utility for the respondent's most-preferred client's product. Of course, values relating the two most-preferred products may be determined in other manners, such as by only subtracting a respondent's total utility for the respondent's most-preferred competitors' product from the respondent's total utility for the respondent's most-preferred client's product.

Figure 20A:
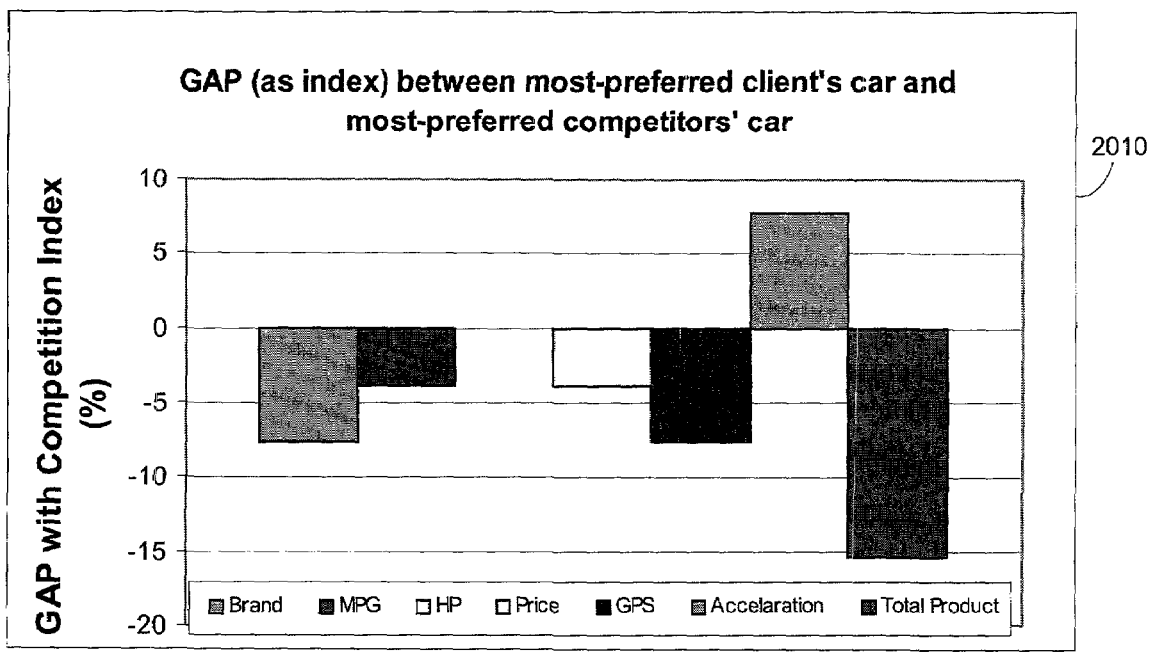
FIGS. 20a through 20c comprise representative views of graphics presenting a metric according to embodiments of the present invention.

FIG. 20a includes presentation 2010, which shows a gap with competition index for a most-preferred product of the client and for a most-preferred product of a competitor, represented by the indication "Total Product". As shown, the most-preferred competitor's product is associated with more utility for the respondent or respondents reflected in presentation 2010 than the most-preferred product of the client. However, presentation 2010 shows that the difference between the two products is relatively small. Also shown are that GPS and brand are the attributes that most contributed to the competitor's product's advantage over the client's product, while acceleration is the only attribute for which the client's product is "better" than the competitor's product. In some embodiments, presentation 2010 shows a number or percentage of people for whom all of the client's products contain an unacceptable attribute level, and/or a number or percentage of people for whom all of the competitors' products contain an unacceptable attribute level.

Figure 20B:
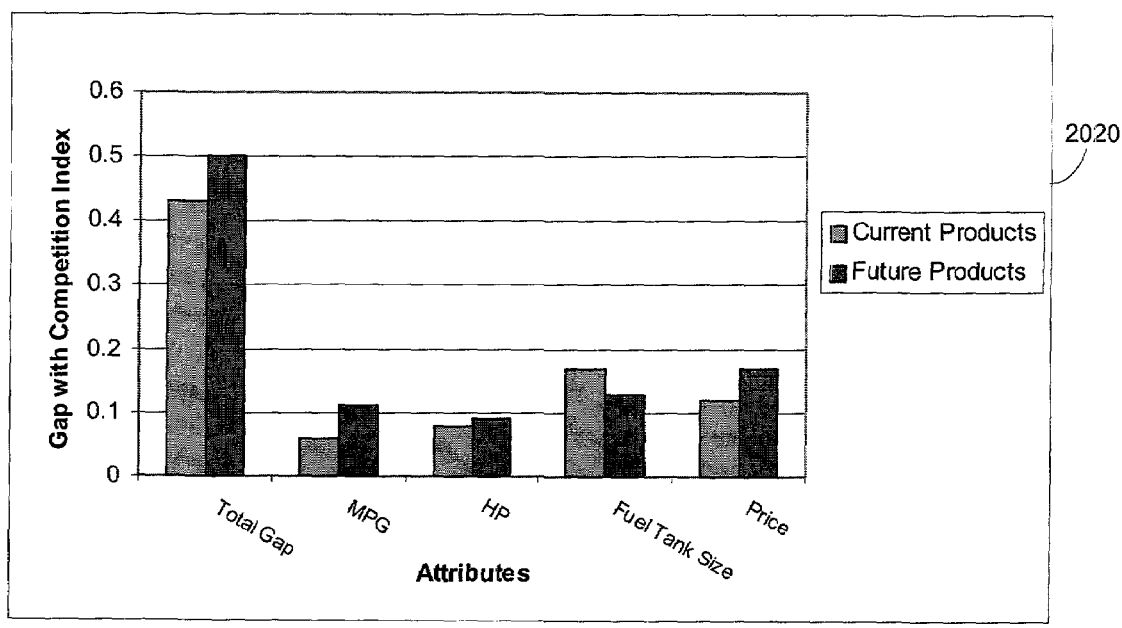

Presentation 2020 of FIG. 20b shows a Gap with competition metric calculated for each of several attributes. Presentation 2020 indicates that the client product line would improve with respect to the competitor product line if the current client and competitor product lines were replaced with future client and competitor product lines.

Figure 20C:
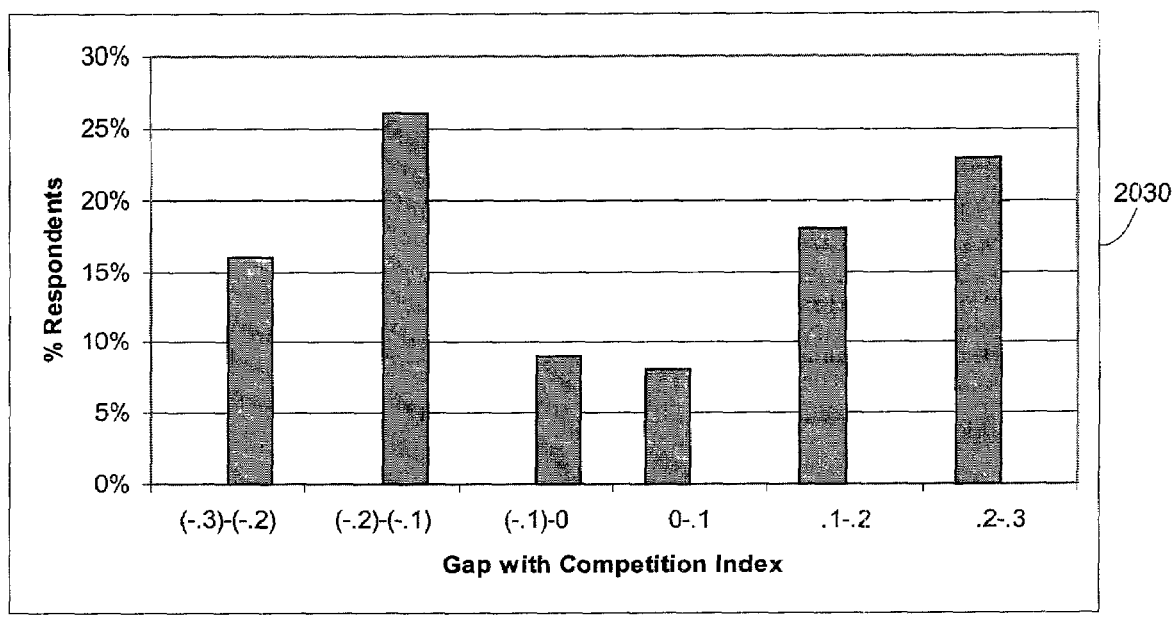

FIG. 20c illustrates a percentage of respondents associated with each of several Gap indexes. Specifically, presentation 1030 indicates that respondents of interest basically fall into two categories—those who prefer the client product line with an index of greater than 0.1 and those who prefer the competitor product line with an index of less than–0.1. Few of the respondents are indifferent.

Unacceptable Attribute Levels

Figure 21:
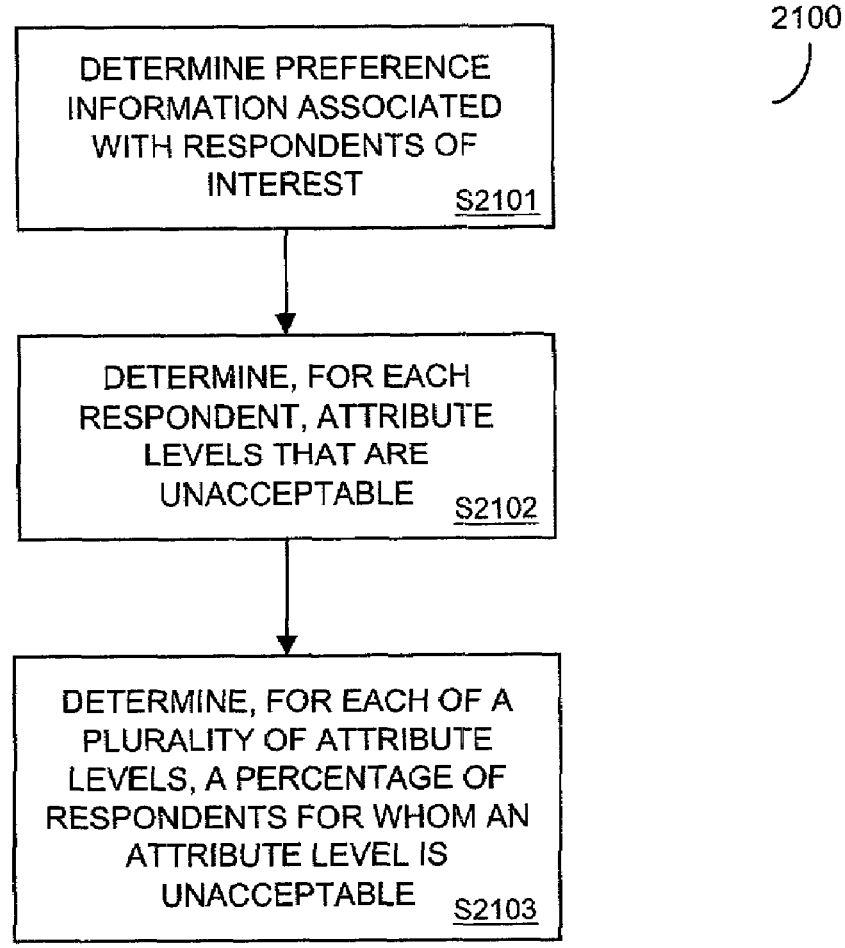
FIG. 21 is a flow diagram of process steps to process preference information according to embodiments of the present invention.

FIG. 21 illustrates process steps 2100 to determine the metric "unacceptable attribute levels". This metric is intended to provide a client with an idea of unacceptable attribute levels specified in preference information.

Initially, preference information of respondents of interest is determined in step S2101. Next, attribute levels that are unacceptable are determined for each respondent in step S2102. In step S2103, a percentage of respondents for whom an attribute level is unacceptable is determined for each of a plurality of attribute levels.

Figure 22:
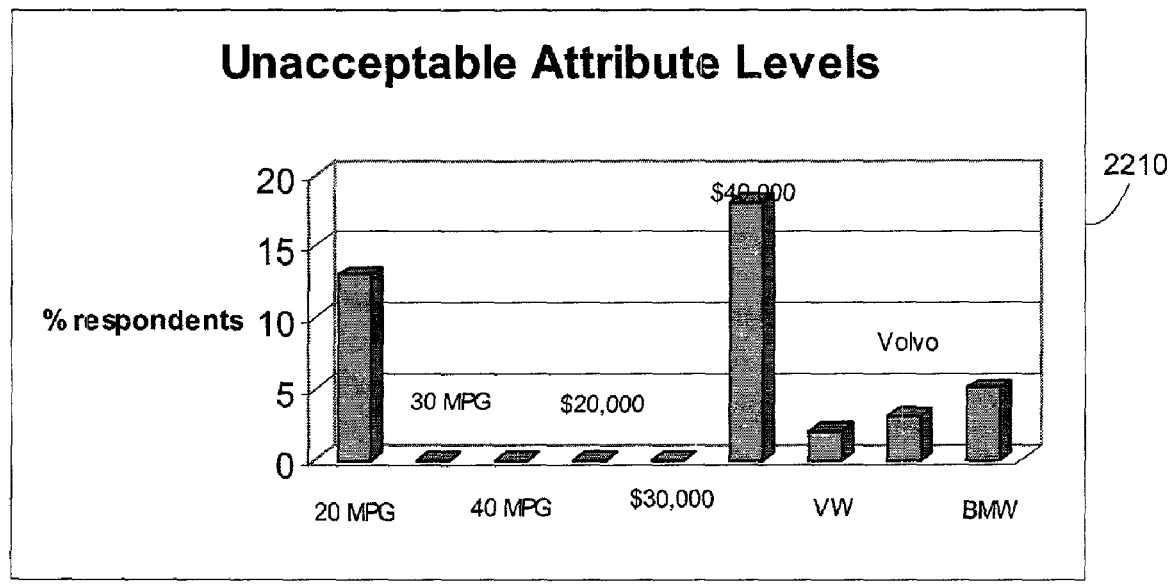
FIG. 22 comprises a representative view of graphics presenting a metric according to embodiments of the present invention.

Presentation 2210 of FIG. 22 illustrates the metric determined in process steps 2100. As shown, each attribute level is associated with a percentage of respondents for whom the attribute level is unacceptable. Attribute levels $40,000 and 20 M.P.G. are unacceptable to a large percentage of respondents. Of course, a raw number or another measure may be used instead of a percentage.

Vulnerability

Typically, a client is interested in the changes of share due to an attribute change in one or more of its products. These changes in share do not show, however, how the client's competitive advantage changes among the relevant products. Accordingly, the present metric may be used to show how "close" a client's customers are to switching from a product of the client's product line to a product of the competitor's product line.

Figure 23:
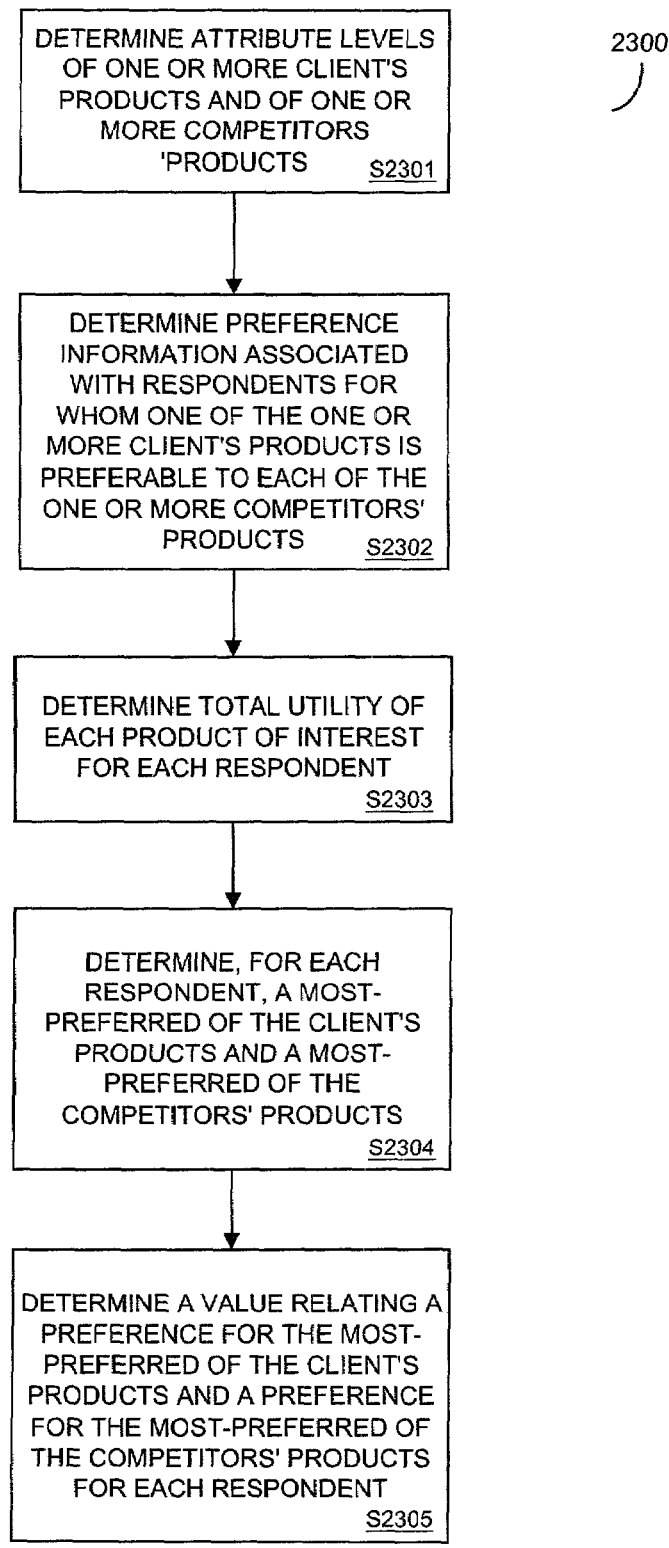
FIG. 23 is a flow diagram of process steps to process preference information according to embodiments of the present invention.

FIG. 23 shows process steps 2300 for determining the vulnerability metric. In step S2301, attribute levels are determined for one or more client's products and for one or more competitor's products. As described above, it may be useful if the products for which attribute levels are determined are products comprising a particular market. Preference information is then determined in step S2302 for respondents of interest, who are defined as those respondents who prefer at least one of the client's products to each of the one or more competitor's products.

Next, in step S2303, a total utility of each of the one or more client's products and of the one or more competitor's products is determined for each respondent of interest. Using the determined utilities, a most-preferred of the one or more client's products and a most-preferred of the one or more competitor's products are determined for each respondent in step S2304. A value is determined for each respondent of interest in step S2305 relating the respondent's preference for the most-preferred of the one or more client's products and the respondent's preference for the most-preferred of the one or more competitor's products. In some embodiments of step S2305, the value is determined by dividing the respondent's preference for the most-preferred of the one or more client's products by the respondent's preference for the most-preferred of the one or more competitor's products. In other embodiments, the value equals the difference between the respondent's preference for the most-preferred of the one or more client's products and the respondent's preference for the most-preferred of the one or more competitor's products, divided by the respondent's preference for the most-preferred of the one or more competitor's products.

Figure 24A:
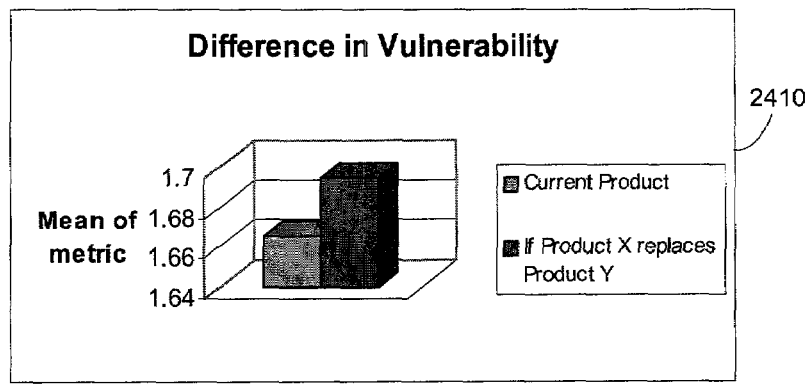
FIGS. 24a through 24f comprise representative views of graphics presenting a metric according to embodiments of the present invention.

Presentation 2410 of FIG. 24a illustrates two different values of the present metric. The smaller value reflects a case in which the one or more client's products are a client's current products, while the larger value reflects a case in which one of the one or more client's products (client product Y) is replaced with another product (client product X). According to presentation 2410, the client's product line would be less vulnerable to the competitor's product line if product X were replaced by product Y.

Figure 24B:
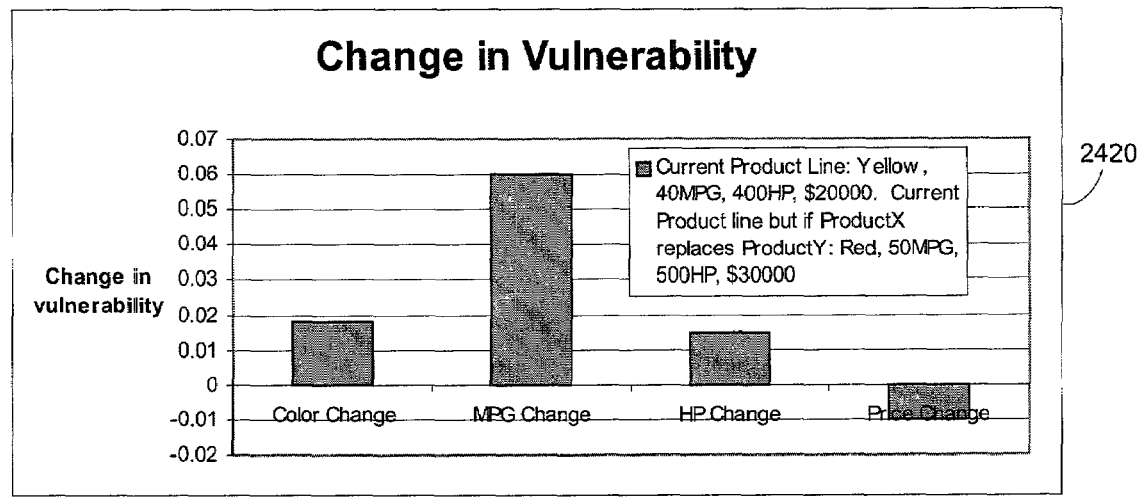
Figure 24C:
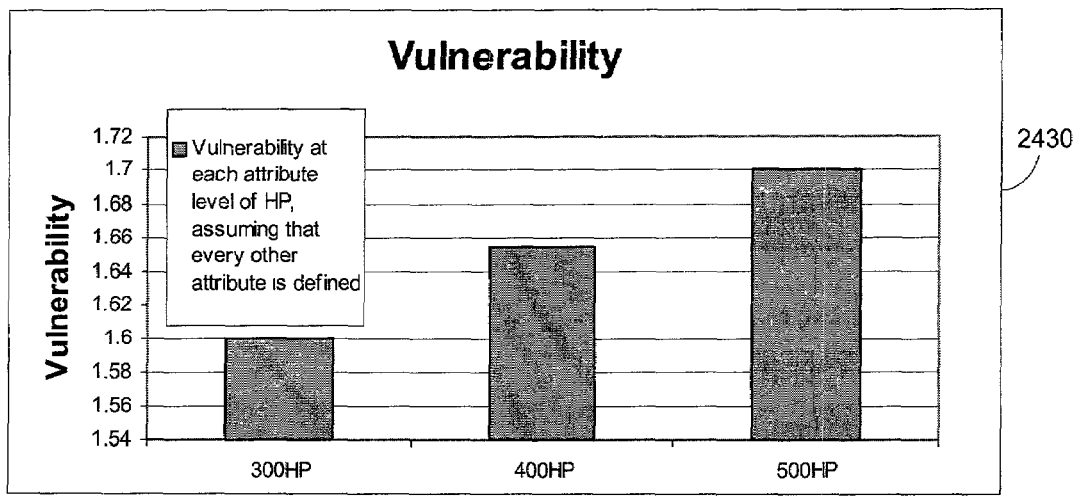

Presentation 2420 of FIG. 24b also contrasts the vulnerability of a current set of client's products with the vulnerability of a proposed set of products. However, presentation 2420 illustrates a change in vulnerability resulting from changing one attribute of one of the current set of products. In order to determine the data presented in presentation 2420, the metric is calculated for the current set of products. Next, the metric is calculated for a set of products identical to the original set of products except for a change to one attribute of one of the original set of products. The difference between the two vulnerability metrics may then be calculated for display with respect to the attribute change as shown in presentation 2410. Of course, presentation 2420 shows such a difference with respect to four different independent calculations of vulnerability corresponding to four different attribute changes. In some embodiments, presentation 2420 also presents a red flag indicating that at least a threshold number of respondents find the original attribute level unacceptable and are therefore not included in the metric calculation.

Presentation 2420 indicates that the specified change in price would make the client's product line more vulnerable, and the other specified changes in attributes would make the client's product line less vulnerable. In fact, the specified M.P.G. change would result in a least-vulnerable client product line.

Presentation 2430 illustrates a vulnerability for each of several attribute levels of an attribute. Presentation 2430 indicates that a client's product line gets less vulnerable at an approximately linear rate as horsepower of the comparison product is increased from 300 HP to 500 HP. As described with respect to presentation 2420, the vulnerabilities may be determined by performing steps 2300 for sets of client's products that are identical to each other except for a change to the attribute.

Figure 24D:
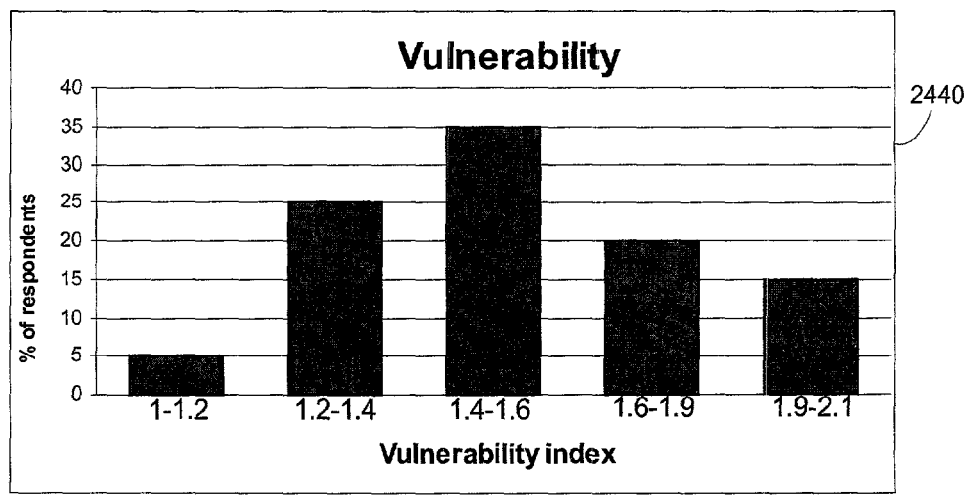

Presentation 2440 of FIG. 24d illustrates, for a particular set of one or more client's products and a particular set of one or more competitor's products, a percentage of respondents associated with each of several vulnerability index values. The illustrated information may be determined from the vulnerabilities for each respondent determined in step S2305. As shown, a distribution of respondents' vulnerability indices is approximately bell-shaped.

Figure 24E:
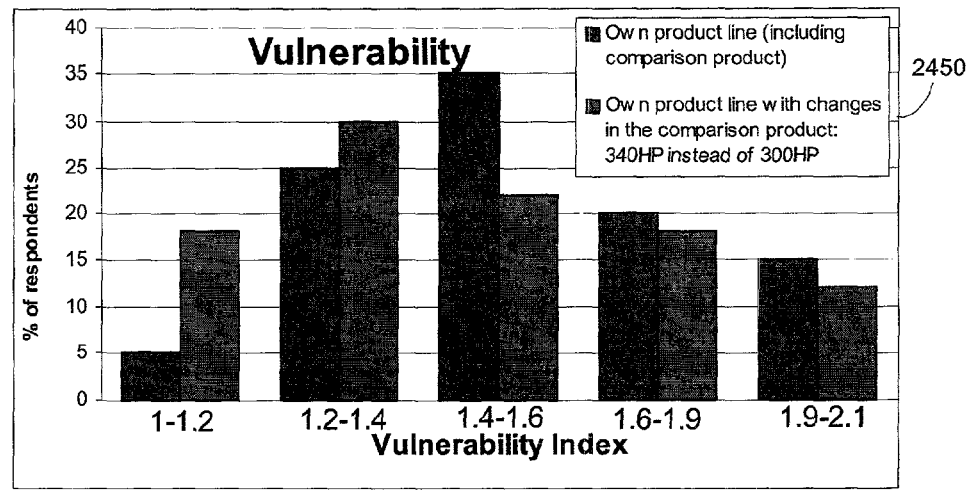

Presentation 2450 of FIG. 24e shows the same information as shown in presentation 2440, and also includes a percentage of respondents associated with each of several vulnerability values determined in view of a second set of one or more client's products and the particular set of one or more competitor's products. As shown, the second set of client's products differs from the particular set of client's products in that one attribute of one product is changed. Specifically, a change in horsepower of the comparison product shifts the distribution of vulnerability indices to the left (toward a state of greater vulnerability).

Figure 24F:
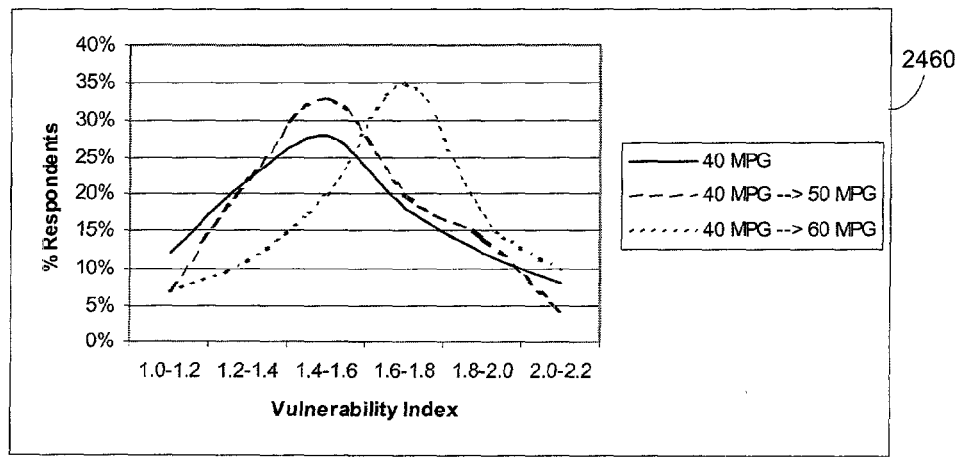

FIG. 24f illustrates presentation 2460, which shows a percentage of respondents associated with each of several mean vulnerability index values as in presentation 2440. However, presentation 2460 shows such percentages for each of several comparison products. In this regard, each graphed line of presentation 2460 represents a comparison product differing in only one attribute from the comparison products represented by the other graphed lines. Presentation 2460 also illustrates that a change from 40 to 50 M.P.G. in the comparison product flattens the distribution of respondent vulnerability indices, and a change to 60 M.P.G. shifts and concentrates the distribution of respondent vulnerability indices.

Clout

Figure 25:
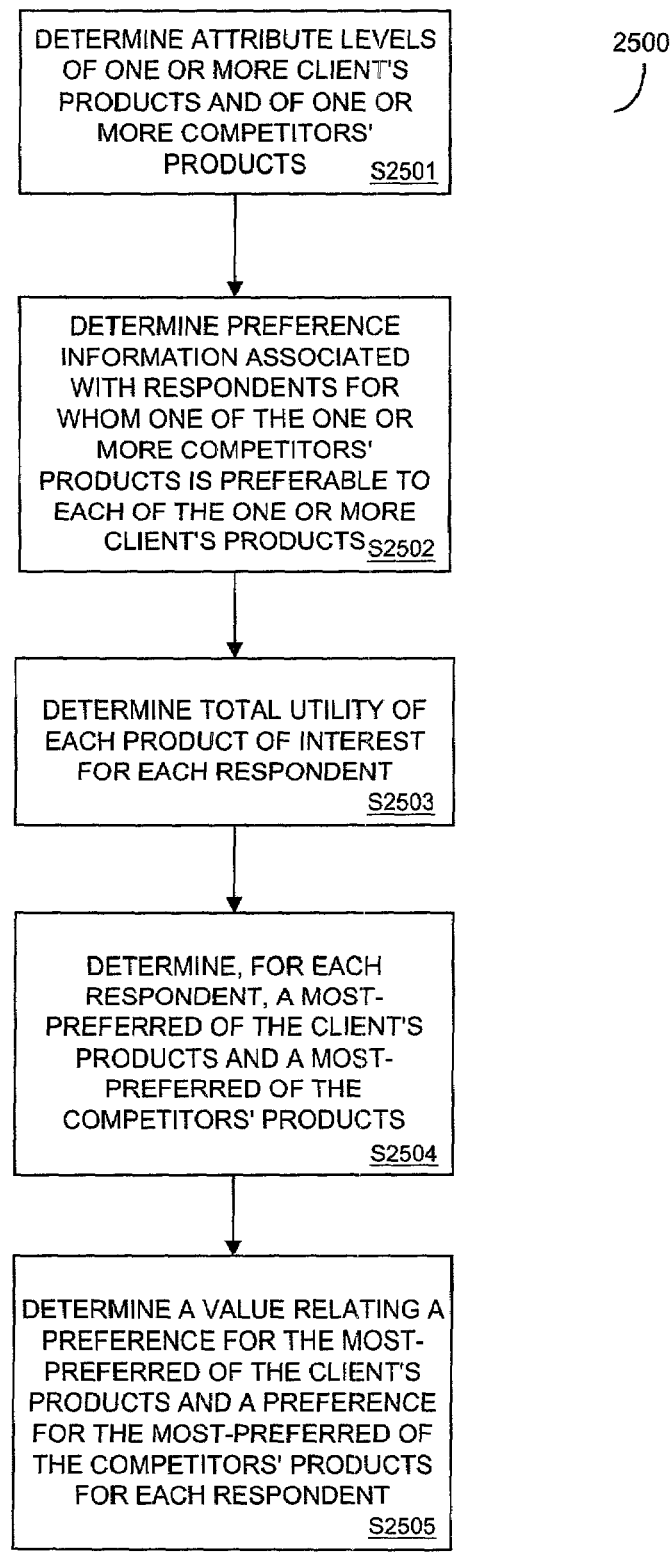
FIG. 25 is a flow diagram of process steps to process preference information according to embodiments of the present invention.

The "clout" metric provides a measure of how close a competitor's customers are to switching to a client's product line. FIG. 25 shows process steps 2500 for determining the clout metric. Attribute levels are determined for one or more client's products and for one or more competitor's products in step S2501. As described with respect to step S2301, the products for which attribute levels are determined are products may comprise a particular market. Next, in step S2502, preference information is determined for respondents of interest, defined as those respondents who prefer at least one of the competitor's products to each of the one or more client's products.

A total utility of each of the one or more client's products and of the one or more competitor's products is then determined for each respondent of interest in step S2503. Based on the determined utilities, a most-preferred of the one or more client's products and a most-preferred of the one or more competitor's products are determined for each respondent in step S2504. In step S2505, a value is determined for each respondent of interest that relates the respondent's preference for the most-preferred of the one or more client's products and the respondent's preference for the most-preferred of the one or more competitor's products.

The value may be determined in step S2505 by dividing the respondent's preference for the most-preferred of the one or more client's products by the respondent's preference for the most-preferred of the one or more competitor's products. It should be noted that even though this calculation is identical to one embodiment of step S2305, a result of this calculation should be a value less than one, as opposed to a value of greater than one generated by step S2305. The different values result because the respondents of interest in process steps 2300 are those who prefer one at least one of the client's products to each of the one or more competitor's products and the respondents of interest in process steps 2500 are those who prefer at least one of the competitor's products to each of the one or more client's products. The value may also be determined in step S2505 by subtracting the respondent's preference for the most-preferred of the one or more competitor's products from the respondent's preference for the most-preferred of the one or more client's products and by dividing the difference by the respondent's preference for the most-preferred of the one or more competitor's products.

Figure 26A:
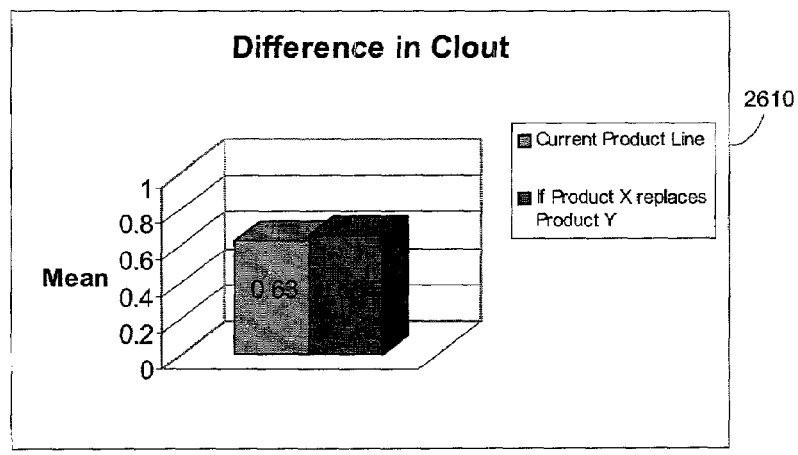
FIGS. 26a through 26c comprise representative views of graphics presenting a metric according to embodiments of the present invention.

FIG. 26a shows presentation 2610, which illustrates the clout metric for each of two different sets of one or more client's products. Presentation 2610 may be generated for one or more respondents. The smaller value reflects a case in which the one or more client's products are a client's current products, while the larger value reflects a case in which the one of the one or more client's products is replaced with another product. Accordingly, replacement of Product Y with product X may be beneficial.

Figure 26B:
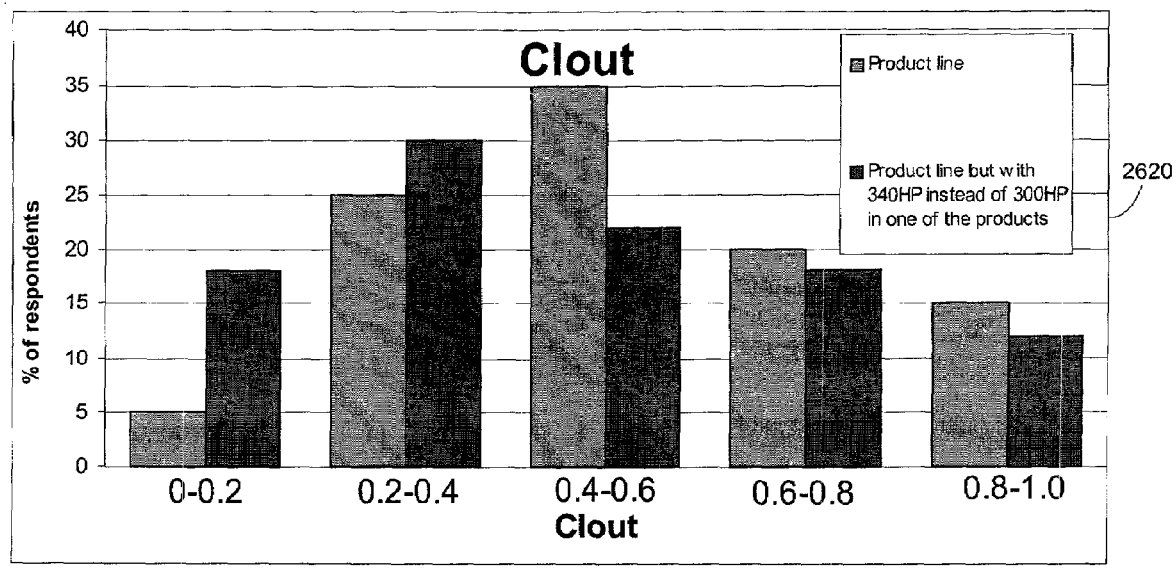

Presentation 2620 of FIG. 26b shows, for a particular set of one or more client's products and a particular set of one or more competitor's products, a percentage of respondents associated with each of several ranges of clout values. Presentation 2620 also shows a percentage of respondents associated with each of several ranges of clout values determined in view of a second set of one or more client's products and the particular set of one or more competitor's products. As noted, the second set of client's products in this example is identical to the particular set of client's products except for a change to one attribute of one product. Regarding the particular scenario illustrated in FIG. 26b, a change in horsepower of a comparison product shifts the distribution of clout indices to the left, reflecting a decrease in clout.

Figure 26C:
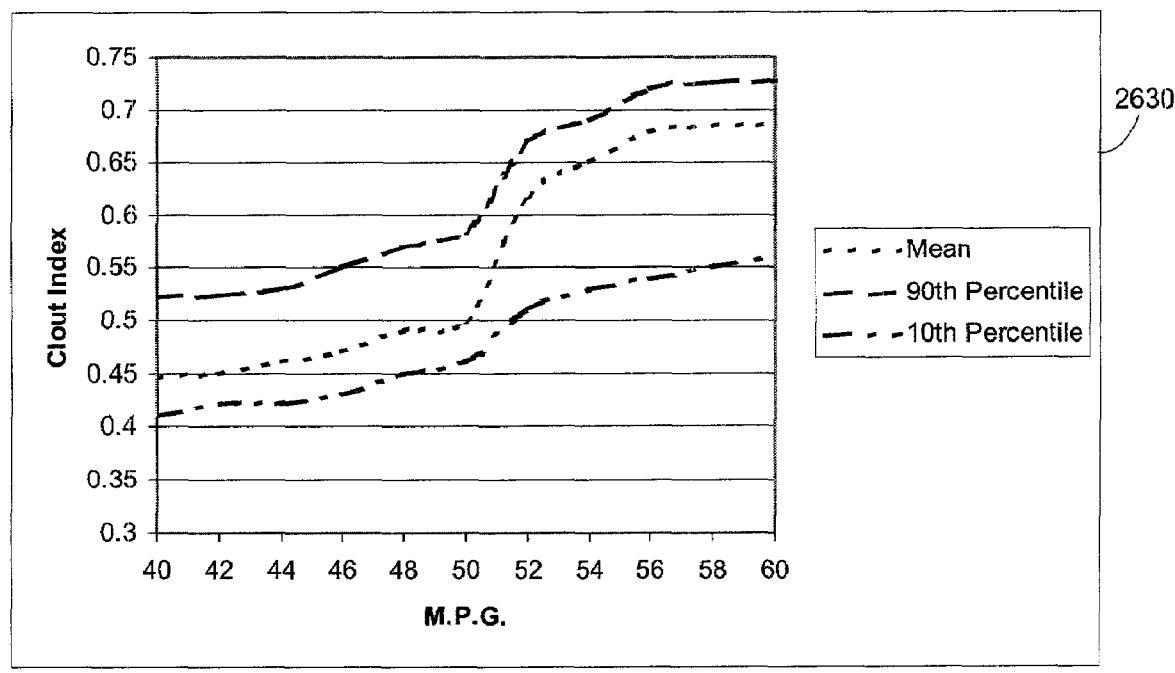

FIG. 26c illustrates presentation 2630. Presentation 2630 shows clout index values for various groups of respondents over various levels of the M.P.G. attribute. As shown, a large proportion of respondents are associated with a lower-than-average clout index.

Brand Favorability

Figure 27:
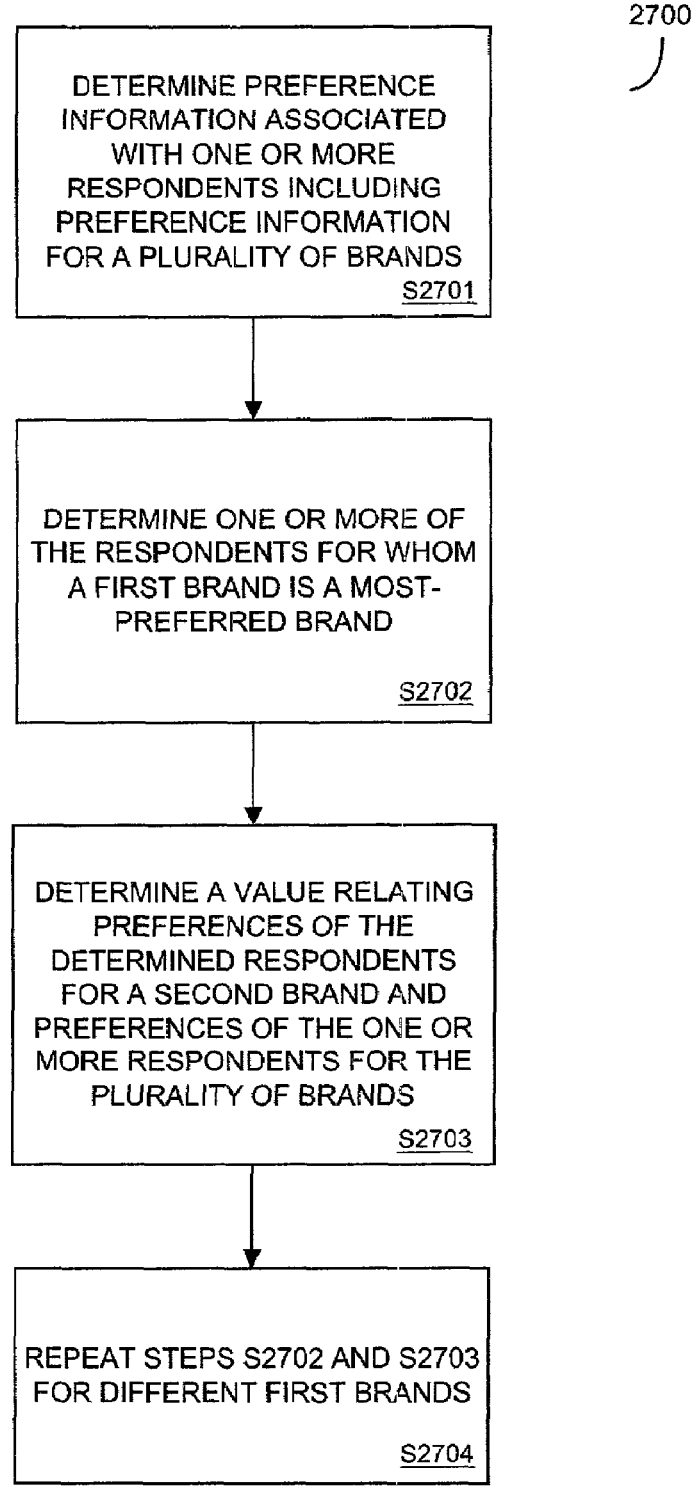
FIG. 27 is a flow diagram of process steps to process preference information according to embodiments of the present invention.

The "brand favorability" metric provides a client with an understanding of the importance of brands and the relative strength of brands. According to process steps 2700 of FIG. 27, the metric is determined by determining preference information associated with one or more respondents in step S2701. The determined preference information includes preference information for a plurality of brands.

In step S2702, one or more of the one or more respondents is determined for whom a first brand is a most-preferred brand. In order to determine a most-preferred brand for a respondent, a brand having a highest utility for the respondent may be identified. In some embodiments, a most-preferred brand of a respondent is determined to be a brand of a product that the respondent has previously purchased. For each of the one or more respondents determined in step S2702, a value relating preferences for a second brand and preferences for the plurality of brands is determined in step S2703. In some embodiments, the value is determined by dividing a utility for the second brand by a sum of the utilities for each brand. In other embodiments, the value is determined by subtracting the sum of the utilities for each brand from the utility for the second brand. The values determined for each respondent may be aggregated into a single value.

Steps S2702 and S2703 are repeated in step S2704 for each brand represented in the preference information. In a case that Brand A, Brand B and Brand C are represented in the information, and Brand C is to be considered the second brand of step S2703, steps S2702 and S2703 are initially performed with Brand A as the first brand and Brand C as the second brand. When flow reaches step S2704, steps S2702 and S2703 are performed with Brand B as the first brand and Brand C as the second brand. Finally, steps S2702 and S2703 are performed with Brand C as the first brand and Brand C as the second brand.

Figure 28A:
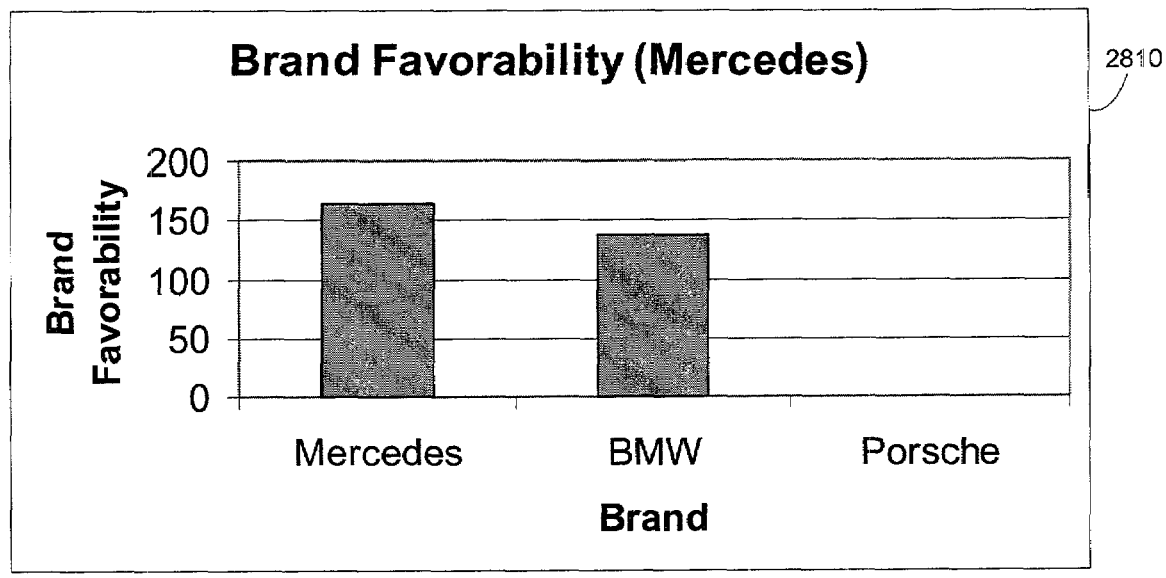
FIGS. 28a and 28b comprise representative views of graphics presenting a metric according to embodiments of the present invention.

Presentation 2810 of FIG. 28*a* illustrates the brand favorability metric in a case that the second brand is "Mercedes". The illustrated values may be values associated with a single respondent or with a plurality of respondents. Three values of the metric are shown, with each value having been determined with respect to a different first brand. From left to right, the values show a brand equity of Mercedes for respondents for whom 1) Mercedes is the most-preferred brand; 2) BMW is the most-preferred brand; and 3) Porsche is the most-preferred brand. The illustrated values also show that Mercedes-preferring respondents do not like the brand Porsche, and that they slightly prefer the brand Mercedes to the brand BMW.

Figure 28B:
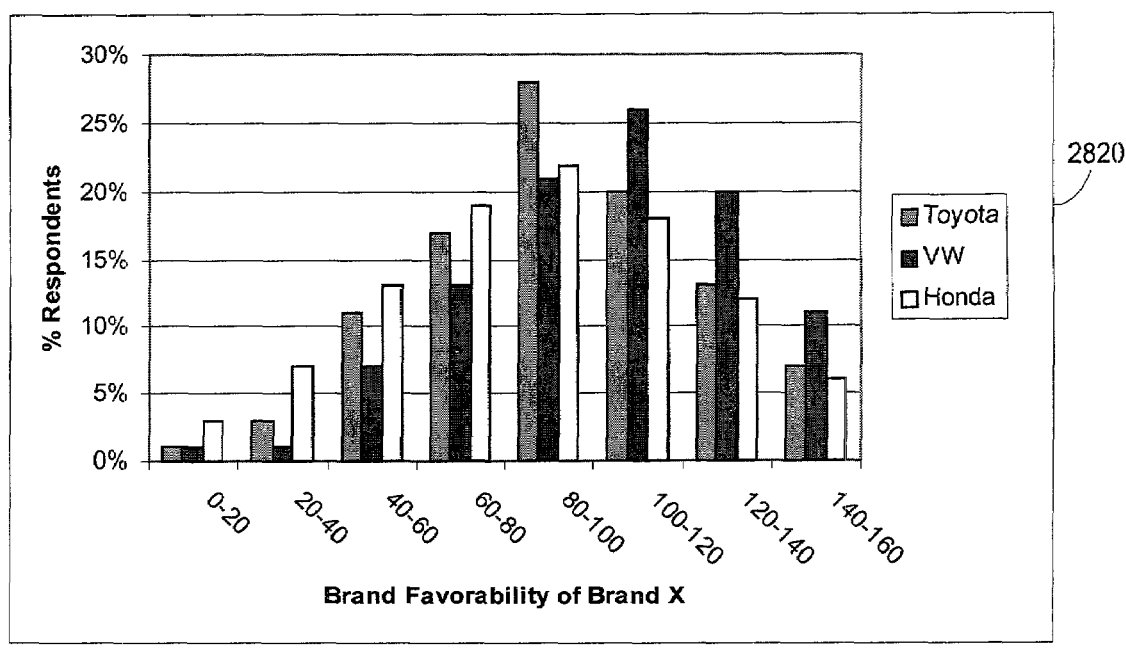

FIG. 28*b* shows a percentage of respondents associated with several brand favorability ranges for each of three brands. Presentation 2820 indicates that, for respondents that prefer brand X (e.g., VW), the distributions of brand favorability values of each of Toyota, VW and Honda form a lopsided bell curve.

Brand Vulnerability

Figure 29:
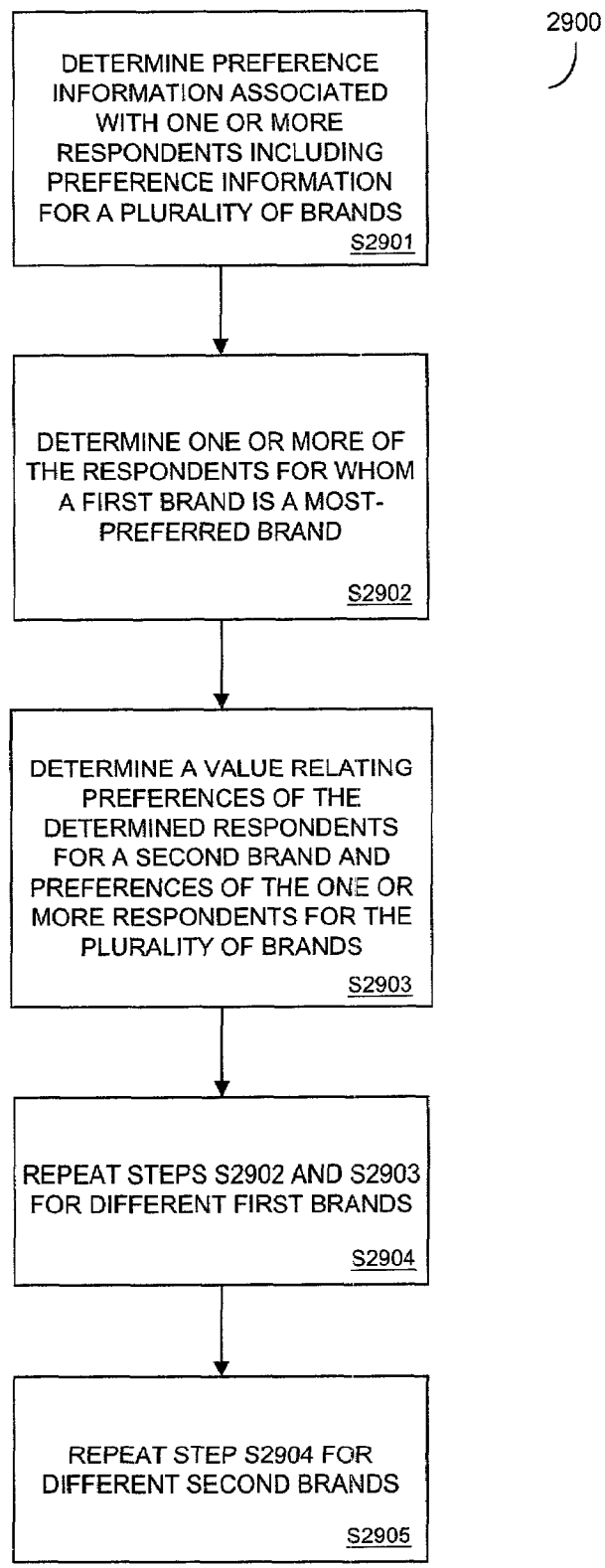
FIG. 29 is a flow diagram of process steps to process preference information according to embodiments of the present invention.
Figure 30:
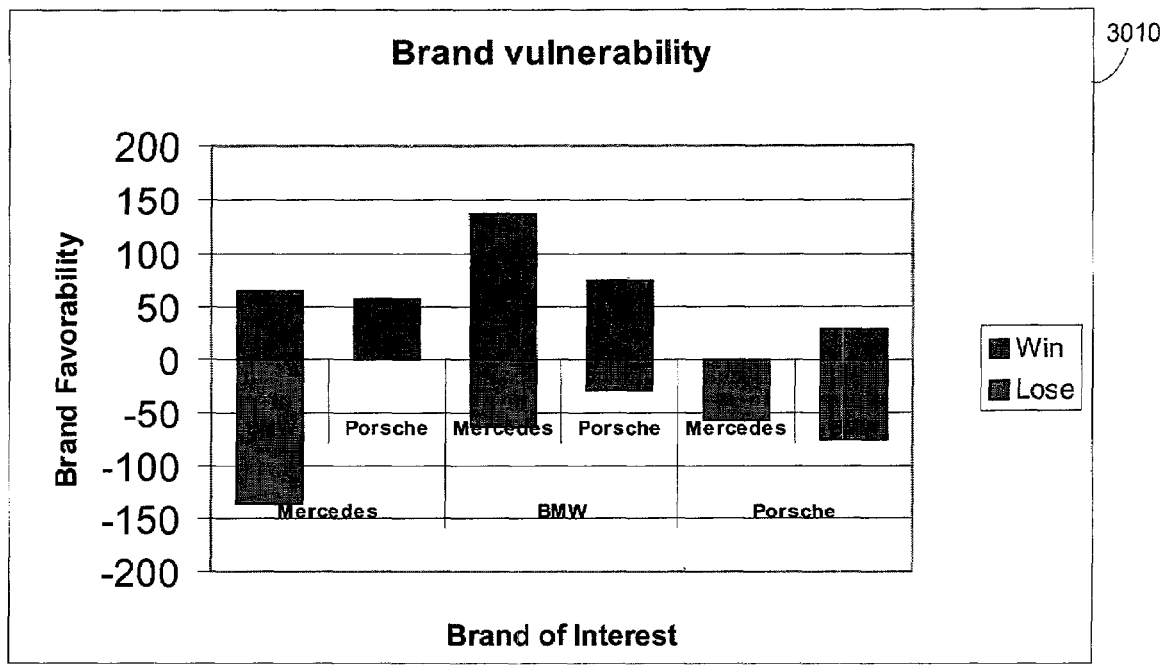
FIG. 30 comprises a representative view of graphics presenting a metric according to embodiments of the present invention.
Figure 31:
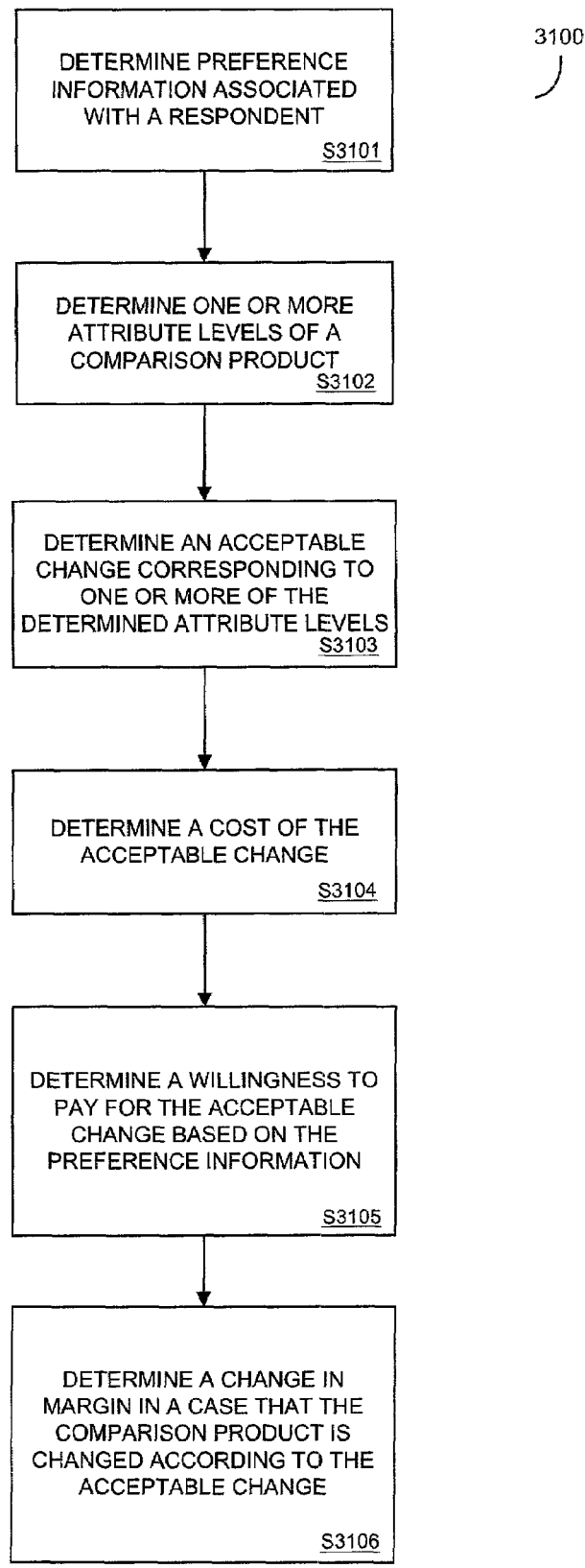
FIG. 31 is a flow diagram of process steps to process preference information according to embodiments of the present invention.

FIG. 29 shows process steps 2900 to determine the "brand vulnerability" metric. This metric provides an indication of the vulnerability of certain brands with respect to other brands. Steps S2901 to S2904 proceed similarly to steps S2701 to S2704 of process steps 2700. However, in step S2905, step S2902 to step S2904 are repeated for different second brands. Using the above example, values are calculated for each of Brands A, B, and C as first brands given that Brand C is the second brand during initial execution of process steps S2901 to S2904. Next, in step S2905, values are calculated for each of Brands A, B, and C as first brands given that Brand B is the second brand, and then values are calculated for each of Brands A, B, and C as first brands given that Brand A is the second brand. Values determined using process steps 900 are shown in presentation 3010 of FIG. 30.

The reader's attention is drawn to the two segments labeled "Mercedes" and "Porsche" in the middle third of presentation 3010. The Win portion of the Mercedes segment indicates the brand equity of BMW for respondents who prefer the Mercedes brand over all other brands. The Lose portion of the segment indicates the brand equity of Mercedes for respondents who most prefer the BMW brand over all other brands. Presentation 3010 therefore indicates that respondents who most prefer the Mercedes brand only slightly prefer the Mercedes brand over the BMW brand, relative to the amount that those respondents who most prefer the BMW brand prefer the BMW brand over the Mercedes brand.

Change in Margin Due to Acceptable Change in Comparison Product

The present metric provides a client with an estimated change in profit margin resulting from an acceptable change in a comparison product. The metric may be used, for instance, by a car salesman trying to determine an offer to provide to a customer. According to some embodiments of process steps 3100, preference information associated with a respondent is determined in step S3101. Next, one or more attribute levels of a comparison product are determined in step S3102. In step S3103, an acceptable change corresponding to one or more of the determined attribute levels is determined.

A cost to the client of the acceptable change is determined in step S3104, and a willingness to pay for the acceptable change is determined based on the preference information in step S3105. The cost may be determined based on information received from client system 300 or from depository 500, and the willingness to pay may be determined as set forth with respect to process steps 1300. More specifically, the cost determined in step S3104 is a cost to the client for resources used per unit of product in order to implement the acceptable changes. For example, it may cost the client $600 to add a sunroof, and a respondent may be willing to pay $700 for an added sunroof.

A change in margin in a case that the comparison product is changed according to the one or more acceptable changes is determined in step S3106. The change may be determined by subtracting the cost determined in step S3104 from the willingness to pay determined in step S3105. Of course, process steps 3100 may be performed to determine the metric for several different respondents and to produce an aggregate metric therefrom. Moreover, steps 3100 may be performed with respect to more than one acceptable change.

Figure 32A:
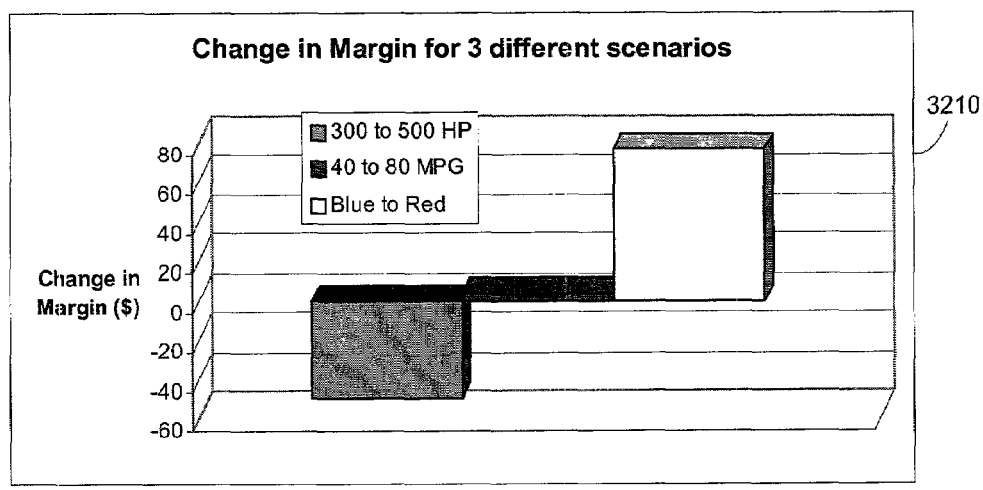
FIGS. 32a through 32c comprise representative views of graphics presenting a metric according to embodiments of the present invention.

Presentation 3210 of FIG. 32*a* illustrates the present metric as determined with respect to three different scenarios. Specifically, presentation 3210 shows the metric as independently calculated for three different changes to attribute levels of a product. The illustrated metrics may be determined for an individual or multiple respondents. According to presentation 3210, a significant profit margin may be obtained by changing the Color attribute of the product from blue to red, because the change substantially increases a willingness to pay for the product but requires an insubstantial cost, if any.

Figure 32B:
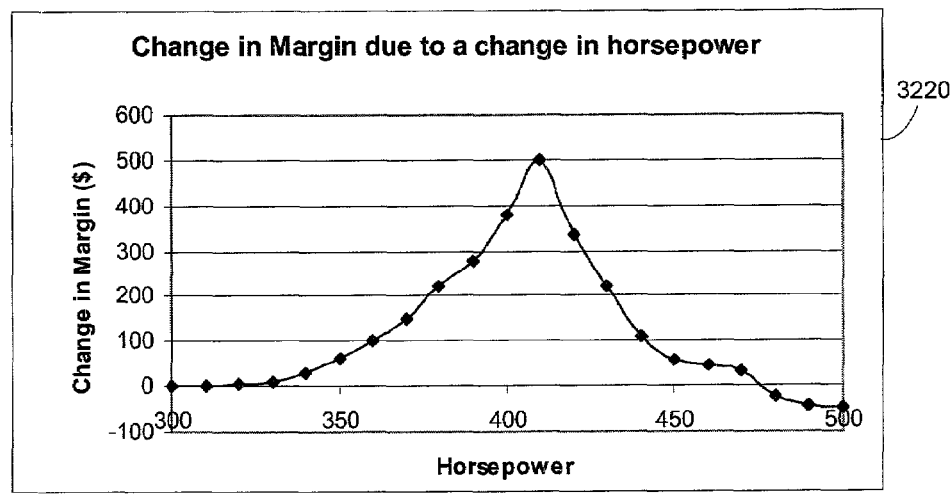
Figure 32C:
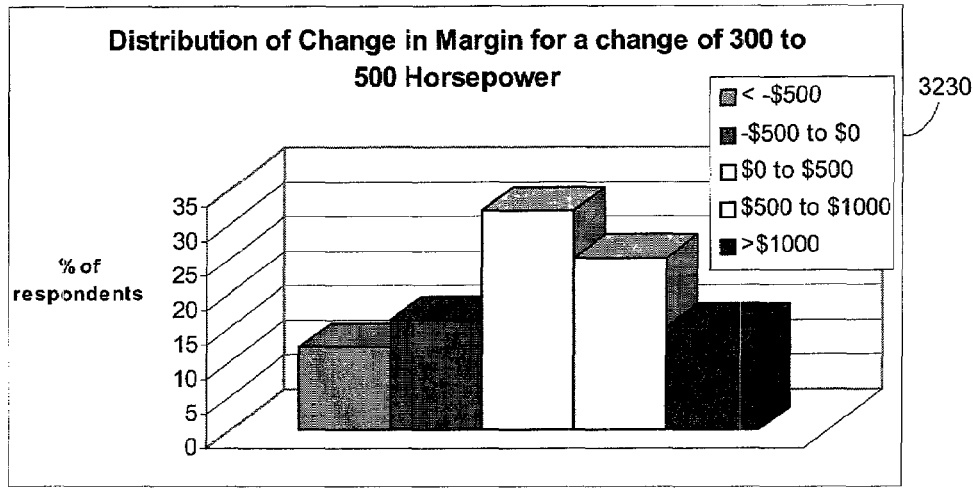

FIG. 32*b* shows presentation 3220 shows an individual or aggregate value of the metric as calculated for each of a plurality of changes to a single attribute. The value of the metric peaks around 410 horsepower and then decreases, perhaps because of a decrease in a difference between a willingness to pay for greater horsepower and a cost for providing the greater horsepower. Presentation 3230 of FIG. 32*c* shows, for a plurality of values of the metric, a percentage of respondents corresponding to each value in view of a particular change to a comparison product. As shown, the respondents' change in margin due to a specified change in horsepower creates a bell-shaped distribution.

Although the present invention has been described with respect to particular embodiments thereof, those skilled in the art will note that various substitutions may be made to those embodiments described herein without departing from the spirit and scope of the present invention.

What is claimed is:

1. A method for processing preference information, comprising:
   determining one or more acceptable changes, each acceptable change corresponding to an attribute of a comparison product;
   determining a utility of a price of the comparison product based on the preference information;
   determining a utility of one attribute of the comparison product based on the preference information;
   determining a utility of the one attribute as changed according to one of the one or more acceptable changes based on the preference information;
   determining a utility of a price of the comparison product as changed according to the one acceptable change based on the preference information;
   determining a price of the comparison product as changed according to the one acceptable change based on the determined utility of the price of the comparison product as changed according to the one or more acceptable changes; and
   determining an amount willing to be paid, by subtracting the determined price of the comparison product as changed according to the one acceptable change from the price of the comparison product, by a respondent for one or more of the one or more acceptable changes based on preference information associated with the respondent.

2. A method according to claim 1, and further including the steps of:
   determining an individual amount willing to be paid by each of a plurality of respondents for the one or more of the one or more acceptable changes based on preference information associated with the plurality of respondents; and
   determining the amount willing to be paid based on a plurality of the individual amounts willing to be paid.

3. A method according to 2, further comprising:
   presenting an indication of a statistical difference between each of the individual amounts willing to be paid.

4. A method according to claim 3, further comprising:
   presenting the indication only if the statistical difference exceeds a predetermined value.

5. A method according to claims 1 or 2, further comprising:
   presenting the amount willing to be paid for the one or more of the one or more acceptable changes.

6. A method according to claims 1 or 2, wherein the one or more acceptable changes comprise a plurality of acceptable changes in an attribute, and further comprising:
   determining the change in the amount willing to be paid for each of the plurality of acceptable changes as compared to the amount willing to be paid for the comparison product without each of the plurality of acceptable changes.

7. A method according to claim 6, further comprising:
   presenting, for each of the plurality of acceptable changes in the attribute, a percentage of respondents for whom an acceptable change reflects an unacceptable attribute level.

8. A method according to claims 1 or 2, further comprising:
   presenting the amount willing to be paid and a cost of the one or more of the one or more acceptable changes.

9. A method according to claim 8, further comprising:
   presenting a market price of the one or more of the one or more acceptable changes.

10. A method for processing preference information, comprising:
    determining one or more attribute levels of a comparison product;
    determining one or more acceptable changes, each of the acceptable changes corresponding to one of the determined one or more attribute levels;
    determining a cost of the one or more acceptable changes;
    determining a willingness to pay for the one or more acceptable changes based on preference information associated with a respondent;
    determining a first value in a case that the comparison product is changed according to only one change to an attribute, based on a cost of the one change and on a willingness to pay for the one change;
    determining a second value in a case that the comparison product is changed according to only a second change to the attribute, based on a cost of the second change and on a willingness to pay for the second change; and
    presenting the first value and the second value;
    whereby using the first value and the second value to determine a change in margin.

11. A method according to claim 10, wherein each of the willingness to pay is an aggregate willingness to pay determined based on preference information associated with a plurality of respondents.

12. A method according to claim 10, further comprising:
    determining a willingness to pay for the one or more acceptable changes for each of a plurality of respondents based on preference information associated with each of the plurality of respondents; and
    determining a value, for each of the plurality of respondents, representing a change in margin in a case that the comparison product is changed according to the one or more acceptable changes, based at least in part on the cost and the willingness to pay determined for each respondent.

13. A method according to claim 12, further comprising:
    determining a percentage or a number of the plurality of respondents that are associated with values within each of a plurality of ranges of values.

14. An apparatus for processing preference information, comprising:
    a processor; and
    a storage device in communication with the processor and storing instructions adapted to be executed by the processor to:
    determine one or more acceptable changes, each acceptable change corresponding to an attribute of a comparison product;
    determine a utility of a price of the comparison product based on the preference information;
    determine a utility of one attribute of the comparison product based on the preference information;
    determine a utility of the one attribute as changed according to one of the one or more acceptable changes based on the preference information;
    determine a utility of a price of the comparison product as changed according to the one acceptable change based on the preference information;
    determine a price of the comparison product as changed according to the one acceptable change based on the determined utility of the price of the comparison product as changed according to the one or more acceptable changes; and
    determine an amount willing to be paid, by subtracting the price of the determined comparison product as changed according to the one acceptable change from the price of the comparison product, by a respondent for one or more of the one or more acceptable changes based on preference information associated with the respondent.

15. An apparatus for processing preference information, comprising:
    a processor; and
    a storage device in communication with the processor and storing instructions adapted to be executed by the processor to:
    determine one or more attribute levels of a comparison product;
    determine one or more acceptable changes, each of the acceptable changes corresponding to one of the determined one or more attribute levels;
    determine a cost of the one or more acceptable changes;
    determine a willingness to pay for the one or more acceptable changes based on preference information associated with a respondent;
    determine a first value in a case that the comparison product is changed according to only one change to an attribute, based on a cost of the one change and on a willingness to pay for the one change;

determine a second value in a case that the comparison product is changed according to only a second change to the attribute, based on a cost of the second change and on a willingness to pay for the second change; and presenting the first value and the second value whereby using said first value and said second value to determine a change in margin.

* * * * *